(12) United States Patent
Hanrahan et al.

(10) Patent No.: US 7,800,613 B2
(45) Date of Patent: Sep. 21, 2010

(54) COMPUTER SYSTEMS AND METHODS FOR VISUALIZING DATA WITH GENERATION OF MARKS

(75) Inventors: Patrick Hanrahan, Portola Valley, CA (US); Chris Stolte, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 731 days.

(21) Appl. No.: 11/005,652

(22) Filed: Dec. 2, 2004

(65) Prior Publication Data

US 2006/0206512 A1 Sep. 14, 2006

(51) Int. Cl.
*G06T 11/20* (2006.01)
(52) U.S. Cl. ........................................... 345/440
(58) Field of Classification Search ................. 345/440; 707/3
See application file for complete search history.

(56) References Cited

U.S. PATENT DOCUMENTS

| | | | | |
|---|---|---|---|---|
| 4,800,810 A | * | 1/1989 | Masumoto | 99/519 |
| 5,036,314 A | | 7/1991 | Barillari et al. | 340/717 |
| 5,060,980 A | | 10/1991 | Johnson et al. | 283/70 |
| 5,144,452 A | | 9/1992 | Abuyama | 358/296 |
| 5,169,713 A | | 12/1992 | Kumurdjian | 428/323 |
| 5,265,244 A | | 11/1993 | Ghosh et al. | 395/600 |
| 5,265,246 A | | 11/1993 | Li et al. | 395/600 |
| 5,377,348 A | | 12/1994 | Lau et al. | 395/600 |
| 5,383,029 A | | 1/1995 | Kojima | 358/403 |
| 5,560,007 A | | 9/1996 | Thai | 395/600 |
| 5,577,241 A | | 11/1996 | Spencer | 395/605 |
| 5,581,677 A | * | 12/1996 | Myers et al. | 345/440 |
| 5,664,172 A | | 9/1997 | Antoshenkov | 395/604 |
| 5,664,182 A | | 9/1997 | Nierenberg et al. | 395/613 |
| 5,668,987 A | | 9/1997 | Schneider | 395/603 |
| 5,794,246 A | | 8/1998 | Sankaran et al. | 707/101 |
| 5,864,856 A | | 1/1999 | Young | 707/100 |
| 5,893,088 A | | 4/1999 | Hendricks et al. | 707/3 |

(Continued)

FOREIGN PATENT DOCUMENTS

HU 215657 B 1/1994
WO WO 2006/060773 A2 6/2006

OTHER PUBLICATIONS

Becker et al., "Trellis Graphics Displays: A Multi-Dimensional Data Visualization Tool for Data Mining," Third Annual Conference on Knowledge Discovery in Databases, Aug. 1997.

(Continued)

*Primary Examiner*—Ryan R Yang
(74) *Attorney, Agent, or Firm*—Morgan, Lewis & Bockius LLP

(57) ABSTRACT

A method for generating marks when displaying data, such as the results of a query across a database. The method is preferably used in conjunction with a dataset whose fields comprise a plurality of levels. A visual plot is constructed based on a specification. A first level from the plurality of levels is represented by a first component of the visual plot. A second level from the plurality of levels is represented by a second component of the visual plot. The dataset is optionally queried to retrieve data in accordance with the specification. The visual plot is populated with the retrieved data in accordance with the specification.

123 Claims, 30 Drawing Sheets

U.S. PATENT DOCUMENTS

| | | | |
|---|---|---|---|
| 5,933,830 A | 8/1999 | Williams | 707/100 |
| 6,031,632 A | 2/2000 | Yoshihara et al. | 358/403 |
| 6,032,158 A | 2/2000 | Mukhopadhyay et al. | 707/201 |
| 6,044,374 A | 3/2000 | Nesamoney et al. | 707/10 |
| 6,100,901 A | 8/2000 | Mohda et al. | 345/440 |
| 6,115,744 A | 9/2000 | Robins et al. | 709/227 |
| 6,154,766 A | 11/2000 | Yost et al. | 709/201 |
| 6,173,310 B1 | 1/2001 | Yost et al. | 709/201 |
| 6,188,403 B1 | 2/2001 | Sacerdoti et al. | 345/339 |
| 6,208,990 B1 | 3/2001 | Suresh et al. | 707/6 |
| 6,222,540 B1 | 4/2001 | Sacerdoti | 345/339 |
| 6,247,008 B1 | 6/2001 | Cambot et al. | 707/3 |
| 6,253,257 B1 | 6/2001 | Dundon | 709/331 |
| 6,260,050 B1 | 7/2001 | Yost et al. | 707/501 |
| 6,269,393 B1 | 7/2001 | Yost et al. | 709/201 |
| 6,300,957 B1 | 10/2001 | Rao et al. | 345/441 |
| 6,301,579 B1 | 10/2001 | Becker | 707/102 |
| 6,317,750 B1 | 11/2001 | Tortolani et al. | 707/103 |
| 6,327,628 B1 | 12/2001 | Anuff et al. | 709/311 |
| 6,339,775 B1 | 1/2002 | Zamanian et al. | 707/101 |
| 6,377,259 B1 | 4/2002 | Tenev et al. | 345/440 |
| 6,397,195 B1 | 5/2002 | Pinard et al. | 705/30 |
| 6,400,366 B1 | 6/2002 | Davies et al. | 345/440 |
| 6,405,195 B1 | 6/2002 | Ahlberg | 707/4 |
| 6,405,208 B1 | 6/2002 | Raghavan et al. | 707/102 |
| 6,424,933 B1 | 7/2002 | Agrawala et al. | 703/2 |
| 6,490,593 B2 | 12/2002 | Proctor | 707/102 |
| 6,492,989 B1 | 12/2002 | Wilkinson | 345/440 |
| 6,522,342 B1 | 2/2003 | Gagnon et al. | 345/716 |
| 6,611,825 B1 | 8/2003 | Billheimer et al. | 706/45 |
| 6,643,646 B2 | 11/2003 | Su et al. | 707/6 |
| 6,707,454 B1 | 3/2004 | Barg et al. | 345/440 |
| 6,714,897 B2 | 3/2004 | Whitney et al. | 702/189 |
| 6,725,230 B2 | 4/2004 | Ruth et al. | 707/102 |
| 6,750,864 B1 | 6/2004 | Anwar | 345/440 |
| 6,768,986 B2 | 7/2004 | Cras et al. | 707/2 |
| 6,906,717 B2 * | 6/2005 | Couckuyt et al. | 345/440 |
| 7,009,609 B2 * | 3/2006 | Miyadai | 345/440 |
| 7,089,266 B2 | 8/2006 | Stolte et al. | 707/104.1 |
| 7,117,058 B2 | 10/2006 | Lin et al. | 700/108 |
| 7,315,305 B2 | 1/2008 | Crotty et al. | 345/440 |
| 7,379,601 B2 * | 5/2008 | Yang et al. | 382/224 |
| 2002/0118192 A1 * | 8/2002 | Couckuyt et al. | 345/440 |
| 2002/0123865 A1 | 9/2002 | Whitney et al. | 702/189 |
| 2002/0154118 A1 * | 10/2002 | McCarthy et al. | 345/440 |
| 2003/0200034 A1 | 10/2003 | Fellenberg et al. | 702/20 |
| 2004/0183800 A1 * | 9/2004 | Peterson | 345/440 |
| 2004/0227759 A1 * | 11/2004 | McKnight et al. | 345/440 |
| 2004/0243593 A1 | 12/2004 | Stolte et al. | 707/100 |
| 2005/0035966 A1 * | 2/2005 | Pasquarette et al. | 345/440 |
| 2005/0035967 A1 * | 2/2005 | Joffrain et al. | 345/440 |
| 2005/0060300 A1 | 3/2005 | Stolte et al. | 707/3 |
| 2005/0099423 A1 * | 5/2005 | Brauss | 345/440 |
| 2006/0129913 A1 | 6/2006 | Vigesaa et al. | 715/503 |
| 2006/0136825 A1 | 6/2006 | Cory et al. | 715/700 |
| 2006/0206512 A1 | 9/2006 | Hanrahan et al. | 707/102 |
| 2007/0061344 A1 | 3/2007 | Dickerman et al. | 707/100 |

OTHER PUBLICATIONS

Becker, "Visualizing Decision Table Classifiers", Proceedings IEEE Symposium on Information Visualization, pp. 102-105, 1998.

Bosch et al., "Performance Analysis and Visualization of Parallel Systems Using SimOS and Rivet: A Case Study," Proceedings of the Sixth IEEE International Symposium on High-Performance Computer Architecture, pp. 360-371, Jan. 2000.

Bosch et al., "Rivet: A Flexible Environment for Computer Systems Visualization," Computer Graphics 34, pp. 68-73, Feb. 2000.

Brunk et al., "MineSet: An Integrated System for Data Mining," Proceeding of the 3rd International Conference on Knowledge Discovery and Data Mining, pp. 135-138, AAA1 Press, 1997.

Derthick et al., "An Interactive Visual Query Environment for Exploring Data," Proceedings of ACM SIGGRAPH Symposium on User Interface Software & Technology, pp. 189-198, 1997.

Freeze, Unlocking OLAP with Microsoft SQL Server and Excel 2000, IDG Books Worldwide, Foster City, CA, pp. 155-332 and 379-422.

Fua et al., "Navigating Hierarchies with Structure-Based Brushes," Proc. of Infovis '99 (San Francisco, CA, USA, 1999), IEEE Computer Soc Press.

Goldstein et al., "A Framework for Knowledge-Based Interactive Data Exploration," Journal of Visual Languages and Computing 5, pp. 339-363, Dec. 1994.

Gray et al., "Data Cube: A Relational Aggregation Operator Generalizing Group-By, Cross- Tab, and Sub-Total," Data Mining and Knowledge Discovery 1, pp. 29-53, 1997.

Healey, "On the Use of Perceptual Cues and Data Mining for Effective Visualization of Scientific Datasets," Proceedings Graphics Interface '98, pp. 177-187.

Kohavi, "Data Mining and Visualization," Frontiers of Engineering: Reports of leading-Edge Engineering from the 200 NAE Sym.

Livny et al., "DEVise: Integrated Querying and Visual Exploration of Large Datasets," Proceedings of ACM SIGMOD, pp. 301-312, May 1997.

MacDonald, "Creating Basic Charts," Excel 2003, Chapter 9, pp. 298-342, 2006.

MacKinlay, J., "Automating the Design of Graphical Presentations of Relational Information," ACM Transactionss on Graphics 5(2), pp. 110-141, 1986.

Perlin et al., "An Alternative Approach to the Computer Interface," Proc. of the $20^{th}$ International Conference on Computer Graphics and Interactive Techniques, pp. 57-64, 1993.

Rao et al., "The Table Lens: Merging Graphical and Symbolic Representations in an Interactive Focus+Context Visualization for Tabular Information," Proc. of ACM SIGCHI, Apr. 1994, pp. 318-322.

Roth et al., "Interactive Graphics Design Using Automatic Presentation Knowledge," Proceedings of the Conference on Human Factors in Computer Systems, Proc. SIGCHI '94, pp. 112-117, 1994.

Roth et al., "Visage: A User Interface Environment for Exploring Information" Proceedings of Information Visualization Symposium 1996, pp. 3-12, Mar. 12, 1999.

Screen Dumps for Microsoft Office Excel 2003 SP2, figures 1-24, 10 pp. 1-19.

Spenke et al., Focus: The Interactive Table for Product Comparison and Selection, Proc. of ACM Symposium on User Interface Software and Technology, Nov. 1996.

Stevens, "On the Theory of Scales of Measurement," Science vol. 103, No. 2684 pp. 677-680, Jun. 7, 1946.

Stolte et al, "Query, Analysis, and Visualization of Hierarchically Structured Data Using Polaris," Proceedings of the Eight ACM SIGKDD '02, International Conference on Knowledge Discovery and Data Mining, Jul. 2002.

Stolte et al., "Multiscale Visualization Using Data Cubes," Proceedings of the Eighth IEEE Symposium on Information Visualization, 2002.

Stolte et al., "Polaris: A System for Query, Analysis, and Visualization of Multidimensional Relational Databases," IEEE Transactions on Visualization and Computer Graphics 8(1), pp. 52-65, Jan. 2002.

Stolte et al., "Visualizing Application Behavior on Superscalar Processors," Proceedings of the IEEE Symposium on Information Visualization, pp. 10-17, 1999.

Thearling et al., "Visualizing Data Mining Models," Pub. in Information Visualization in Data Mining and Knowledge Discovery, Fayyad, Grinstein and Wierse, eds., Morgan Kaufman, 2001.

Welling et al., "Visualization of Large Multi-Dimensional Datasets," arXiv: astro-ph/0008186, Aug. 11, 2000.

Wilkinson et al., "nViZn: An Algebra-Based Visualization System," Smart Graphics Symposium UK, Mar. 21-23, 2001, Hawthorne, NY USA.

Wilkinson, "Statistics and Computing-The Grammar of Graphics," Springer-Verlag, Inc., New York, 1999.

Notice of Allowance for U.S. Appl. No. 10/453,834 dated Mar. 27, 2006.

Office Action for U.S. Appl. No. 10/667,194 dated Jun. 26, 2006.

Office Action for U.S. Appl. No. 10/667,194 dated Jan. 18, 2007.
Office Action for U.S. Appl. No. 10/667,194 dated Aug. 14, 2007.
Office Action for U.S. Appl. No. 10/667,194 dated Jan. 7, 2008.
Office Action for U.S. Appl. No. 10/667,194 dated Aug. 14, 2008.
Office Action for U.S. Appl. No. 10/667,194 dated Feb. 9, 2009.
Office Action for U.S. Appl. No. 11/223,658 dated May 21, 2008.
Office Action for U.S. Appl. No. 11/223,658 dated Feb. 23, 2009.
Office Action for U.S. Appl. No. 11/488,407 dated Apr. 3, 2009.
Office Action for U.S. Appl. No. 11/787,761 dated Jun. 12, 2008.
Office Action for U.S. Appl. No. 11/787,761 dated Dec. 17, 2008.
International Search Report and Written Opinion for PCT/US2004/30396 dated Aug. 24, 2006.
International Preliminary Report on Patentability for PCT/US2004/30396 dated Apr. 19, 2007.
International Preliminary Report on Patentability for PCT/US2005/043937 dated Jun. 14, 2007.
International Search Report and Written Opinion for PCT/US2007/009810 dated Jul. 7, 2008.
International Preliminary Report on Patentability for PCT/US2007/009810 dated Oct. 30, 2008.
International Search Report and Written Opinion for PCT/US2006/35300 dated Jul. 7, 2008.
International Search Report and Written Opinion for PCT/US04/18217 dated Feb. 7, 2006.
International Preliminary Report on Patentability for PCT/US04/18217 dated Oct. 19, 2006.
Hungarian Search Report for HU P0700460 dated Oct. 9, 2007.
Supplementary European Search Report for EP 04754739.3, dated Dec. 17, 2007.
Specification for U.S. Appl. No. 10/453,834, filed Jun. 2, 2003.
Specification for U.S. Appl. No. 11/005,652, filed Dec. 2, 2004.
Specification for U.S. Appl. No. 11/223,658, filed Sep. 9, 2005.

* cited by examiner

COMPUTER SYSTEMS AND METHODS FOR VISUALIZING DATA WITH GENERATION OF MARKS

FIELD OF THE INVENTION

This invention relates generally to computer systems and methods for visualizing data such as database information. The invention relates specifically to a computer system and method for determining an appropriate mark based on types of data being visualized.

BACKGROUND OF THE INVENTION

The coming of the digital age was akin to the breaching of a dam: a torrent of information was unleashed and we are now awash in an ever-rising tide of data. Information, results, measurements and calculations—data, in general—are now in abundance and are readily accessible, in infinitely reusable digital form, on magnetic or optical media. The relentless increase in computing power fuels the promise of being able to efficiently analyze and display vast amounts of data more quickly and in ever more creative ways. Accordingly, the ever-present need to make meaningful sense of data is driving substantial research efforts in methods of statistical analysis, pattern recognition, data mining, and visualization. Current challenges include the ability to provide fast ways of coping with data that exists within a complex parameter space.

Data is more than the numbers, values, or predicates of which it is comprised. Data resides in multi-dimensional spaces which harbor rich and variegated landscapes that are not only strange and convoluted, but are not readily comprehendible by the human brain. The most complicated data arises from measurements or calculations that depend on many apparently independent variables. Data sets with hundreds of variables arise today in many walks of life, including: gene expression data for uncovering the link between the genome and the various proteins for which it codes; demographic and consumer profiling data for capturing underlying sociological and economic trends; sales and marketing data for huge numbers of products in vast and ever-changing marketplaces; and environmental measurements for understanding phenomena such as pollution, meteorological changes and resource impact issues. International research projects such as the Human Genome Project and the Sloan Digital Sky Survey are also generating massive scientific databases. Furthermore, corporations are creating large data warehouses of historical data on key aspects of their operations. Corporations are also using desktop applications to create many small databases for examining some specific aspect of their business.

One challenge with any of these databases is the extraction of meaning from the data they contain: to discover structure, find patterns, and derive causal relationships. Often, the sheer size of these data sets complicates this task and means that interactive calculations that require visiting each record are not plausible. It may also be infeasible for an analyst to reason about or view the entire data set at its finest level of detail. Even when the data sets are small, however, their complexity often makes it difficult to glean meaning without aggregating the data or creating simplifying summaries.

Among the principal operations that may be carried out on data, such as regression, clustering, summarization, dependency modelling, and classification, the ability to see patterns rapidly is of paramount importance. Data comes in many forms, and the most appropriate way to display one form is not the best for another. In the past, where it has been recognized that many methods of display are possible, it has been a painstaking exercise to select the most appropriate one. However, identifying the most telling methods of display can be intimately connected to identifying the underlying structure of the data itself.

Business intelligence is one rapidly growing area that benefits considerably from tools for interactive visualization of multi-dimensional databases. A number of approaches to visualizing such information are known in the art. However, although software programs that implement such approaches are useful, they are often unsatisfactory. Such programs have interfaces that require the user to select the most appropriate way to display the information.

Visualization is a powerful tool for exploring large data, both by itself and coupled with data mining algorithms. However, the task of effectively visualizing large databases imposes significant demands on the human-computer interface to the visualization system. The exploratory process is one of hypothesis, experiment, and discovery. The path of exploration is unpredictable, and analysts need to be able to easily change both the data being displayed and its visual representation. Furthermore, the analyst should be able to first reason about the data at a high level of abstraction, and then rapidly drill down to explore data of interest at a greater level of detail. Thus, a good interface both exposes the underlying hierarchical structure of the data and supports rapid refinement of the visualization.

In addition to various software programs, the known art further provides formal graphical presentations. Bertin's *Semiology of Graphics*, University of Wisconsin Press, Madison Wis., (1983), is an early attempt at formalizing graphic techniques. Bertin developed a vocabulary for describing data and techniques for encoding the data into a graphic. Bertin identified retinal variables (position, color, size, etc.) in which data can be encoded. Cleveland (*The Elements of Graphing Data*, Wadsworth Advanced Books and Software, (1985), Pacific Grove, Calif.; and *Visualizing Data*, (1993), Hobart Press) used theoretical and experimental results to determine how well people can use these different retinal properties to compare quantitative variations.

Mackinlay's APT system (*ACM Trans. Graphics*, 5, 110-141, (1986)) was one of the first applications of formal graphical specifications to computer generated displays. APT uses a graphical language and a hierarchy of composition rules that are searched through in order to generate two-dimensional displays of relational data. The Sage system (Roth, et al., (1994), Proc. SIGCHI '94, 112-117) extends the concepts of APT, providing a richer set of data characterizations and generating a wider range of displays.

A drawback with the formal graphical specifications of the art is that they do not provide a user with a means to control or influence the results. APT, for example, assumes a given database structure and generates a graphic with no user involvement or support for user involvement and also requires searching through a number of possibilities before deducing that which it considers to be most appropriate. Accordingly, such formal graphical specifications do not provide a satisfactory way to analyze databases.

Visual query tools such as VQE (Merthick et al., 1997, "An Interactive Visualization Environment for Data Exploration," Proc. of Knowledge Discovery in Databases, p. 2-9), Visage (Roth et al. 1996, "Visage: A User Interface Environment for Exploring Information" in Proceedings of Information Visualization, p. 3-12), DEVise (Livny et al., 1997, "DEVise: Integrated Querying and Visual Exploration of Large Datasets" in Proc. of ACM SIGMOD), and Tioga-2 (Woodruff et al., 2001, Journal of Visual Languages and Computing, Special Issue on Visual Languages for End-user and Domain-Specific Programming 12, p. 551-571) have focused on building visualization tools that directly support interactive database exploration through visual queries. Users can construct queries and visualizations directly through their interactions with the interface. These systems have flexible mechanisms for mapping query results to graphs and support mapping database tuples to retinal properties of the marks in the graphs. However, these visual query tools do not provide a user with particularly significant labor savings in deciding how best to display data rapidly.

Based on the background state of the art, as described herein, what is needed are improved methods and improved graphical interfaces for visualizing data, including data that has a hierarchical structure.

SUMMARY OF THE INVENTION

The present invention provides improved methods for visualizing data.

A first aspect of the invention provides a method of method of forming a visual plot using a dataset having a plurality of fields, wherein the dataset contains data that comprises a plurality of tuples, the method comprising: organizing the visual plot into a plurality of panes, wherein each of the panes has at least a first axis and wherein said first axis corresponds to a first field from the plurality of fields; assigning a pane type to each pane in the plurality of panes according to a first type of the first field; determining a mark for each pane based on the pane type; and populating the visual plot with the data. In one embodiment, the dataset is queried to retrieve data in accordance with the specification.

A second aspect of the invention provides a computer program product for use in conjunction with a computer system. The computer program product comprises a computer readable storage medium and a computer program mechanism embedded therein. The computer program mechanism forms a visual plot using a dataset having a plurality of fields, wherein the dataset contains data that comprises a plurality of tuples, the computer program mechanism comprising: instructions for organizing the visual plot into a plurality of panes, wherein each of the panes has at least a first axis and wherein the first axis corresponds to a first field from the plurality of fields; instructions for assigning a pane type to each pane in the plurality of panes according to a first type of the first field; instructions for determining a mark for each pane based on the pane type; and instructions for populating the visual plot with the data. In preferred embodiments the plurality of panes is organized in a plurality of rows and a plurality of columns. It is also preferred that the specification is expressed in a language based on one or more fields in the dataset. In one embodiment, the computer program mechanism further comprises instructions for querying the dataset to retrieve data in accordance with the specification.

A third aspect of the invention provides a computer system for forming a visual plot using a dataset having a plurality of fields, wherein the dataset contains data that comprises a plurality of tuples, the computer system comprising: a central processing unit; a memory, coupled to the central processing unit, the memory storing: the dataset; a programming module comprising: instructions for organizing the visual plot into a plurality of panes, wherein each of the panes has at least a first axis and wherein the first axis corresponds to a first field from the plurality of fields; instructions for assigning a pane type to each pane in the plurality of panes according to a first type of the first field; instructions for determining a mark for each pane based on the pane type; and instructions for populating the visual plot with the data. In one embodiment, the programming module further comprises instructions for querying the dataset to retrieve data in accordance with the specification. In some embodiments, all or a portion of the programming module is distributed on remote servers and/or on client computers.

BRIEF DESCRIPTION OF THE DRAWINGS

Like reference numerals refer to corresponding parts throughout the several views of the drawings.

DETAILED DESCRIPTION OF THE INVENTION

Figure 1:
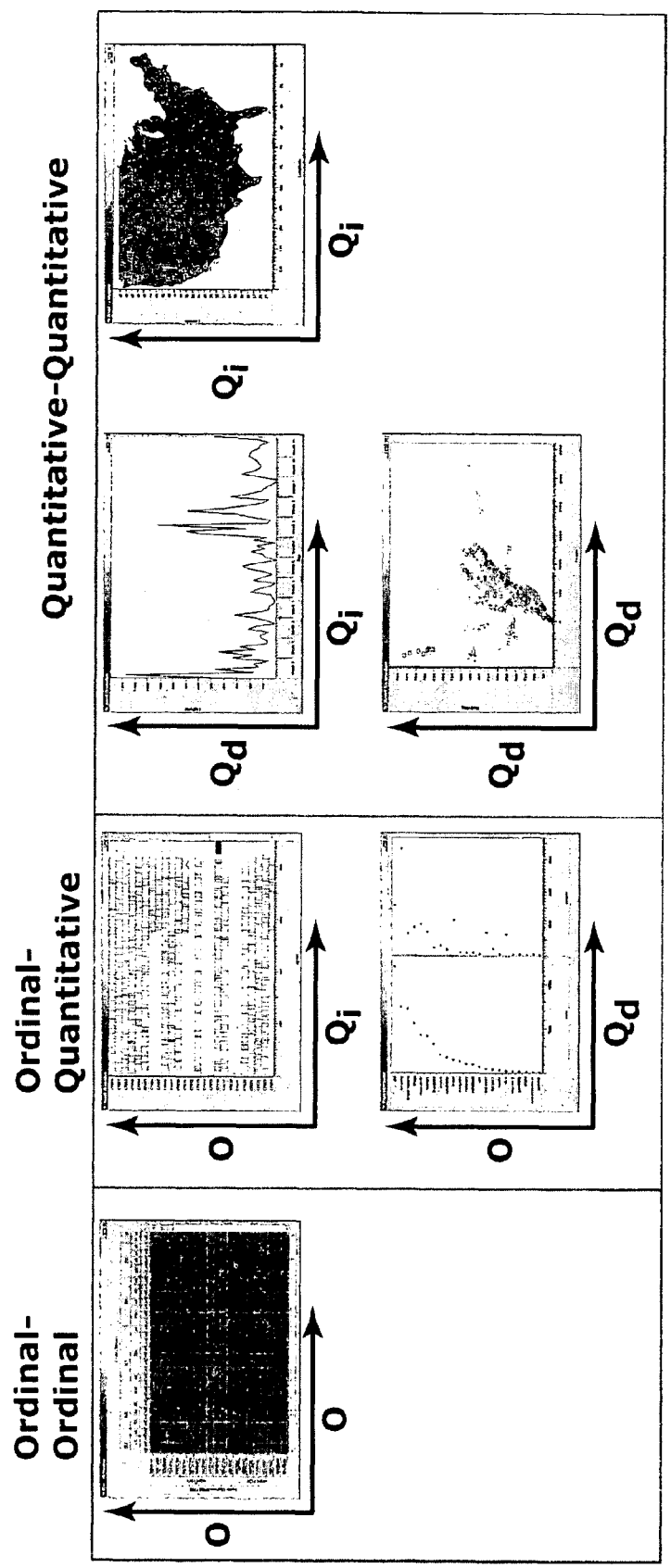
FIG. 1 shows an exemplary graphic taxonomy in accordance with the present invention.

The present invention provides computer systems, computer program products, and methods for providing a user with a convenient visualization of data or information such as found in a database. In a typical embodiment of the present invention, a user specifies certain categories of data. Examples of such data, such as results of a search query, are displayed in a graphical form according to a scheme that is determined for the user by the methods of the present invention. An advantage of the present invention is that data can be illustrated in a large number of graphical manifestations.

Preliminary Definitions

The following terms are used herein.

A tuple is an item of data (such as a record) from a database, specified by two or more attributes from fields in the database. A search query across the database will return one or more tuples.

A table schema defines the columns comprising a tuple. The schema gives a name and a type for each column. Additional information about columns may also be given, such as whether the column is a key, or whether the values are restricted to be a subset of the allowed values.

A database schema is a collection of tables.

A presentation is a graphical view of the data in the database.

Table algebra comprises mathematical operations that may be applied to data in a database, organized by fields, so that the data can be displayed with a desired organization.

A visual specification (also referred to herein as a 'specification') comprises expressions for the axes of a presentation. A specification is typically expressed in a language such as a language tailored to describing graphical representations. In a preferred embodiment it is expressed using a table algebra described herein. The axes are usually expressed as x- and y-axes, but in some embodiments, more than two axes, or only one axis, is possible. A visual specification also typically includes an expression for defining one or more layers.

An aggregation is a statistical summary of a multiplicity of values. For example, the sum or average of numerical values, or the count of the number of categorical values.

A layer is a stack of graphical views that are overlaid on top of each other.

A pane is a part of a system of display and is defined by one or more fields; in the typical case where a pane is described by two fields, those fields are referred to as an ordinate, and an abscissa.

A mark visually represents one or more tuples from the database. A mark is the visual representation of a tuple in a pane. A mark is typically associated with a type of graphical display. For example, in a bar chart, a mark is a bar. Other examples of marks include: text, shapes, and symbols.

Determination of Marks

The present invention provides a method of forming a visual plot from a dataset having a plurality of fields, wherein the dataset contains data that comprises a plurality of tuples, the method comprising organizing the visual plot into a plurality of panes, wherein each of said panes has at least one axis and wherein the axis corresponds to a field from the plurality of fields; assigning a pane type to each pane in the plurality of panes according to a type of the field; determining a mark for each pane based on the pane type; and populating the visual plot with the data. The type of the field can be numerical, categorical, time, or geolocational. The methods of the present invention further provide methods of determining marks for tuples that result from a search—for example expressed as a query—of the dataset.

According to the present invention, each tuple in a pane is mapped to a mark, either in a one-to-one mapping or as multiple tuples to a single mark, and the choice of mark is set according to attributes of the particular pane.

In a preferred embodiment, the panes are organized into a plurality of rows and a plurality of columns, but other arrangements of panes that facilitate visualization of data are consistent with the methods of the present invention.

Each pane is assigned a type, referred to as a "pane type". The pane type depends on the type of the fields on the edges of the pane. A numeric quantity is denoted as type Q, and a categorical quantity as type O (for ordinal, since the order of the categories is given). In general a pane is associated with two fields. Thus, there are 4 types of panes that can be formed from data containing numeric and/or ordinal quantities: OO, OQ, QO, and QQ. Specific types are also allowed. Two important examples are specific types of coordinates: time, denoted T; and geolocational (such as given by latitude and longitude), denoted "Geo".

The type associated with the edges of the panes may contain additional information. For example, it is common to classify numeric quantities as either independent or dependent quantities. For example, in the expression $y=f(x)$, x is an independent quantity, and y is a dependent quantity. This variation in type is denoted as, for example, Qi and Qd. The pane type—and hence the associated mark—can depend on this additional information.

An overview of the manner of assigning a pane type—also called a graphic taxonomy—based on properties of axes is shown in FIG. 1.

The present invention pertains to assigning a mark based on the types of the fields assigned to the edges of the panes. In a preferred embodiment, the mark is determined according to a rule set. In an alternate embodiment, a single default is set for all types of pane. In still another embodiment, the user picks the desired mark for each type of pane and such choices are stored and used in subsequent searches across the dataset. The goal of this invention, however, is to assign marks according to best practices for the types of data in question so that the user need not do it. Different marks are allowed, including text, symbols, shapes, lines, and polygons. The properties of a mark can include position (such as (x, y)), color, size, and others. In particular, more than one tuple can be associated with a mark. For example, when a mark is a polygon, each tuple can be associated with a vertex of the polygon.

In a preferred embodiment, the following rules are employed to assign marks based on pane type:

| Pane type | Display/mark |
|---|---|
| O | Table/Text |
| Q | Scatter-plot/Shape |
| θ | Pie |
| OO | Table/Text |
| OQ | Bar chart/Bar |
| QO | Bar chart/Bar |
| QQ | Scatter-plot/Shape |
| TO | Gantt plot/bar |
| OT | Gantt plot/bar |
| QT | Line graph/Line |
| TQ | Line graph/Line |
| Geo | Map/map symbol |

More generally, the present invention encompasses any system of rules that chooses the mark type, given the types of the fields assigned to a pane.

As shown herein, it is possible for a pane to have a single field associated with it. The most common way of representing such information is as text for ordinal data, and as a shape for numerical data. In some instances, it is convenient to display the information as a pie chart, such as when the data is expressed as a percentage (denoted θ in the table). In such a case, the axis of the pane is the angle of a circular polar coordinate system and a mark is a segment of the plot.

In general, however, it is most frequent that data will be displayed in a 2-dimensional form. Examples of such two-dimensional displays are shown in FIGS. 2A-G. It is preferred that the axes of the displays are disposed orthogonally with respect to one another. It is consistent with the present invention, however, that the axes of the panes may be disposed at an angle between 0 and 180° but other than 90°. It is also possible to use a circular polar coordinate system for displaying in two-dimensions, where radius and angle both vary.

Figure 2A:
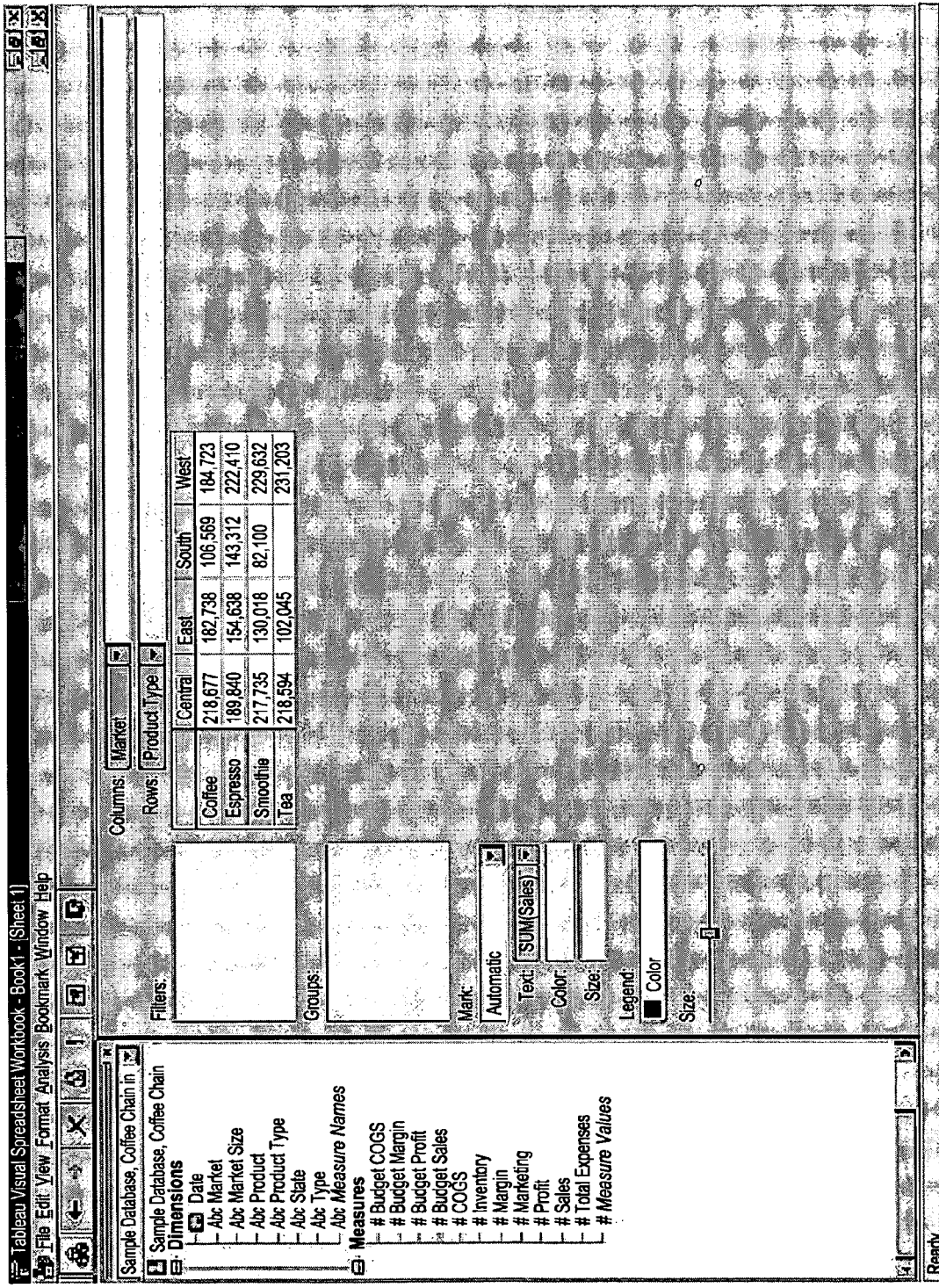
FIGS. 2A-G show exemplary charts and marks in accordance with the present invention.

Thus, for a pane type OO, a table of text results as shown in FIG. 2A, with each mark being an item of text such as a numeric value.

Figure 2B:
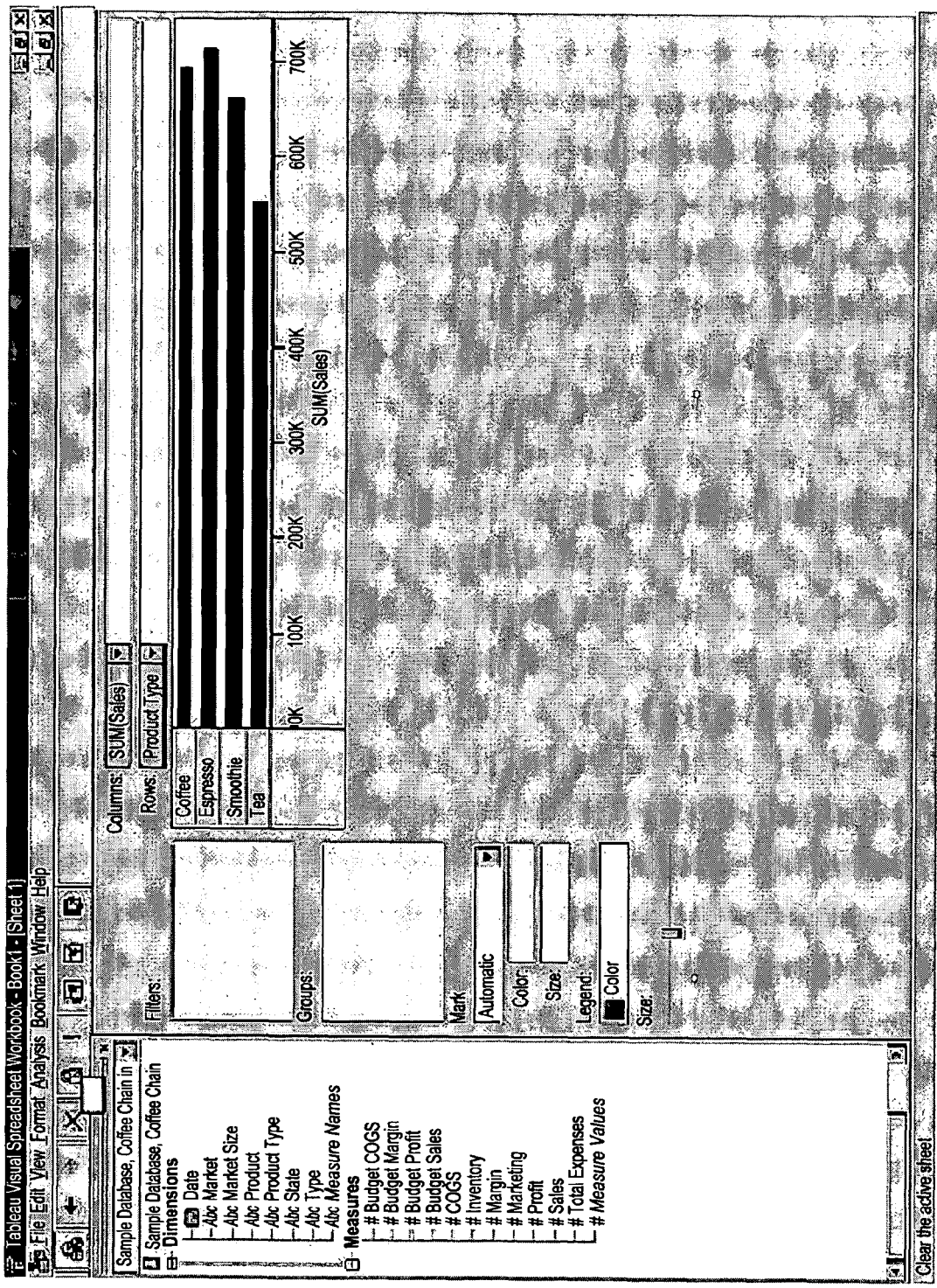
Figure 2C:
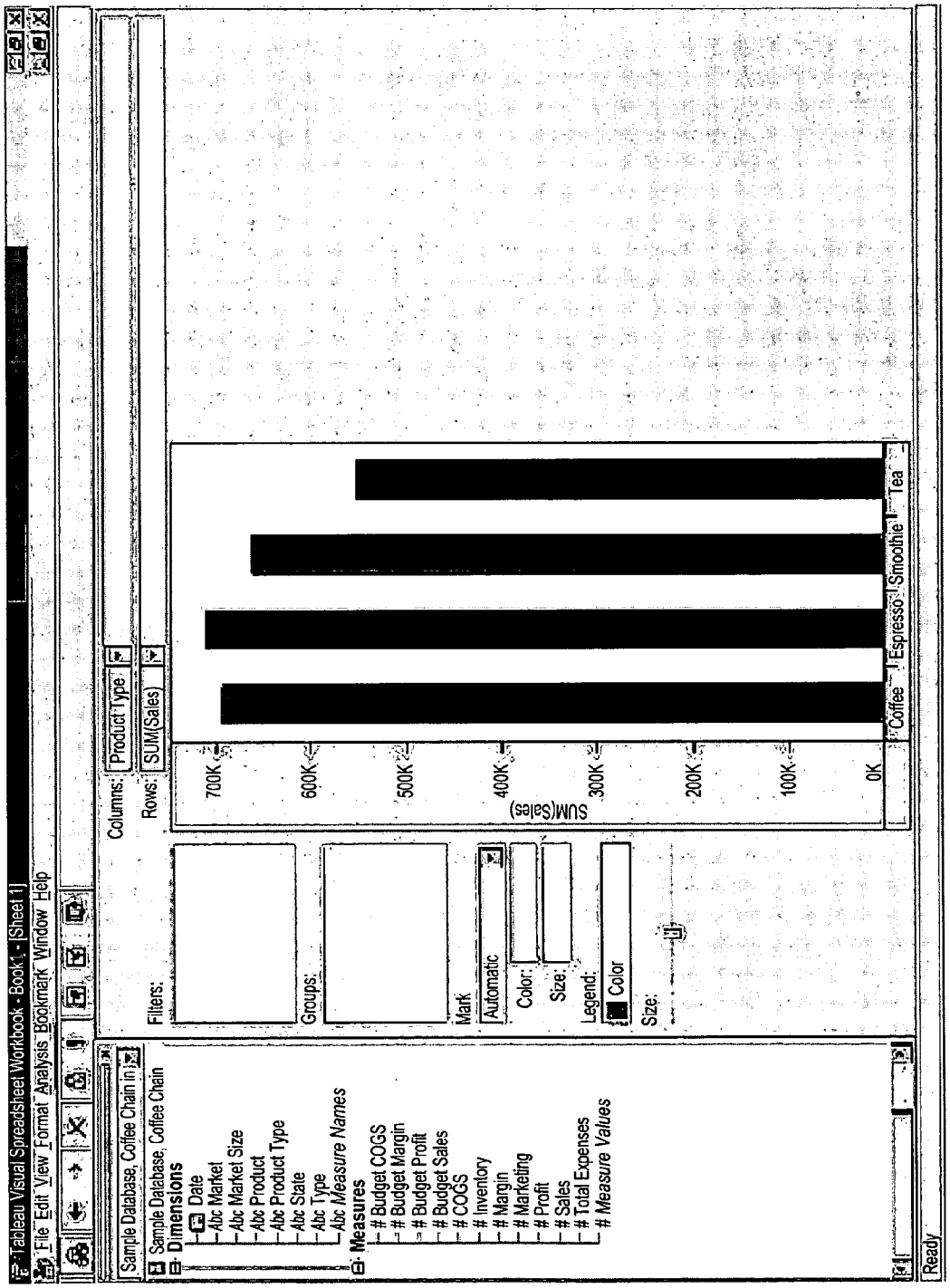

For pane types QO and OQ, a bar chart results (see FIGS. 2B, and 2C). Each mark is a bar in the chart, presented in the customary way, as a bar whose length is proportionate to the value of the category in question.

Figure 2D:
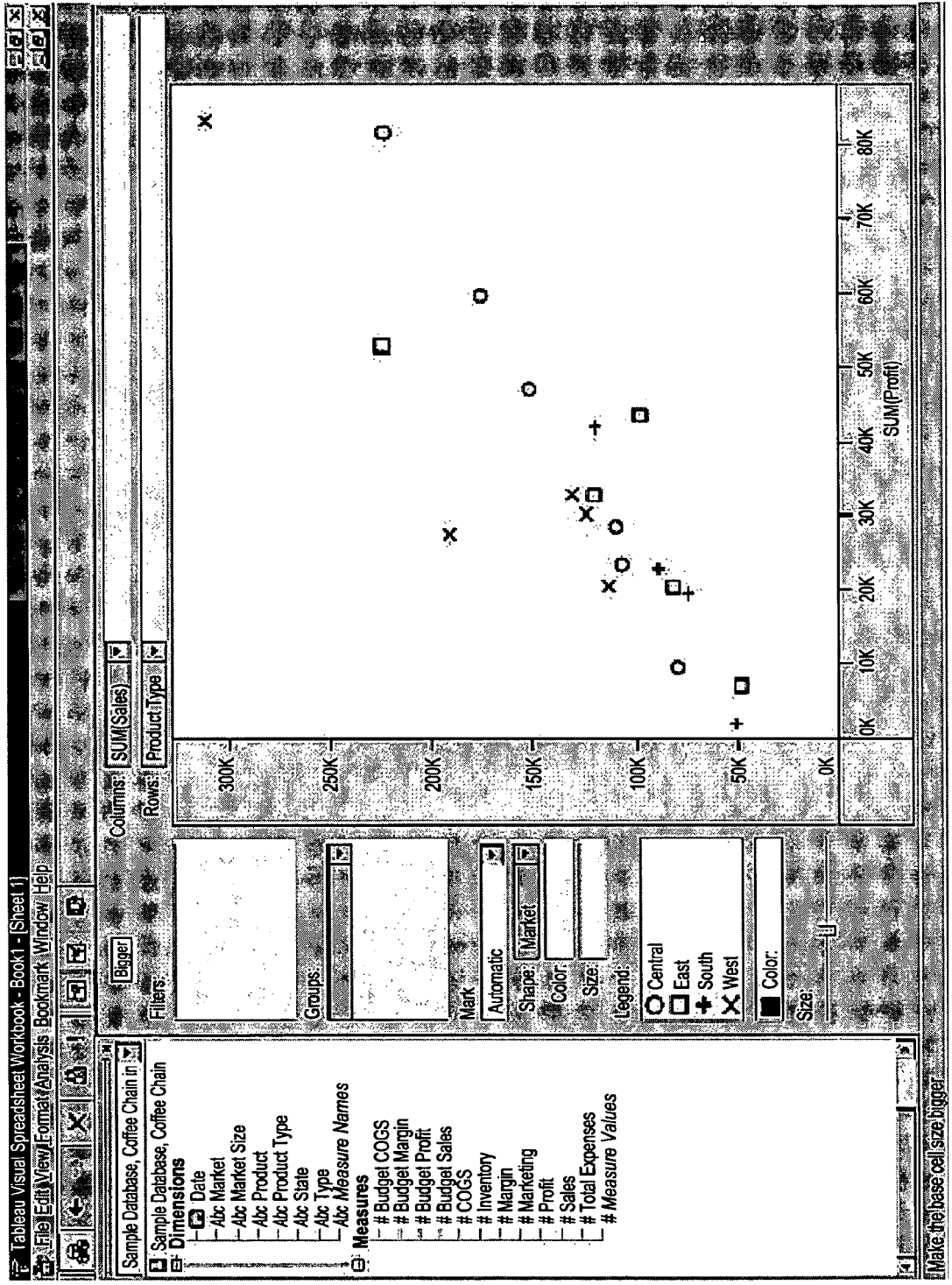

For a pane type QQ, see FIG. 2D, the display is a scatter-plot, and each tuple is represented by a shape in the plot. For example, in FIG. 2D, a cross (x), a circle (O), and a square (□) are all examples of marks.

Figure 2E:
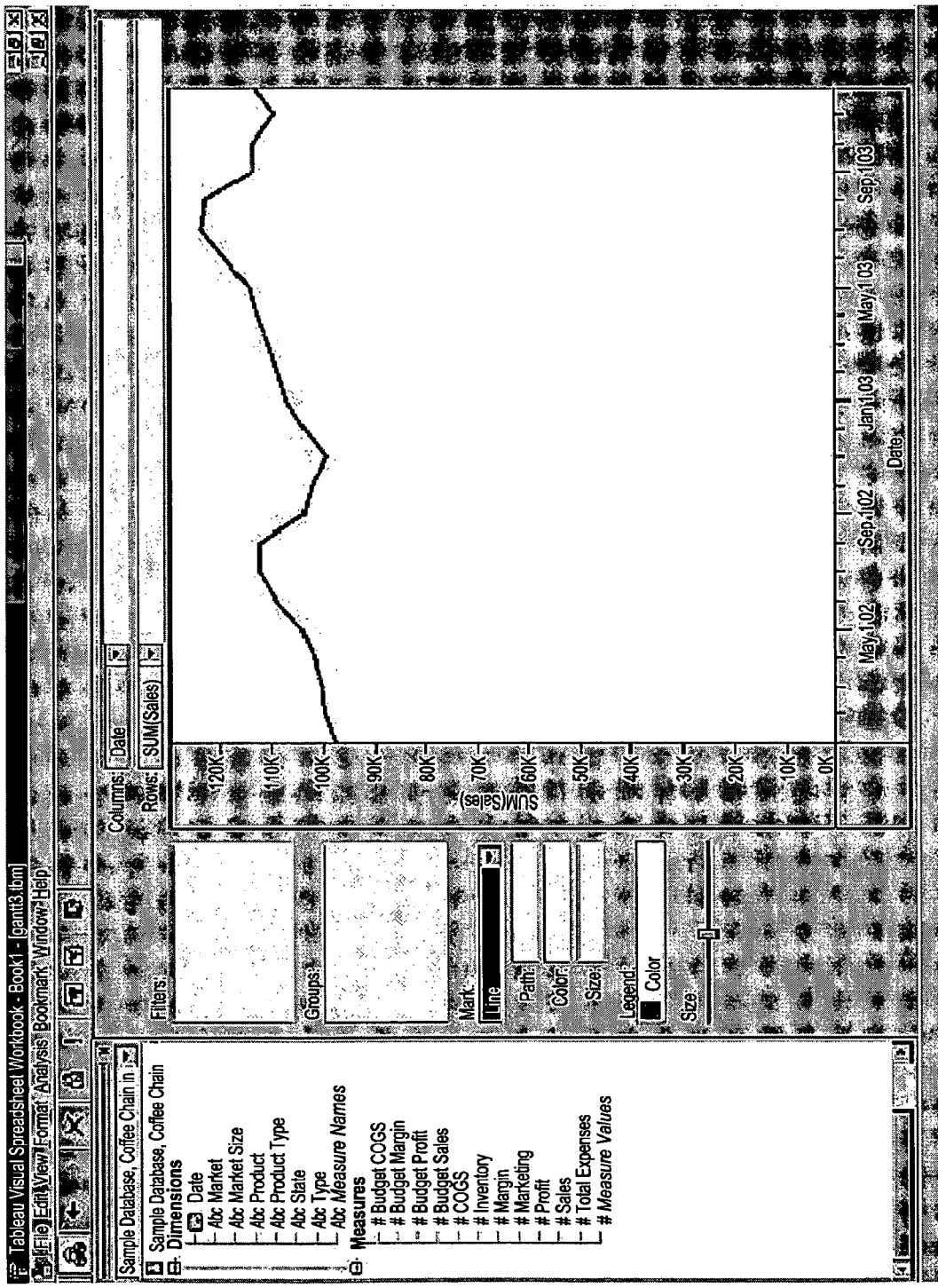

For a pane type QT or TQ, see FIG. 2E, the display is a line graph. The mark is a line that connects each adjacent tuple.

Figure 2F:
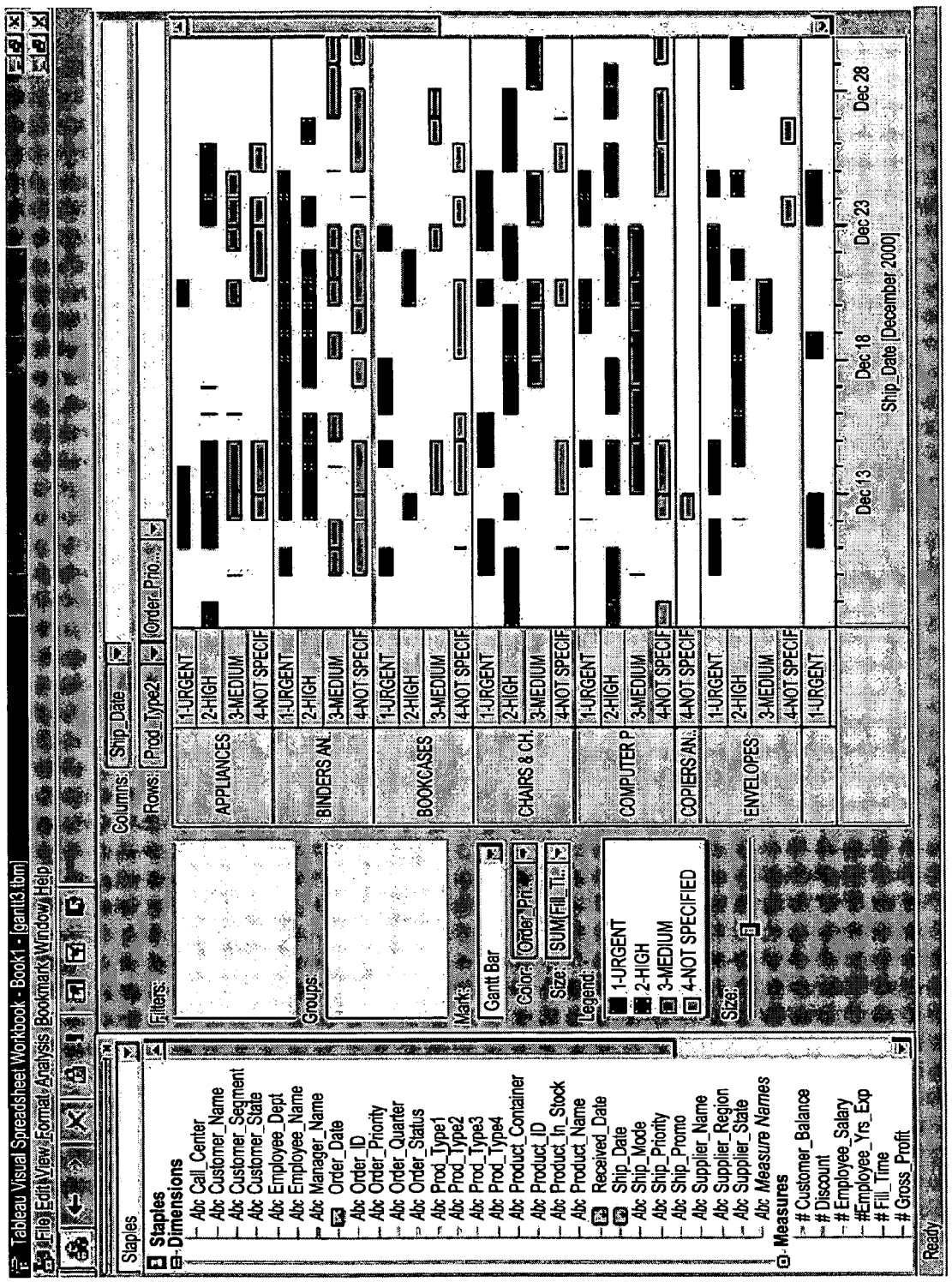

For a pane type OT or TO, see FIG. 2F, the display is a Gantt chart. Such a chart displays time along one axis. For each category, the associated mark is a bar whose length denotes the duration of an event, and whose position relative to the time axis denotes the start and end time of the event.

Figure 2G:
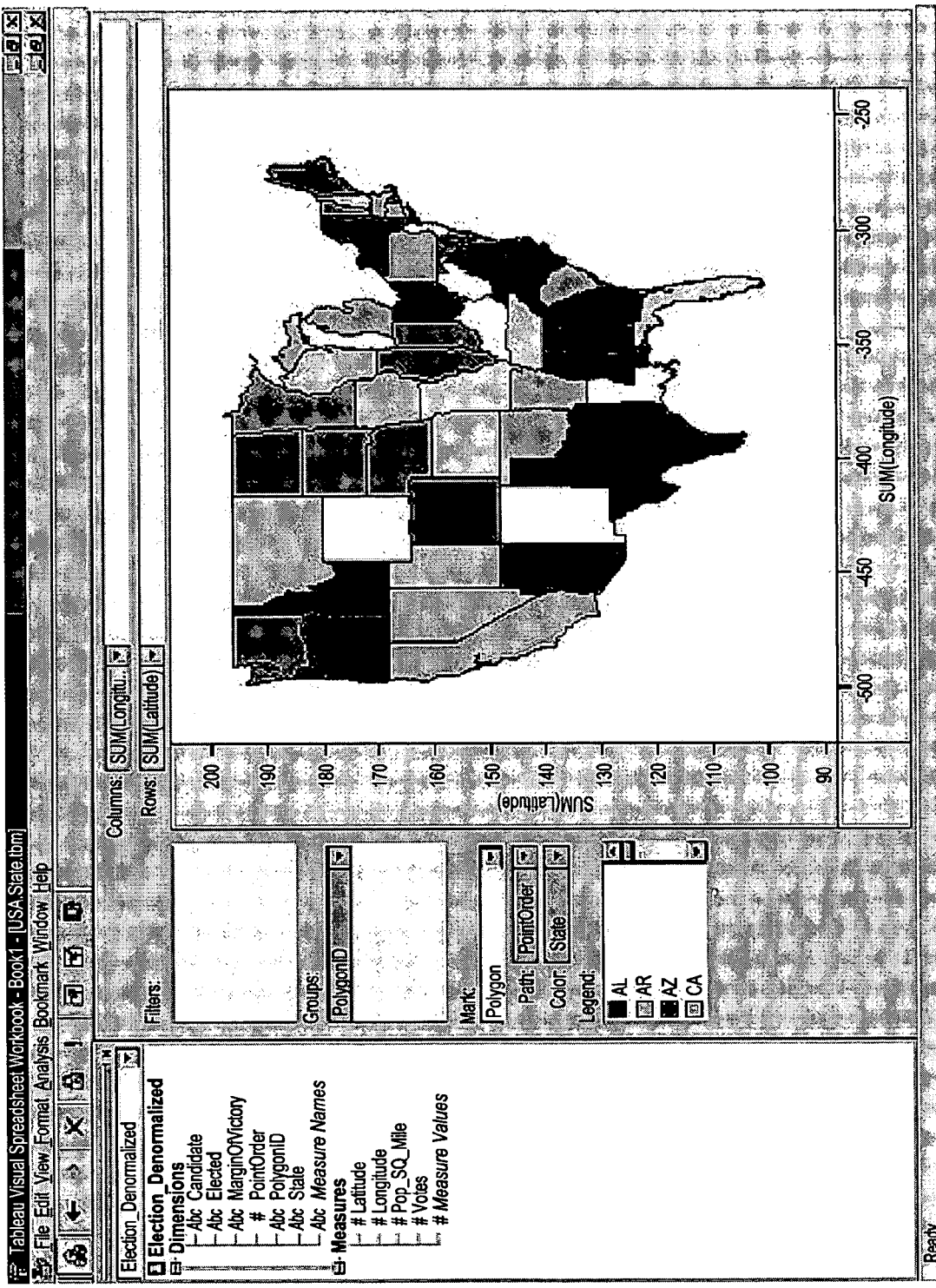

For a pane type based on geographic variables which are usually expressed as two coordinates, the display may be a map, see, e.g., FIG. 2G. In such cases, a mark is a map symbol such as a line, point, curve, area, or an icon. An icon may be exemplified in the following way: if the map is state-map, icons can be: city and town symbols for towns of different size and importance; symbol designating a site of historic interest; symbol designating a recreational area; and a symbol designating an airport. In a preferred embodiment, the choice of map symbol may be governed by still further rule sets. Each of the types of map symbol may further be colored according to the same or other rules.

It is also consistent with the methods of the present invention that multi-dimensional displays are permitted. In such situations, a pane type is assigned based on the type of more than two axis and presentations that can be used include, but are not limited to: 3-dimensional bar charts; projections of multi-dimensional representations to 2 dimensions; holographic representations; and representations using virtual reality methods.

It is preferable that the visual plot of the present invention is organized according to a visual specification. Such a specification is preferably expressed in a graphical presentation language, and is preferably chosen by the user. The specification further preferably is expressed using an algebraic expression based on the fields and includes an operand.

EXEMPLARY EMBODIMENTS

Illustrative Types of Database Organization

The methods of the present invention are susceptible to use with any manner of dataset and any manner of database structure. It can be assumed that the term dataset includes any form of data including a database. Commonly found database structures are further described herein. It is not intended that such descriptions limit the scope of the present invention.

Databases have typically been used for operational purposes such as online transaction processing (OLTP), including order entry, accounting and inventory control. More recently, corporations and scientific projects have been building databases, called data warehouses or large on-line analytical processing (OLAP) databases, explicitly for the purposes of exploration and analysis.

The "data warehouse" can be described as a subject-oriented, integrated, time-variant, nonvolatile collection of data in support of management decisions. The key aspect of the data warehouse is that it is a repository for analytic data rather than transactional or operational data. The data contained in the data warehouse usually represents historical data, e.g., transactions over time, about some key interest of the business or project. This data is typically collected from many different sources such as operational databases, simulations, data collection tools (e.g., tqdump), and other external sources.

Data warehouses are typically structured as either relational databases or multidimensional data cubes. For more information on relational databases and multidimensional data cubes, see, e.g., Berson and Smith, *Data Warehousing, Data Mining and OLAP*, McGraw-Hill, New York (1997); Freeze, 2000, *Unlocking OLAP with Microsoft SQL Server and Excel* 2000, IDG Books Worldwide, Inc., Foster City, Calif.; and Thomson, *OLAP Solutions: Building Multidimensional Information Systems*, Wiley Computer Publishing, New York, (1997). Thus the present invention provides visualization techniques for the exploration and analysis of multidimensional analytic data stored in a database such as a data warehouse.

Hierarchical Databases

It will be appreciated that the present invention is not limited to databases that have a formal hierarchical structure. Nevertheless, imposing meaningful hierarchical structure on large databases provides levels of abstraction that can be leveraged by both the computer and the analyst. These hierarchies can come from several different sources. Some hierarchies are provided by the inherent nature of the database. Data mining algorithms, such as decision trees and clustering techniques that classify the data and thereby automatically derive hierarchies can also be used to determine database hierarchy and may find application in conjunction with the methods of the present invention. See, for example, Thearling, et al., "Visualizing Data Mining Models" in *Information Visualization in Data Mining and Knowledge Discovery*, Fayyad, Grinstein and Wierse, eds., Morgan Kaufman, (2001), which is hereby incorporated by reference in its entirety.

Figure 3:
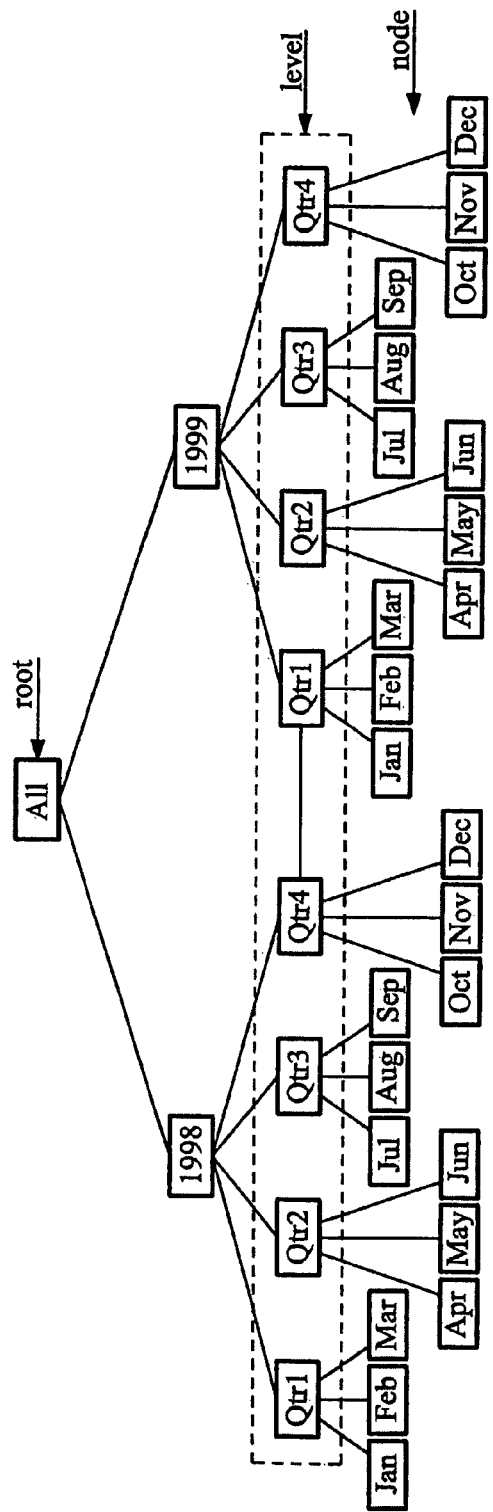
FIG. 3 illustrates a hierarchy for time.

Most dimensions in hierarchical databases have a hierarchical structure. For example, rather than having a single dimension "state", a hierarchical dimension "location" that has three levels, one each for country, state, and county, can be used. Then, an analyst can aggregate the measures of interest to any of these levels. The aggregation levels are determined from the hierarchical dimension, which is structured as a tree with multiple levels. The tree forms a set of parent-child relationships between the domain values at each level of detail. These relationships are the basis for aggregation, drill down, and roll up operations within the dimension hierarchy. The highest level is the most aggregated and the lowest level is the least aggregated. Each level corresponds to a different semantic level of detail for that dimension. Within each level of the tree, there are many nodes, with each node corresponding to a value within the domain of that level of detail of that dimension. FIG. 3 illustrates hierarchy for a time dimension. Within the time dimension, there are four levels: "All", "year", "quarter", and "month".

A common way to represent hierarchical databases is using the technique of star schemas or snowflake schemas. The snowflake and star schema provide a conceptual multidimensional view of such a database. Simple hierarchies, like the one shown in FIG. 3, are commonly modeled using a star schema. The entire dimensional hierarchy is represented by a single dimension table joined to a base fact table. In this type of hierarchy, there is only one path of aggregation. However, there are more complex dimension hierarchies in which the aggregation path can branch. For example, a time dimension might aggregate from Day to both Week and Month. These complex hierarchies are typically represented using the snowflake schema, which uses multiple relations (tables) to represent the diverging hierarchies.

Figure 4:
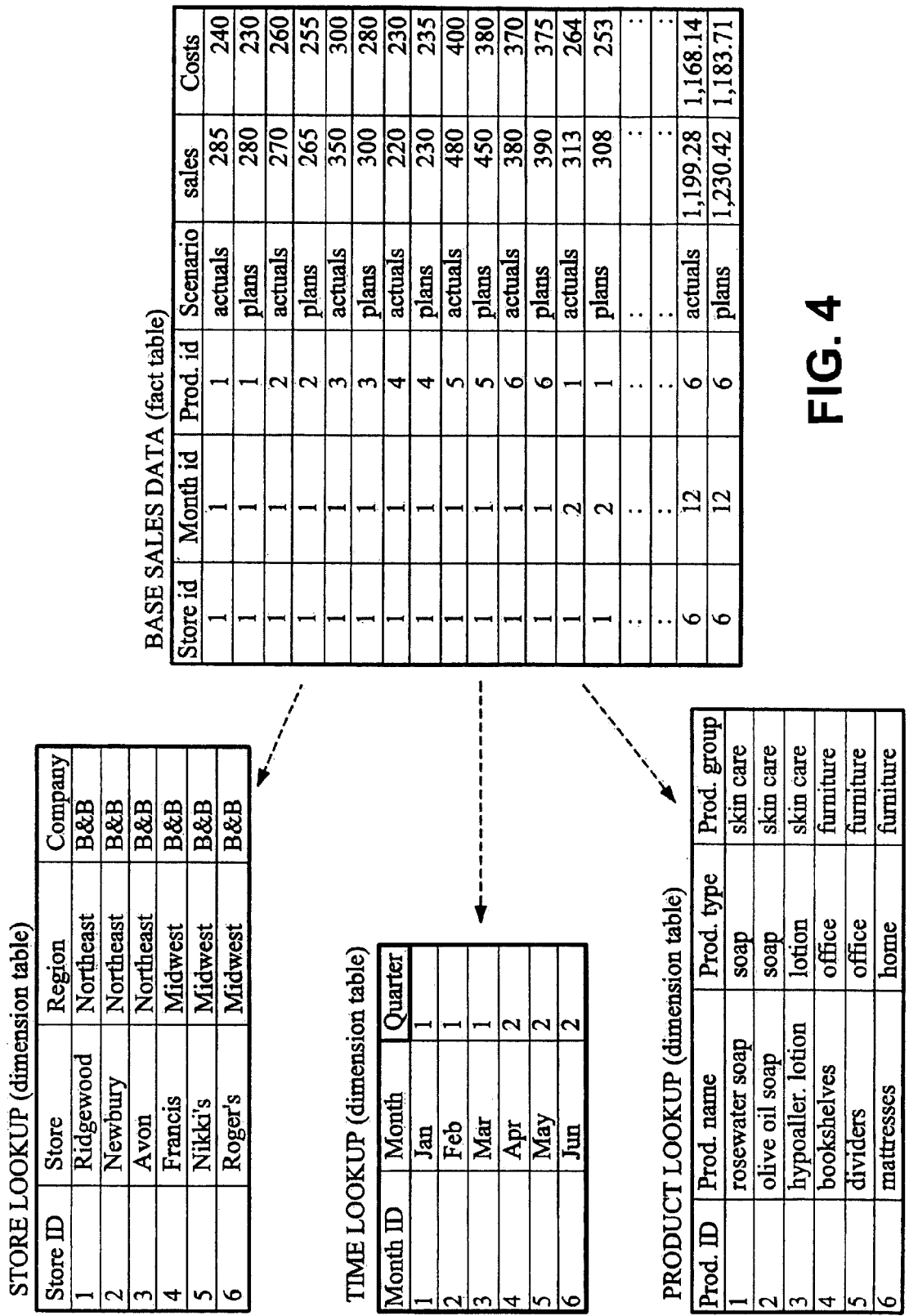
FIG. 4 illustrates a star schema for a database.
Figure 5:
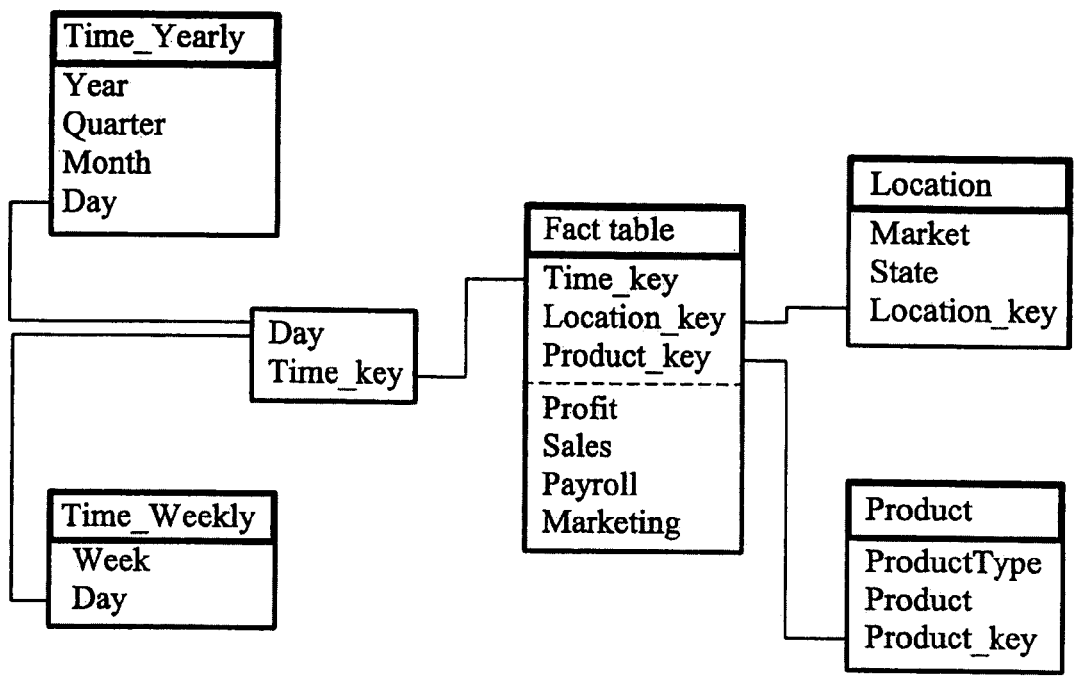
FIG. 5 illustrates a snowflake schema for a database.

Each schema has a fact table containing data items of interest (measures) in the analysis for which the database is built. These data items might be transaction amounts such as the amount invested in a mutual fund or the profit on a sales transaction. The fact table is surrounded by dimension tables containing detailed information used to summarize the fact table in different ways. The database is a core set of measures characterized by a number of dimensions rather than a set of interrelated tables. This organization correlates directly with the typical analysis query that summarizes a few quantitative attributes (or measures), such as profit or sales, by several characterizing attributes (or dimensions) such as product, location, or date over a large number of tuples. The primary differences between the star and snowflake schema arise in how they model hierarchical structures on the dimensions. An illustration of a star schema is provided in FIG. 4. The table schema of FIG. 4 is called a star schema because the central fact table (the base sales data table) is depicted as surrounded by each of the dimension tables (a lookup table) that describe each dimension. FIG. 5 illustrates a snowflake schema that includes hierarchy.

The columns representing stores, weeks, and products in the fact table in FIG. 4 contain numeric values. Fact tables can grow to huge numbers of rows. The lookup tables contain hierarchy information relating each store, week, and product with its higher-level aggregations. For example store 1 in the base table of FIG. 4 connects with the "Store Lookup" table where it has the name Ridgewood and rolls up to the Northeast region. Product 2 in the base table connects with the "Product Lookup" table where it has the name olive oil soap and rolls up into the product type soap in the skin care products group. See, e.g., Thomsen, *OLAP Solutions. Building Multidimensional Information Systems*, Wiley Computer Publishing, New York, (1997), which is hereby incorporated by reference in its entirety.

When referring to values within a dimension hierarchy, a "dot" notation can be used to specify a specific path from the root level (e.g., "All" in FIG. 3) of the hierarchy down to the specified value. Specifically, to refer to a value on level m of a hierarchy, the dimension name is first optionally listed, then zero or more of the (m−1) intermediate ancestor values, and then finally the value on the $m^{th}$ level, all separated by periods. For example, in the dot notation the Jan node on the Month level in the time hierarchy that corresponds to January, 1998, can be referred to as 1998.Qtr1.Jan.

Advantageously, in preferred computer systems, computer program products, for use with the methods of the present invention, a dimension can be displayed on more than one axis of the graphic. More specifically, levels in a dimension can span multiple axes, group bys, and visual encodings. Furthermore, levels (e.g., quarter, month) within dimensions are not constrained to their natural hierarchical order. In fact, levels defined in a hierarchy can be skipped.

Relational Databases

The methods of the present invention also find application to relational databases or relational warehouses. Relational databases organize data into tables where each row corresponds to a basic entity or fact and each column represents a property of that entity. See, for example, Thomsen, *OLAP Solutions. Building Multidimensional Information Systems*, (1997), Wiley Computer Publishing, New York. For example, a table may represent transactions in a bank, where each row corresponds to a single transaction, and each transaction has multiple attributes, such as the transaction amount, the account balance, the bank branch, and the customer. The table is referred to as a relation, a row as a tuple, and a column as an attribute or field. The attributes within a relation can be partitioned into two types: dimensions and measures. Dimensions and measures are similar to, respectively, independent and dependent variables in traditional analysis. For example, the bank branch and the customer would be dimensions, while the account balance would be a measure. A single relational database will often describe many heterogeneous but interrelated entities. For example, a database designed for a coffee chain might maintain information about employees, products, and sales. The database schema defines the relations (tables) in a database, the relationships between those relations, and how the relations model the entities of interest. It is possible to create dimension tables and star schemas in relational warehouses.

Data Cubes

A data warehouse can be constructed as a relational database using either a star or snowflake schema and will provide a conceptual model of a multidimensional data set. However, the typical analysis operations such as summaries and aggregations are not well supported by the relational model. The queries are difficult to write in languages such as SQL and the query performance is not ideal. As a result, typically, the fact tables and dimension tables are not used directly for analysis but rather as a basis from which to construct a multidimensional database called a data cube.

Figure 6:
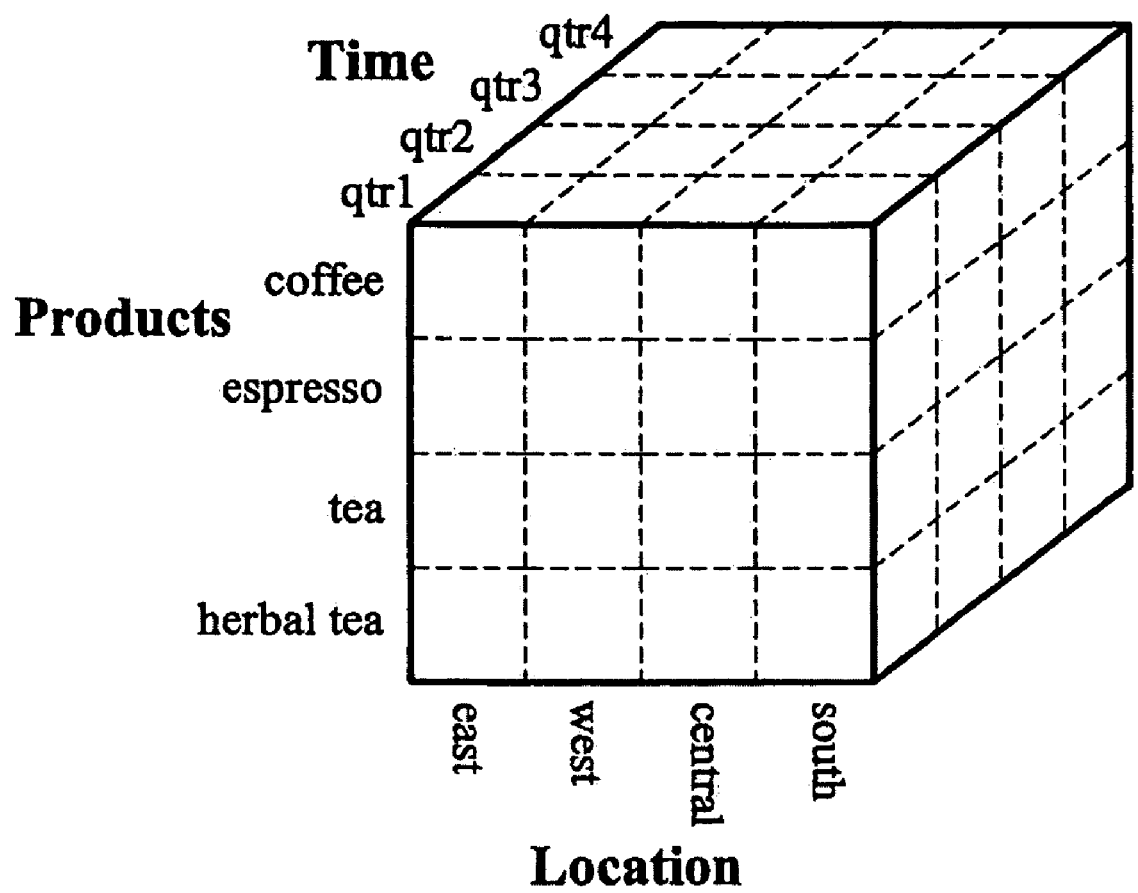
FIG. 6 illustrates a data cube for a hypothetical coffee chain in which each axis in the data cube corresponds to a level of detail for a dimension (product, location, time) in a database schema.

Each axis in the data cube corresponds to a dimension in the relational schema and consists of every possible value for that dimension. For example, an axis corresponding to states of the United States would have fifty values, one for each state. Each cell in the data cube corresponds to a unique combination of values for the dimensions. For example, if there are two dimensions, "State" and "Product", then there would be a cell for every unique combination of the two, e.g., one cell each for (California, Tea), (California, Coffee), (Florida, Tea), (Florida, Coffee), etc. Each cell contains one value per measure of the data cube. So if product production and consumption information is needed, then each cell would contain two values, one for the number of products of each type consumed in that state, and one for the number of products of each type produced in that state. FIG. 6 illustrates a data cube for a hypothetical nationwide coffee chain data warehouse where the data has dimensions of product, sales period, and region. Each cell in the data cube summarizes all measures in the base fact table for the corresponding values in each dimension.

Figure 7:
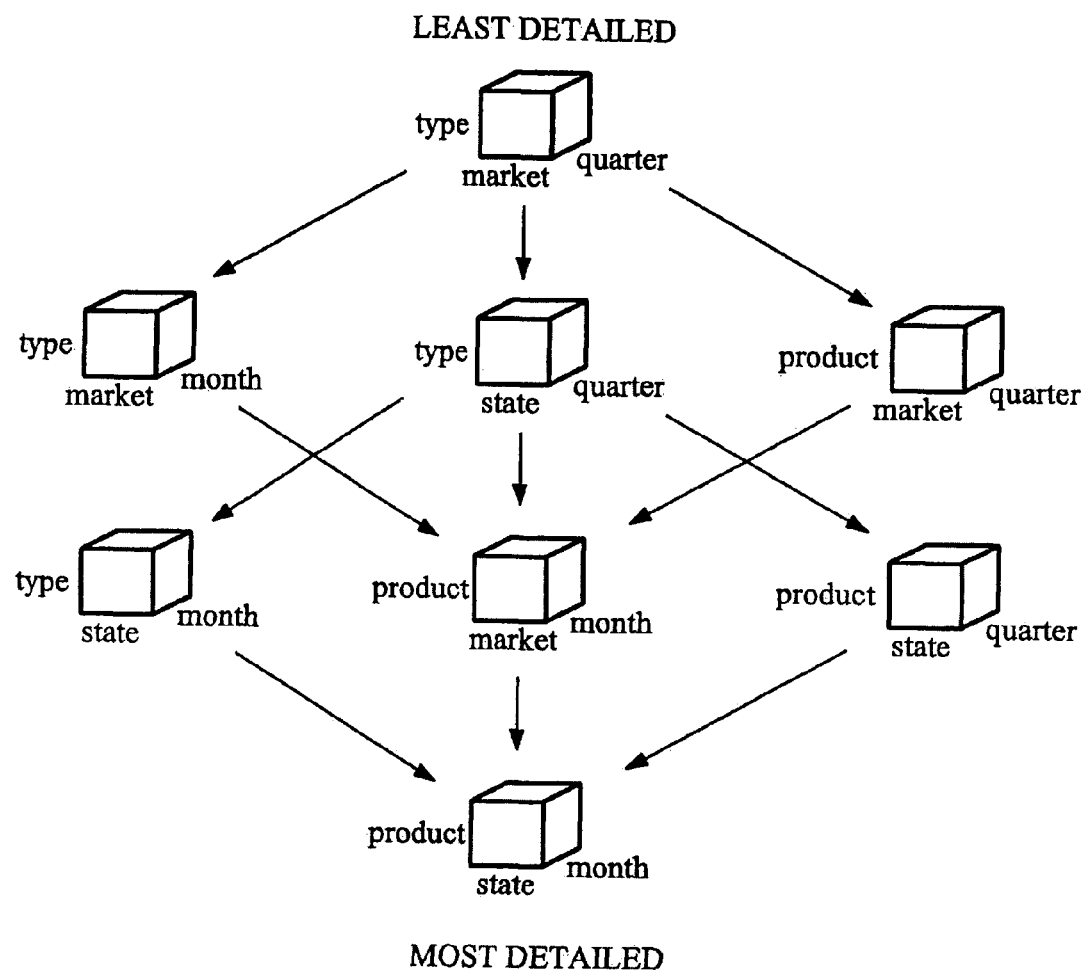
FIG. 7 illustrates a lattice of data cubes for a particular database schema in which each dimension has a hierarchical structure.

Dimensions within a data warehouse are often augmented with a hierarchical structure. The preferred systems and methods for use with the present invention use these hierarchies to provide tools that can be used to explore and analyze the data cube at multiple meaningful levels of aggregation. Each cell in the data cube then corresponds to the measures of the base fact table aggregated to the proper level of detail. If each dimension has a hierarchical structure, then the data warehouse is not a single data cube but rather a lattice of data cubes, where each cube is defined by the combination of a level of detail for each dimension (FIG. 7). In FIG. 7, the hierarchical structure of each dimension (time, product, location) defines the lattice of cubes. Within the lattice, each cube is defined by the combination of a level of detail for each dimension. The cubes at the bottom of the lattice contain the most detailed information whereas the cubes at the top of the lattice are the most abstract.

Multidimensional databases are structured as n-dimensional data cubes. Each dimension in the data cube corresponds to one dimension in the relational schema (e.g., in the star schema, or the snowflake schema). Each cell in the data cube contains all the measures in the relational schema corresponding to a unique combination of values for each dimension. The dimensions within a data cube are often augmented with a hierarchical structure. This hierarchical structure can be derived from the semantic levels of detail within the dimension or generated from classification algorithms. Using these hierarchies, the analyst can explore and analyze the data cube at multiple meaningful levels of aggregation calculated from a base fact table (e.g., a relation in the database with the raw data). Each cell in the data cube now corresponds to the measures of the base fact table aggregated to the proper level of detail.

The aggregation levels are determined from the hierarchical dimensions. Each dimension is structured as a tree with multiple levels. Each level corresponds to a different semantic level of detail for that dimension. Within each level of the tree there are many nodes. Each node corresponds to a value within the domain of the level of detail that the node is in. The tree forms a set of parent-child relationships between the domain values at each level of detail.

Multidimensional Analysis Operations

In some embodiments, a database is typically quite large, comprising many dimensions each with hierarchical structure and often many members. To navigate the resulting lattice of data cubes and perform dimensional reduction to extract data for analysis, there are a number of multidimensional analysis operations that can be used in conjunction with the methods of the present invention.

Drill down refers to the process of navigating through the lattice of data cubes in the direction of more detail. It is a technique used to break one piece of information into smaller and more detailed parts.

Roll up is the inverse of drill down, and aggregates detailed data into coarser elements.

Figure 8:
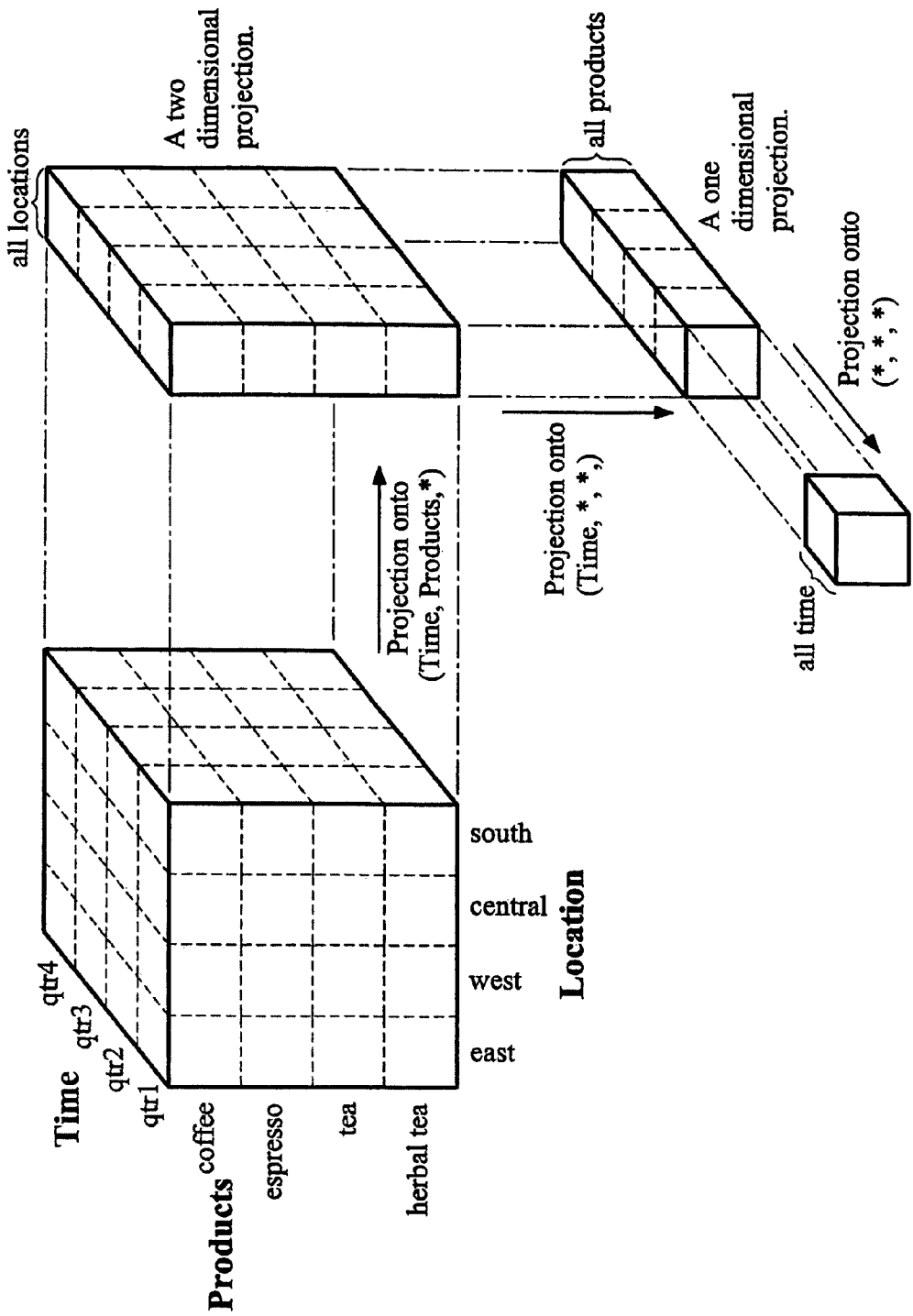
FIG. 8 illustrates the projection of a 3-dimensional data cube thereby reducing the dimensionality of the data cube by aggregating across dimensions that are not of interest to an analysis.
Figure 9:
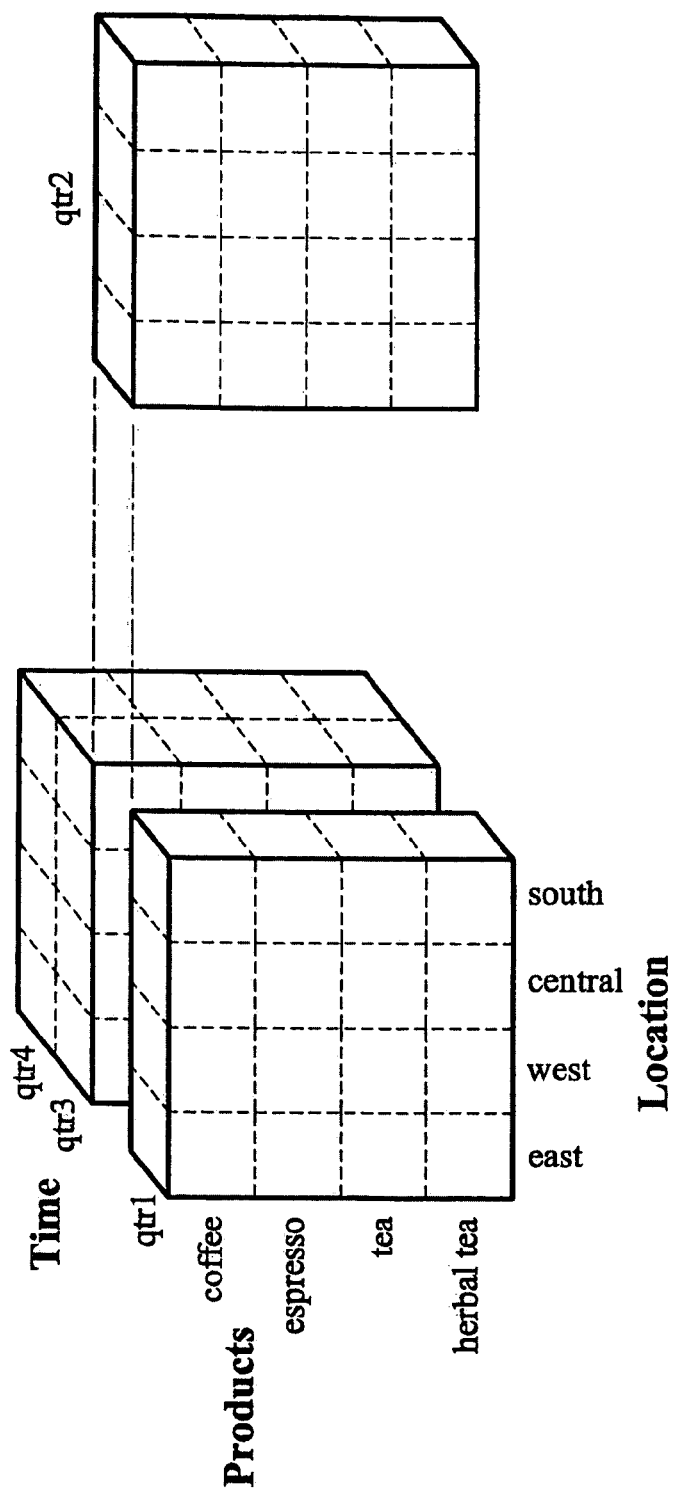
FIG. 9 illustrates the construction of a slice of a data cube by filtering the members of one or more dimensions of the cube.

Projection (illustrated in FIG. 8) reduces the dimensionality of an n-dimensional data cube to (n−1) dimensions by aggregating across a dimension. For example, in FIG. 8, the first projection summarizes across "Location", reducing the 3-dimensional cube to a 2-dimensional cube.

Where projection reduces dimensionality via aggregation, slicing (illustrated in FIG. 9) reduces dimensionality by filtering a dimension to a single value. In other words, one dimension is held constant to generate a slice across that dimension. In the example illustrated in FIG. 9, a two-dimensional slice corresponding to data for "Qtr 2" has been taken from the "Time" dimension.

Data Characterization for Visualization

For the purposes of visualization, more about an attribute than is usually captured by a database system is often needed. Databases typically provide limited information about a field, such as its name, whether a field is a dimension or measure, and its type (e.g., time, integer, float, character).

In some embodiments of the present invention, a determination is made as to whether a database field (operand) is nominal, ordinal, or quantitative in order to determine how to encode the field in a visual table using visual properties. Representative visual properties include, but are not limited to, color, size, or position. This includes regular black text appearing in tables like Pivot Tables. This characterization is based on a simplification of Stevens' scales of measurement. See Stevens, *Science,* 103, 677-680, (1946). In some embodiments, this characterization is further simplified depending upon whether the context emphasizes the difference between discrete data and continuous data or if the context emphasizes whether the field has an ordering. In one example, when encoding a field spatially, emphasis is on whether a field has discrete values. Furthermore, when a field is assigned to an axis, it has an ordering. Thus, in this context, nominal fields that do not normally have an ordering are assigned one and then treated as an ordinal field in some embodiments of the present invention. The resulting characterization is called categorical.

In contrast, when assigning visual properties such as color to a field, the important distinguishing characterization is order. In this context, the ordinal and quantitative fields are treated as a single characterization and nominal fields are considered separately, in some embodiments of the present invention. In addition, attributes have associated units and semantic domains. For example, attributes can encode time, geographic units such as longtitude and latitude, or physical measurements. If this information is available, it can also be used to generate more effective visual encodings and aid in determining the geometry (e.g., aspect ratio) of a visual table. For example, knowing that the x and y axes of a visual table correspond to latitude and longitude, rather than profit and sales, will affect the determination of the appropriate geometry and depiction.

Databases also typically only store the current domain of a field (e.g., the values that currently exist within the database)

without any ordering. However, for analysis it can be important to understand the actual domain of a field, such as the possible values and their inherent (if applicable) ordering. To encode an attribute as an axis of a visual table, all possible values and their ordering are needed so that an indication of when data is missing can be made and to present data within its semantic context rather than using some arbitrary ordering, e.g., alphabetic. In some embodiments, this additional data characterization is captured in an attribute file that is associated with the database.

Data Exploration of Databases

The methods of the present invention are applicable to many visualization and data analysis tools known in the art. In some instances such tools require modification in order to benefit from features of the instant invention, but such modifications would be within the capability of one of ordinary skill in the art.

One tool is Polaris. See, for example, Stolte, Tang, and Hanrahan, *IEEE Transactions on Visualization and Computer Graphics* 8, (2002). Polaris is built upon an algebraic formalism for constructing visualizations of relations. The state of the user interface is a visual specification. This specification is interpreted according to the formalism to determine both the series of queries necessary to retrieve the requested data, as well as the mapping and layout of the resulting tuples (rows of data in the database) into graphical marks.

Other tools in the field to which the instant invention is applicable can be broken down into two categories: the visual exploration of databases; and the use of data visualization in conjunction with data mining algorithms.

Tools for the visual data exploration of databases include: VQE (Merthick et al., 1997, "An Interactive Visualization Environment for Data Exploration," *Proc. of Knowledge Discovery in Databases*, pp. 2-9), Visage (Roth et al. 1996, "Visage: A User Interface Environment for Exploring Information" in *Proceedings of Information Visualization*, p. 3-12), DEVise Livny et al., 1997, "DEVise: Integrated Querying and Visual Exploration of Large Datasets" in *Proc. of ACM SIGMOD*), and Tioga-2 (Woodruff et al., 2001, *J. Visual Languages and Computing*, Special Issue on Visual Languages for End-user and Domain-Specific Programming 12, p. 551-571). Other exemplary tools are: XmdvTool (Ward, 1994, "XmdvTool: Integrating multiple methods for visualizing multi-variate data," *Proceedings of IEEE Visualization*, pp. 326-336), Spotfire (BioNorth, Ottawa, Ontario, Canada, November, 2002), Xgobi (Buja et al., 1-996, Journal of Computational and Graphical Statistics 5, p. 78-99) and the visualization system, VisDB (Keim and Kriegel, 1994, *IEEE Computer Graphics and Applications*, 14, p. 40-49).

Tools for visualization and data mining that may be used with the present invention include SGI's MineSet (Brunk et al., "MineSet: an integrated system for data mining," Proceedings of the 3$^{rd}$ International Conference on Knowledge Discovery and Data Mining, p. 135-138) that incorporates techniques for displaying decision trees, Bayesian classifiers, and decision table classifiers.

Other visualization systems for use with the present invention are table-based displays. Static table displays such as scatterplot matrices (Hartigan, *Journal of Statistical Computation and Simulation*, 4, pp. 187-213) and Trellis displays (Becker, *Displays: A Multi-Dimensional Data Visualization Tool for Data Mining*, Third Annual Conference on Knowledge Discovery in Databases, August 1997) have been used extensively in statistical data analysis and may be adapted to the methods of the present invention.

Similarly, interactive table displays are also compatible with the present invention. For example, pivot tables allow analysts to explore different projections of large multi-dimensional datasets by interactively specifying assignments of fields to the table axes. However, pivot tables are limited to text-based displays.

Dynamic displays such as the Table Lens (Rao and Card, The Table Lens: Merging Graphical and Symbolic Representations in an Interactive Focus+Context Visualization for Tabular Information, In Proc. of SIGCHI 1994, pp. 318-322) and FOCUS visualization system (Spenke et al. FOCUS: The Interactive Table for Product Comparison and Selection. In Proc. of the ACM Symposium on User Interface Software and Technology, November 1996) provide table displays that present data in a relational table view, using simple graphics in the cells to communicate quantitative values and are also suitable for use with the present invention.

Although all of these visualization tools have certain drawbacks, they do lend themselves to a process of selecting and identifying marks according to the methods described herein. Furthermore, although these tools have been mentioned explicitly, it is not intended that the methods of the present invention be limited to these specific instances.

Overview of a Preferred Embodiment

An example of a preferred embodiment of a graphical user interface that provides the functionality of the present invention is shown in FIG. 10.

Conceptual Data Flow

Conceptual data flow in accordance with a preferred embodiment of the present invention can be illustrated in connection with FIG. 10 in which a query is run across a database and the results are displayed in panes using marks that are determined for the user. Exemplary steps are provided in FIGS. 11 and 12. As well as defining visual table 720 structure, the algebraic expressions of the visual specification (formed on shelves 708-4, and 708-5) define which tuples of the database should be selected and mapped into each pane 722. When a specification is interpreted, in one embodiment, one or more queries are generated to retrieve tuples from the database (FIG. 11, step 608; FIG. 12, step 1802). The resulting tuples are partitioned into layers and panes (FIG. 12, step 1804). Then, tuples within each pane are grouped, sorted and aggregated (FIG. 12, step 1806). Once the tuples have been sorted into panes 722, they are then mapped to graphic marks according to a rule-set that uses the types of the fields on the axes of the panes to generate a perceivable display (FIG. 12, step 1808).

Of particular interest in the preferred embodiment of FIG. 10 are the Row and column shelves 708-4, and 708-5. The column shelf contains the fields ProductType and Profit; the row shelf contains the fields Quarter and Sales. Note that the fields on the shelves are shaded differently. The lefthand items representing ProductType and Quarter are categories and the righthand items representing Profit and Sales are numeric quantities.

The basic operation of a visual spreadsheet that can support the present invention is to allow the user to specify a picture of a database by creating clauses in the declarative language. In the system shown in FIG. 10, this can be done by dragging fields from the database scheme on the left to various shelves in the application. The contents of the shelves form the clauses in the language. This language statement defines the desired picture.

An aspect of this preferred embodiment is a language for describing pictures of data stored in relational databases and data cubes. A key aspect of this language is a table algebra, an example of which is further described herein. The table algebra uses expressions and formulas to describe the layout of the rows and columns of a graphical table.

It would be understood by one of ordinary skill in the art that many table algebras are suitable for use with the present invention. In a preferred embodiment, table algebra expressions contain algebraic operators such as concatenation (+), Times (×), and Divide (/). Times stands for the cross-product; and Divide stands for nest. Fields from the database represent sets corresponding to the domain of that field in the database. For example, for a category like ProductType, the domain set contains the various types of products such as {Coffee, Espresso, Herbal Tea, Tea}. The cross operator forms the cross-product of these sets. So, ProductType×Profit creates the following set {(Coffee, Profit), (Espresso, Profit), (HerbalTea, Profit), (Tea, Profit)}. More complicated sets may be formed using more complicated expressions.

The contents of the row and column shelves are used to form expressions in the table algebra. In the example shown, the Row shelf causes the following expression to be formed: ProductType×Profit.

In this preferred embodiment, the sets resulting from row and column table algebra expressions are used to partition the canvas into headers, axes, panes and cells. Numeric quantities results in axes; categorical quantities result in headers. A pane is defined by the innermost row and column field. In the example in FIG. 10, the innermost row and column fields are Profit and Sales, respectively.

In some embodiments, a query is run before making the visual representation. The result of running the query is to retrieve a set of tuples from the database. In any case, the tuples selected for display are then partitioned into panes. Each tuple in a pane is then mapped to a mark according to a rule set and the properties of the mark are set.

An Exemplary System for Determination of Marks

Presented herein is an exemplary system for determining suitable marks for visualizing database records, such as those retrieved from queries. The system can be used to visualize database records using the methods of the present invention. This is merely an exemplary system however. The data visualization methods of the present invention are not limited to the visualization of database query results. The data visualization methods of the present invention can be used to visualize any form of data that can be displayed in a variety of ways.

Figure 13:
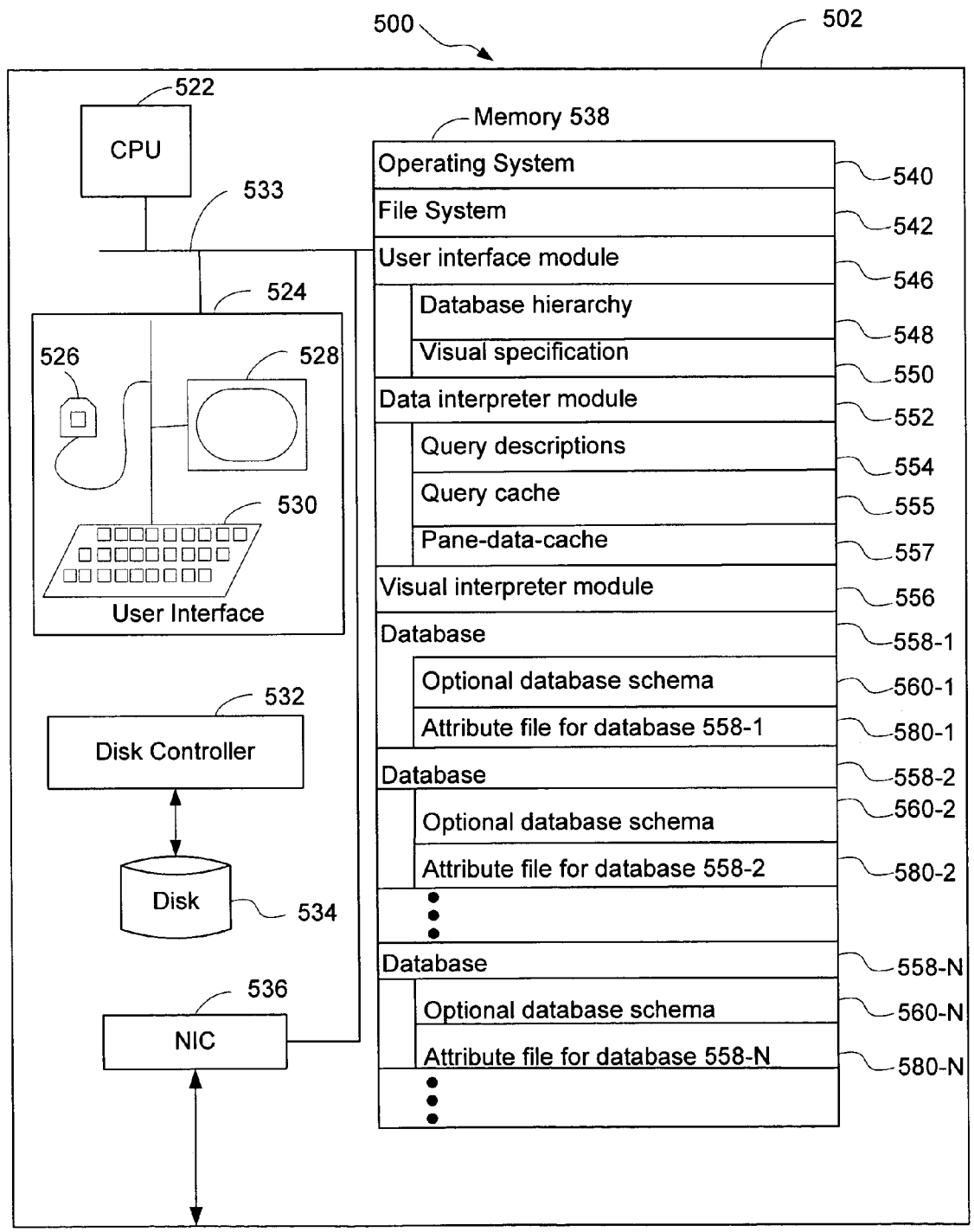
FIG. 13 illustrates a computer system that facilitates display of data in databases in accordance with one embodiment of the present invention.

FIG. 13 shows a system 500 that facilitates display of data in databases, such as data warehouses, in accordance with one embodiment of the present invention.

System 500 preferably comprises a computer 502 that includes: a central processing unit 522; a main non-volatile storage unit 534, preferably including one or more hard disk drives, for storing software and data, the storage unit 534 typically controlled by disk controller 532; a system memory 538, preferably high speed random-access memory (RAM), for storing system control programs, data, and application programs, including programs and data loaded from non-volatile storage unit 534; a user interface 524, including one or more input devices, such as a mouse 526, a keypad 530, and a display 528; an optional network interface card 536 for connecting to any wired or wireless communication network; and an internal bus 533 for interconnecting the aforementioned elements of the system. System memory 538 may also include read-only memory (ROM).

Operation of computer 502 is controlled primarily by operating system 540, which is executed by central processing unit 522. Operating system 540 can be stored in system memory 538. In addition to operating system 540, a typical implementation of system memory 538 includes: file system 542 for controlling access to the various files and data structures used by the present invention; user interface module 546 for obtaining a visual specification (specification) from the user (for constructing a visual table, comprised of one or more panes, by obtaining from a user a specification that is in a language based on the fields of database 558); and visual interpreter module 556 for processing database records and displaying these results in accordance with the specification (for associating a subset of the set of tuples or objects with a pane in the one or more panes). Memory 538 may also optionally include a data interpreter module 552 for formulating database queries based on the specification (for querying database 558 to retrieve a set of tuples or objects in accordance with the specification).

In a preferred embodiment, user interface module 546 includes a visual specification 550 that specifies a formalism that can be used to determine the exact analysis and query operations to be performed by the system. Module 546 may optionally include details of a database hierarchy 548.

In a preferred embodiment, data interpreter module 552 includes: one or more query descriptions 554 that are used to query databases; a query cache 555 that is used to store database query results; and a pane-data-cache 557 that is used to store a separate data structure for each pane 722 in a visual table 720 that is displayed by visual interpreter module 556.

System 500 also includes one or more databases 558. Optionally, a database has a database schema 560 associated with it. In general, database 558 is any form of data storage system, including but not limited to a flat file, a relational database, a hierarchical database, or an OLAP database. In one embodiment, a database 558 is OLAP data that can be viewed conceptually as a multidimensional data cube. In other embodiments, database 558 is a hierarchical OLAP cube. In some specific embodiments, database 558 comprises star schema that is not stored as a cube but has dimension tables that define hierarchy. Still further, in some embodiments, database 558 has a hierarchy that is not explicitly broken out in the underlying database or database schema (e.g., dimension tables are not hierarchically arranged). In some embodiments an attribute file 580 is associated with each database 558.

In typical embodiments, one or more of databases 558 are not hosted by computer 502. Rather, in typical embodiments, databases 558 are accessed by computer 502 using network interface connection 536.

It will be appreciated that many of the modules illustrated in FIG. 13 can be located on a remote computer. For example, some embodiments of the present application are web service-type implementations. In such embodiments, user interface module 546 can reside on a client computer that is in communication with computer 502 via a network (not shown). In some embodiments, user interface module 546 can be an interactive web page that is served by computer 502 to the client computer. Further, some or all of the components of visual interpreter module 556 can reside on the client computer so that the results of a query are displayed on the client computer. Thus, the present invention fully encompasses a broad array of implementations in which one or more users can explore one or more databases 558 using the techniques and methods of the present invention from a remote site. The illustration of the modules in FIG. 13 in a single central computer is merely presented to concisely illustrate certain software modules and data structures that are used in various embodiments of the present invention and in no way is limiting.

Those of ordinary skill in the art will appreciate that numerous other configurations are possible and all such configurations are within the scope of the present invention.

Table Algebra

The methods of the present invention benefit from use of a formal system for specifying graphics, or a language. There are many such languages that would suffice for practicing the present invention. For example, Wilkinson (*The Grammar of Graphics*, New York, Springer, (1999); U.S. Pat. No. 6,492,989) developed a language for describing traditional statistical graphs and proposed an interface for generating a subset of the specifications expressible within his language. Such a language could be used with the methods of the present invention.

Underlying such a language, in a preferred embodiment, is an algebra. Many algebras can usefully be employed for the purpose of enabling the present invention. Accordingly, it is to be understood that the algebra described herein is not the only such algebra that can be used to carry out the methods of the present invention.

As discussed herein, a table configuration can consist of three separate expressions. Two of the expressions define the configuration of the x- and y-axes of a visual table 720, partitioning the table into rows and columns. The third expression defines the z-axis of visual table 720, which partitions the display into layers of x-y tables that are composited on top of one another. The following description sets forth an algebra, including syntax and semantics, that can be used in these three expressions in preferred embodiments of the present invention. As discussed herein, each expression in this algebra is composed of operands connected by operators.

Operands

An operand is a dimension level or a measure/quantitative variable from the database schema (or other database metadata) that has been selected for inclusion in the algebraic expression. The operands in a preferred table algebra are the names of the fields (field operands) of the database 558 and the names of predefined constant sequences of p-tuples (constant operands). In some embodiments, the categorization of field types is reduced to ordinal and quantitative by assigning a default alphabetic ordering to all nominal fields and then treating them as ordinal. Thus, in such embodiments, there are three classes of operands: (1) ordinal field operands, (2) quantitative field operands, and (3) constant operands. Throughout the remainder of this description, the terms A and B represent ordinal field operands, P and Q represent quantitative field operands, C represents a constant operand, and X, Y, and Z represent expressions.

Set Interpretations

Set interpretations are assigned to each operand symbol in the following manner. Ordinal fields are assigned the members of the ordered domain of the field. Quantitative fields are assigned the single element set containing the field name. Constant operands are assigned their predefined set interpretation. Thus:

A=domain(A)=<(A:a), ..., (A:$a_n$)>

P=<(field:P)>

C=<(constant:c), ..., (constant:$c_m$)>

For simplicity of exposition, tags are not included in the remaining set interpretations within this description except where necessary.

The assignment of sets to field operands reflects the principal difference in how the two types of fields will be encoded in the structure of visual tables 720. Ordinal fields partition visual table 720 (and the database tuples) into rows and columns, whereas quantitative fields are spatially encoded as axes within panes 722.

Constant Operands

Constant operands define neither selection criteria nor spatial encodings. Instead, they can be used to generate additional rows without partitioning database tuples. This facilitates the layering of heterogeneous databases. In some embodiments, constant operands are treated as ordinal field operands by defining a virtual fact table and then defining operators relative to this virtual fact table. Let (C, ..., $C_n$) be a set of constant operands, $R_C$ be a relation with a single attribute ($C_i$) whose domain corresponds to the predefined set interpretation of $C_i$, and FT be the fact table for a database 558. The virtual fact table VFT is defined relative to the given set of constant operands as:

$$VFT = FT \times R_{C_1} \ldots \times R_{C_i}$$

This algebra contains one predefined constant operand, the empty sequence.

Filtering and Sorting of Field Operands

If a field is to be filtered (or sorted), the filtered and sorted domain is listed directly after the field operand in the expression, in effect specifying a set interpretation for the operand. Given an ordinal field A with domain (A)=<(a), ..., ($a_n$)>, the operand can be filtered and sorted within an expression by stating the filtered and sorted domain (<b, ..., $b_j$>, $b_i \in$ domain (A)) directly after the ordinal operand and the set interpretation is the listed domain:

$$A[b, \ldots, b_j] = <(b), \ldots, (b_j)>$$

Similarly, a filtered domain can be specified for a quantitative field by listing the minimum and maximum values of the desired domain. This information is included in the generated set interpretation:

$$P[min, max] = <(field:P[min, max])>$$

Having defined the operands and the generation of their set interpretations, the four operators in the algebra of the present invention can be defined.

Operators

As stated herein, a valid expression in the algebra is an ordered sequence of one or more operands with operators between each pair of adjacent operands. The operators in this algebra, in order of precedence, are dot (.), cross (×), nest (/), and concatenation (+). Parentheses can be used to alter precedence. Because each operand is interpreted as a sequence, the precise semantics of each operator is defined in terms of how it combines two sequences (one each from the left and right operands) into a single sequence. Definitions of the dot, cross, nest and concatenation operators are provided herein. The exact definitions provided are merely exemplary, and one of ordinary skill in the art would understand that other definitions that are consistent with the features of each operator are within the scope of the present invention.

Concatenation

The concatenation operator performs an ordered union of the set interpretations of the two operands and can be applied to any two operands or expressions:

$$A+B = <(a), \ldots, (a_n)> \cup <(b), \ldots, (b_m)> = <(a), \ldots, (a_n)>, <(b), \ldots, (b_m)>$$

$$P+Q = (P) > \cup <(Q) >= <(P), (Q)>$$

$$A+P = <(a), \ldots, (a_n)> \cup <(P)> = <(a), \ldots, (a_n), (P)>$$

$$P+A = <(P)> \cup <(a), \ldots, (a_n)> = <(P), (a), \ldots, (a_n)>$$

$$X+Y = <(x, \ldots, x_i), \ldots, (x_j, \ldots, x_{ik})> \cup <(y, \ldots, y_m), \ldots, (y_n, \ldots, y_{no})> = <(x, \ldots, x_i), \ldots, (x_j, \ldots, x_{ik}), (y, \ldots, y_m), \ldots, (y_n, \ldots, y_{no})>$$

The only algebraic property that holds for the concatenation operator is associativity:

$$(X+Y)+Z = (<(x, \ldots, x_i), \ldots, (x_j, \ldots, x_{ik})> \bigcup <(y, \ldots, y_m), \ldots, (y_n, \ldots, y_{no})>) \bigcup <(z, \ldots, z_p), \ldots, (z_q, \ldots, x_{qr})>$$

$$= <(x, \ldots, x_i), \ldots, (x_j, \ldots, x_{ik})> \bigcup (<(y, \ldots, y_m), \ldots, (y_n, \ldots, y_{no})> \bigcup <(z, \ldots, z_p), \ldots, (z_q, \ldots, x_{qr})>)$$

$$= X + (Y+Z)$$

The concatenation operator is not commutative because the ordered union of two sequences is not commutative.

Cross

The cross operator performs a Cartesian product of the sets of the two symbols:

$$A \times B = <(a), \ldots, (a_n)> \times <(b), \ldots, (b_m)> = <(a,b), \ldots, (a,b_m), \ldots, (a_n,b), \ldots, (a_n,b_m)>$$

$$A \times P = <(a), \ldots, (a_n)> \times <(P)> = <(a,P), \ldots, (a_n,P)>$$

$$X \times Y = <(x, \ldots, x_i), \ldots, (x_j, \ldots, x_{ik})> \times <(y, \ldots, y_m), \ldots, (y_n, \ldots, y_{no})> = <(x_j, \ldots, y, \ldots, y_m), \ldots, (x, \ldots, x_i, y_n, \ldots, y_{no}) \ldots (x_j, \ldots, x_{ik}, y, \ldots, y_m), \ldots, (x_j, \ldots, x_{jk}, y_n, \ldots, y_{no})>$$

Quantitative fields and expressions may appear only as right-hand side operands when the cross operator is applied. The cross operator is also associative but not commutative (because the ordered Cartesian product is not commutative):

$$(X \times Y) \times Z = (<(x, \ldots, x_i), \ldots, (x_j, \ldots, x_{ik})> \times <(y, \ldots, y_m), \ldots, (y_n, \ldots, y_{no})>) \times <(z, \ldots, z_p), \ldots, (z_q, \ldots, x_{qr})>$$

$$= <(x, \ldots, x_i), \ldots, (x_j, \ldots, x_{ik})> \times (<(y, \ldots, y_m), \ldots, (y_n, \ldots, y_{no})> \times <(z, \ldots, z_p), \ldots, (z_q, \ldots, x_{qr})>)$$

$$= X + (Y \times Z)$$

Nest

The nest operator is similar to the cross operator, but it only creates set entries for which there exist database tuples with the same domain values. If VFT is defined to be the virtual fact table of the database being analyzed relative to all constant operands in the expressions X and Y, t to be a tuple, and $t(X \ldots X_n)$ to be the values of the fields X through $X_n$ for the tuple t, then the nest operator can be defined as follows:

$$A/B = <a, b) | \exists t \in VFT \, st = ((a) \in A) \, \&(t(A) = a) \, \&((b) \in B) \, \&(t(B) = b)>$$

$$X/A = <(x, \ldots, x_n, a) | \exists t \in VFT \, st = ((x, \ldots, x_n) \in X) \, \&(t(X, \ldots, X_n) = (x, \ldots, x_n)) \, \& = ((a) \in A) \, \&(t(A) = a))>$$

$$A/Y = <a, y, \ldots, y_m) | \exists t \in VFT \, st = ((a) \in A) \, \&(t(A) = (a)) \, \& = ((y, \ldots, y_m) \in Y) \, \&(t(Y, \ldots, Y_m) = (y, \ldots, y_m))>$$

$$X/Y = <(x, \ldots, x_n, y, \ldots, y_m) | \exists t \in VFT \, st = ((x, \ldots, x_n) \in X) \, \&(t(X, \ldots, X_n) = (x, \ldots, x_n)) \, \& = ((y, \ldots, y_m) \in Y) \, \&(t(Y, \ldots, Y_m) = (y, \ldots, y_m))>$$

The ordering of the p-tuples in a sequence generated by application of the nest operator is the same as it would be in the sequence generated by the application of the cross operator to the same operands.

The intuitive interpretation of the nest operator is "B within A". For example, given the fields Quarter and Month, the expression Quarter/Month would be interpreted as those months within each quarter, resulting in three entries for each quarter (assuming data exists for all months in the fact table). In contrast, Quarter×Month would result in 12 entries for each quarter. The nest operator may only be applied to ordinal operands and expressions. Nest is an associative operator.

Dot

The cross and nest operators provide tools for generating ad hoc categorical hierarchies. However, data warehouses often contain dimensions with explicit semantic hierarchies. The dot operator provides a mechanism for exploiting these hierarchical structures in the algebra of the present invention. The dot operator is similar to the nest operator but is "hierarchy-aware".

If DT is defined to be a relational dimension table defining a hierarchy that contains the levels A and B, and A precedes B in the schema of DT, then:

$$A.B = <(a,b) | \exists t \in DTstt(A) = a \& t(B) = b>$$

Similarly, dot can be defined relative to an expression X involving only the dot operator and levels from the same dimension hierarchy. DT is defined to be the relational dimension table defining the dimension that contains all levels in X and the dimension level A. In addition, all levels in X must appear in the schema of DT in the order they appear in X, and they must precede A in the schema of DT. Then:

$$X.A = <(x, \ldots, x_n, a) | \exists t \in DTstt(X \ldots X_n) = (x, \ldots, x_n) \& t(A) = a>$$

The dot operator is also associative but not commutative.

As a cautionary note, nest could be used for drilling down into a database hierarchy but this usage would be inappropriate. The nest operator is unaware of any defined hierarchical relationship between the dimension levels; instead, it derives a relationship based on the tuples in the fact table. Not only is this approach inefficient, as fact tables are often quite large, but it can also yield incorrect results. For example, consider the situation where no data was logged for November. Application of the nest operator to Quarter and Month would result in an incorrectly derived hierarchy that did not include November as a child of Quarter 4.

The dot operator provides a particularly advantageous method for working with database hierarchy in the situation in which a database is a hierarchical database. This is because the dot operator uses the hierarchical information that is either (i) defined in database 558 dimension tables or (ii), in instances where database 558 does not have dimension tables, is otherwise constructed. In contrast, the nest operator is unaware of the defined hierarchical relationship between dimension levels. Instead, the nest operator works by deriving hierarchical type relationships within the database based on existence scans of tuples in database fact tables. This is an inefficient way of deriving hierarchical information because the fact tables can be quite large. Advantageously, the dot operator does not derive hierarchical type relationships within the database based on existence scans. Rather, the dot operator uses the metadata associated with the database 558 that defines the database hierarchy. The form of this metadata will be dependent upon the exact nature of databases 558. In some instances the metadata will comprise, for example, a star schema. In instances where the database 558 does not have such defined hierarchical relationships (for example in the case where database 558 is a flat file) the metadata will be constructed by database hierarchy module.

Summary

Using the set semantics set forth herein for each operator, every expression in the algebra can be reduced to a single set with each entry in the set being an ordered p-tuple. This set evaluation of an expression is called the normalized set form. The normalized set form of an expression determines one axis of the table: the table axis is partitioned into columns (or rows or layers) so that there is a one-to-one correspondence between set entries in the normalized set and columns.

Algebraic Properties

In the preferred algebra for use with the present invention, an algebraic expression is interpreted as a set for two purposes: (i) to determine the underlying tabular structure of a visual table 720; and (ii) to determine the tuples to be retrieved from database 558. In the former case, the ordering of the p-tuples in the normalized set form is meaningful because it determines the ordering of the columns, rows, and layers of visual table 720. As a result, the only algebraic property that holds for these operators is associativity. Commutative or distributive operators would allow algebraic manipulations that change the ordering of the normalized set form. However, when performing interpretation to determine which database tuples to retrieve, these constraints on the properties of the operators can be relaxed since the ordering of the p-tuples in the set interpretation is not meaningful in the context of database queries. Specifically, for this purpose only, the set interpretations are treated as bags instead of sequences (thus discarding ordering) and allow the following algebraic properties:

Associative $(A+B)+C=A+(B+C)$ $(A.B).C=A.(B.C)$ $(A \times B) \times C=A \times (B \times C)$ $(A/B)/C=A/(B/C)$ Distributive $A \times (B+C)=(A \times B)+(A \times C)$ $A/(B+C)=(A/B)+(A/C)$ Commutative $A+B=B+A$ $A \times B=B \times A$ $A/B=B/A$ If the operators are changed to allow these algebraic properties, they can be used to quickly determine the database queries or data cube projections that would to generate a visual table 720.

Syntax Revisited

The syntax of a preferred algebra in accordance with the present invention has been defined as a sequence of operands separated by operators. Some constraints on the applications of the operators has also been provided. The syntax can be made precise by using a grammar. To define a grammar, four attributes are introduced and defined: a set of terminal symbols, a set of non-terminals, a set of production rules, and a start symbol. A preferred grammar in accordance with the present invention has ten terminal symbols:

| Symbol | Definition |
| --- | --- |
| $q_{field}$ | The name of a quantitative field |
| $o_{field}$ | The name of an ordinal field |
| $q_{dim}$ | The name of a quantitative dimensional level |
| $o_{dim}$ | The name of an ordinal dimensional level |
| C | A constant operand |
| ".", "×", "/", and "+" | The operators of the algebra |
| ( ) | Parentheses |

The following are the production rules for the preferred grammar (E is the start symbol):

$E \rightarrow O_{expr} | Q_{expr}$
$O_{expr} \rightarrow (O_{expr}) | O_{expr} + O_{expr} | O_{expr} \times O_{expr} | O_{expr} / O_{expr} | O$
$Q_{expr} \rightarrow (Q_{expr}) | E + Q_{expr} | Q_{expr} + E | (O_{expr} \times Q_{expr}) | Q$
$O \rightarrow O_{hier} | o_{field} | c$
$O_{hier} \rightarrow O_{hier} \cdot o_{dim} | o_{dim}$
$Q \rightarrow O_{hier} | q_{field}$
$Q_{hier} \rightarrow O_{hier} \cdot q_{dim} | q_{dim}$ The following are the main syntactic constraints on the operators that are expressed in this grammar:

Cross: Quantitative operands, or expressions containing quantitative operands, can only be right-hand side operands of the cross operator.

Nest: The nest operator can only be applied to ordinal operands or expressions.

Dot: The dot operator can only be applied to dimension levels. Furthermore, a quantitative field can only appear as the right-most operand of a dot operator, since quantitative dimension levels are only possible as the leaf level of a dimension hierarchy.

Concatenate: Concatenate can be applied to any operand.

In the foregoing description, the algebraic expressions partition tables into rows and columns. The algebraic expressions can also describe layers.

Layers

Figure 14:
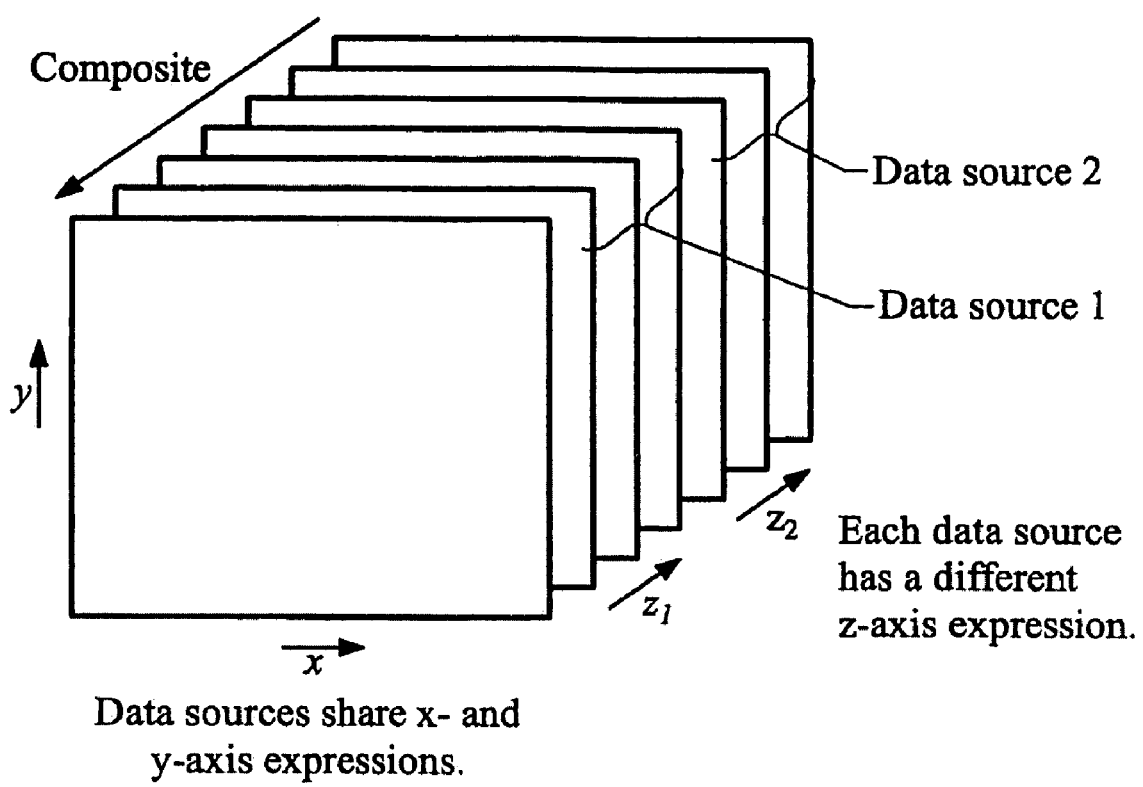
FIG. 14 illustrates the layering of multiple data sources and the partitioning of layers in accordance with one embodiment of the present invention.

In the present invention, a layer in a visual table 720 is a single x-y table whose structure is defined by the x- and y-axes expressions. Every layer in a specification is composited together back-to-front to form the final visualization. A single visualization can combine multiple data sources. Each data source is mapped to a distinct layer or set of layers. While all data sources and layers share the same configuration for the x- and y-axes of the table, each data source can have a different expression (the z-axis) for partitioning its data into layers. Layering of multiple data sources and the partitioning of layers are illustrated in FIG. 14. In some embodiments of the present invention, each data source in a visualization is mapped to a distinct layer. The layers for a data source can be partitioned into additional layers by the z-axis expression for that data source. All the layers in a specification are composited together back-to-front to form the final visualization.

Constant operands are an important aspect of layering. A single visualization may be composed of multiple heterogeneous databases 558, each mapped to a distinct layer, and all layers must share the same expressions for the x- and y- axes. However, sometimes it is desirable to include ordinal fields in the x- and y-axes expressions that exist in only a subset of the visualized databases. When this occurs, constant operands are generated for the other layers with a predefined set interpretation that matches the domain of the ordinal field in the layer in which the field does appear. Thus the expressions can be properly evaluated for each layer.

The z-axis expression for a data source is more constrained than the expressions for the x and y-axes. Specifically, since layering must be discrete, a z-axis expression can contain only ordinal operands; not quantitative operands. In other words, a z-axis expression is constrained to the $O_{expr}$ production rule in the grammar of the present invention.

Summary

The algebra described herein provides a succinct yet powerful notation for describing the underlying structure of visual tables 720. The algebraic expressions define how such a table is partitioned into rows, columns, and layers, and additionally defines the spatial encodings within each pane 722 of the table.

Exemplary Method of Querying a Hierarchical Database

An exemplary method for forming a database query that advantageously uses a hierarchical structure that is either (i) explicitly defined in a database or that (ii) can be derived from the database is described herein. The exemplary method displays queries that are formed using a visual specification in a visual table. A method of displaying results of queries in this way may be used with a method of automatically displaying marks according to the methods of the present invention.

Figure 10A:
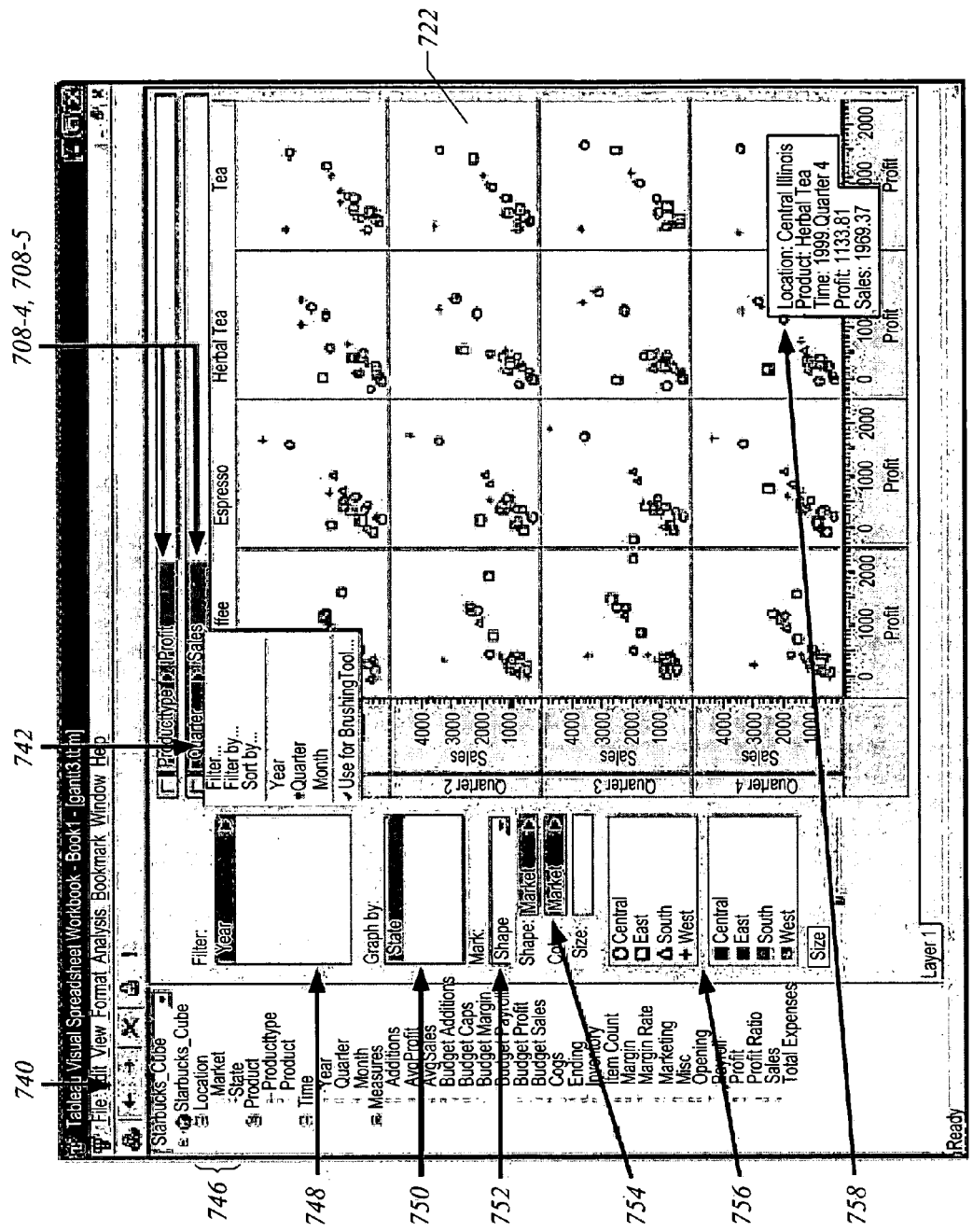
FIG. 10 (comprising FIGS. 10A and 10B) illustrates embodiments of a user interface for creating a visual specification and assigning marks according to a method of the present invention.
Figure 10B:
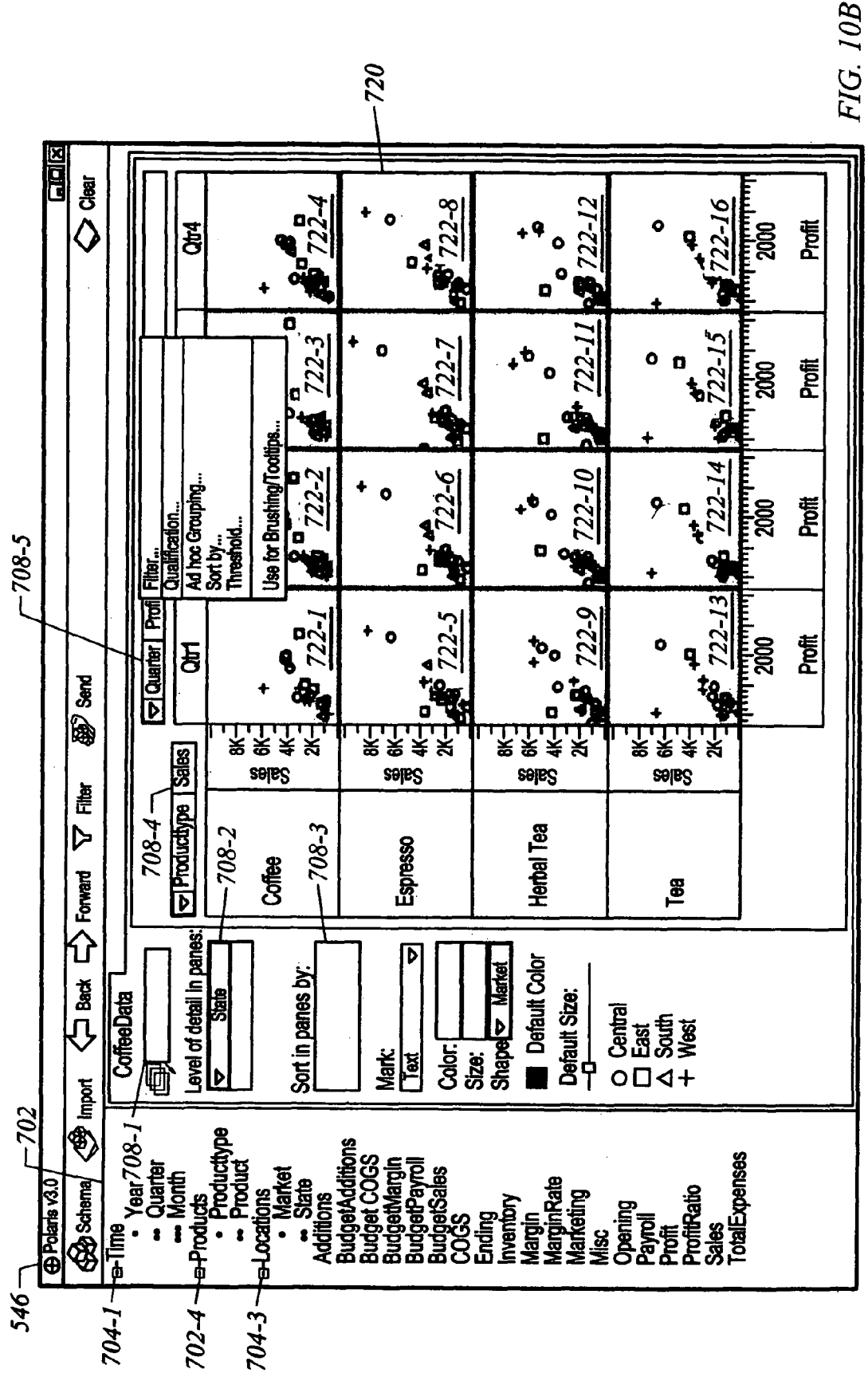
Figure 11:
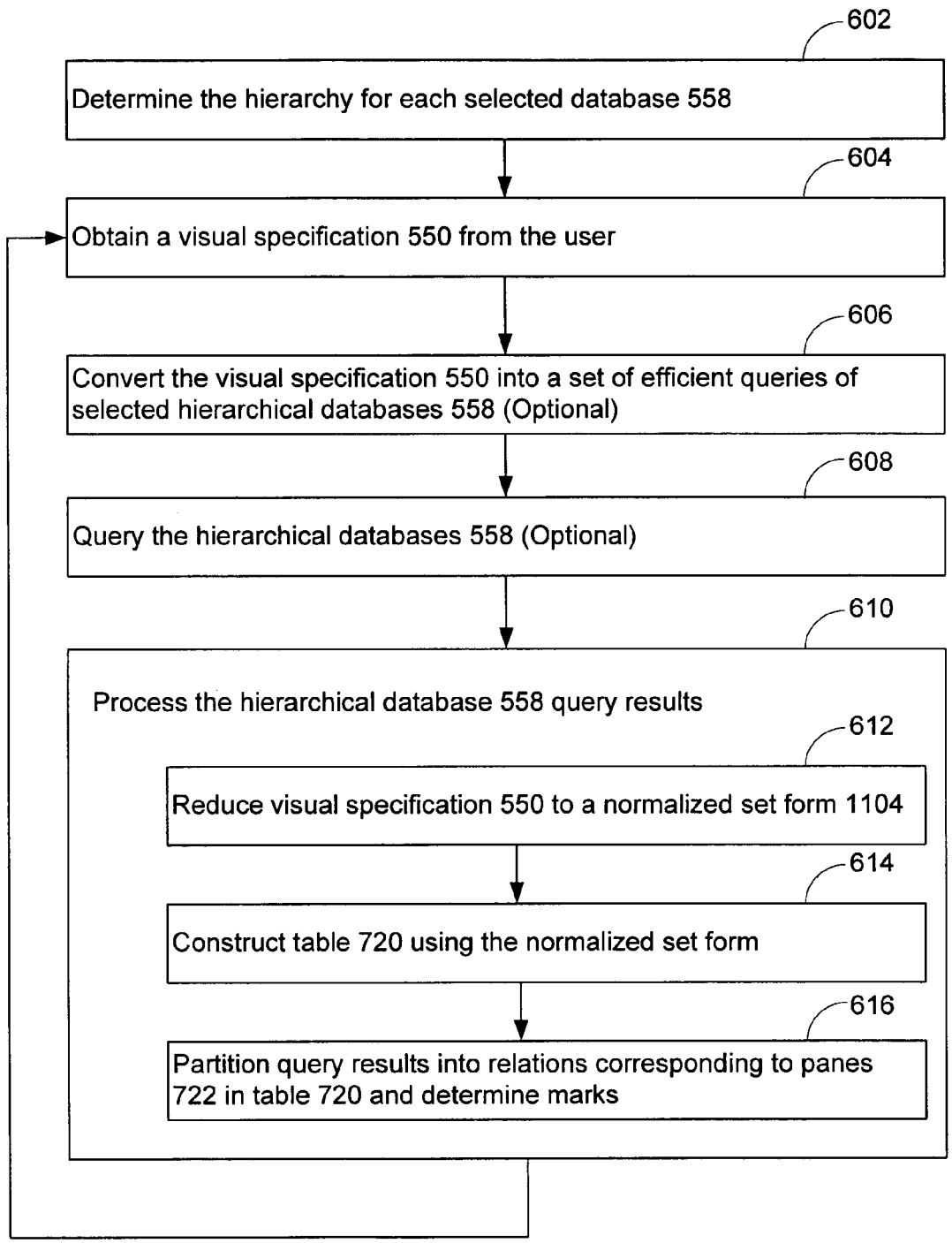
FIG. 11 illustrates processing steps in accordance with one embodiment of the present invention.
Figure 12:
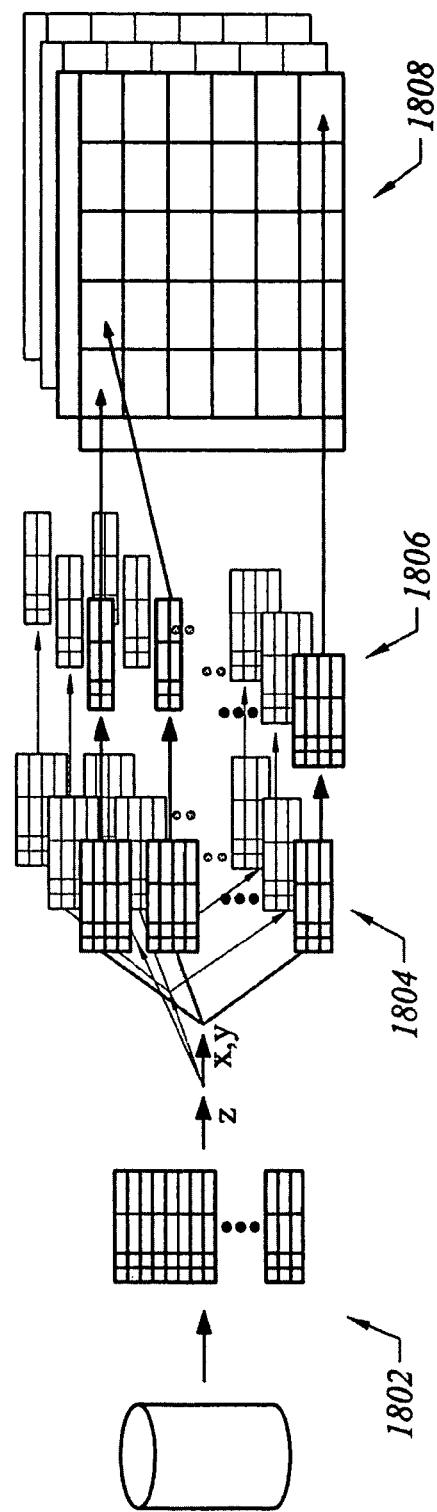
FIG. 12 illustrates the association of a subset of tuples with a pane in one or more panes in a visual table in accordance with one embodiment of the present invention.

Referring to FIG. 11, an exemplary method in accordance with one embodiment of the present invention is illustrated. Attributes of the database used in FIG. 11 can be seen referenced in FIG. 10.

Step 602. In step 602, the hierarchy for each selected database 558 is optionally characterized. In some embodiments, a plurality of databases 558 is analyzed concurrently. In some embodiments, selected databases 558 do not have hierarchy that is explicitly defined in the underlying respective databases 558. In such embodiments, database hierarchical information is constructed for each of the respective databases. In some instances, this analysis is assisted by input from a user and/or requires an analysis of the data stored in the database.

In some embodiments, the hierarchical structure of a database 558 is derived from a database schema for the database 558. This database schema comprises schema fields. In some embodiments each schema field has a type (e.g., a base type or an array type). Representative base types include, but are not limited to, character strings, integer, short integer, double integer, single precision floating number, double precision floating point number, and object handle. Representative array types include, but are not limited to an array of long integers, an array of short integers, an array of single precision floating point numbers, an array of double precision floating point numbers and an array of object handles.

Step 604. In step 604, a visual specification (specification) 550 is obtained from the user by user interface module 546. In a preferred embodiment, visual specification 550 is created using a drag-and-drop interface provided by user interface module 546. Exemplary user interface modules 546 are illustrated in FIGS. 10A and 10B. In FIG. 10A, Row and Column shelves are denoted 708-4, and 708-5; columns placed at the indicated points determine the structure of the table. Analysis Operations are denoted 742; context menus provide analysis operations such as filtering, sorting, and drill-down. Buttons 740 provide Undo/redo capability so that users can safely explore and experiment with unlimited undo and redo. In the Database schema shown on the left hand side of FIG. 10A, the user drags dimension levels or measures to shelves to define the graphic. The dimension hierarchy is shown at 746. Inside the user interface depicted in FIG. 10A, a Filter Shelf is denoted 748; filters can be constructed on any levels or measures. Levels placed in a Group by Shelf 750 determine the number of marks in each pane. A Mark Menu 752 determines that relations in each pane are drawn as marks of the selected type. Area 754 lists visual attributes; columns placed in area 754 are encoded in the visual properties of the marks. Legends 756 enable the user to see and modify the mappings from data to visual properties. Each Mark 758 visually represents one or more relations from the database. A user creates the visual specification 550 by dragging operand names from schema box 702 to various shelves 708 throughout the interface. These operand names are derived from the hierarchical structure of each selected database 558 that was characterized in step 602. For example, one of the dimensions available for exploration in the database could be "time." Then, likely, operand names available in schema box 702 would be "year", "quarter", "month", and "day". Each of these operand names is referred to as a type tuple. In some embodiments, more than one database is characterized in step 602. Further, specification 550 can comprise a first element of the hierarchical structure of a first database 558 characterized in step 602 and a second element of the hierarchical structure of a second database characterized in step 602. The first element comprises a type tuple that is derived from the first database 558 and the second element comprises a type tuple that is derived from the second database 558.

Schema box 702 of FIG. 10 includes a representation of the database schema for each of the one or more databases 558 being analyzed. Schema box 702 includes each dimension 704 represented in each schema 560 of each database 558 that is being analyzed. For example, in FIG. 10, a single database that includes the dimensions "time" 704-1, "products" 704-2, and "location" 704-3 is analyzed. An ordered list of the dimension's levels is placed below each dimension. For example, in the case of time 704-1, the ordered list includes the dimension levels "year", "quarter", and "month". In the case of products, the ordered list includes the dimension levels "producttype" and "product". In the case of location, the ordered list includes the dimension levels "market" and "state".

A user can drop any dimension level into the interface of shelves 708. Shelves 708-4 and 708-5 are the axis shelves. The operands placed on shelves 708-4 and 708-5 (e.g., year, quarter, month, product type, product, market, state) determine the structure of visual table 720 and the types of graphs that are placed in each pane 722 of visual table 720. For example, in FIG. 10, the value "sales", which belongs to the dimension "Producttype" has been placed on shelf 708-4.

Figure 17:
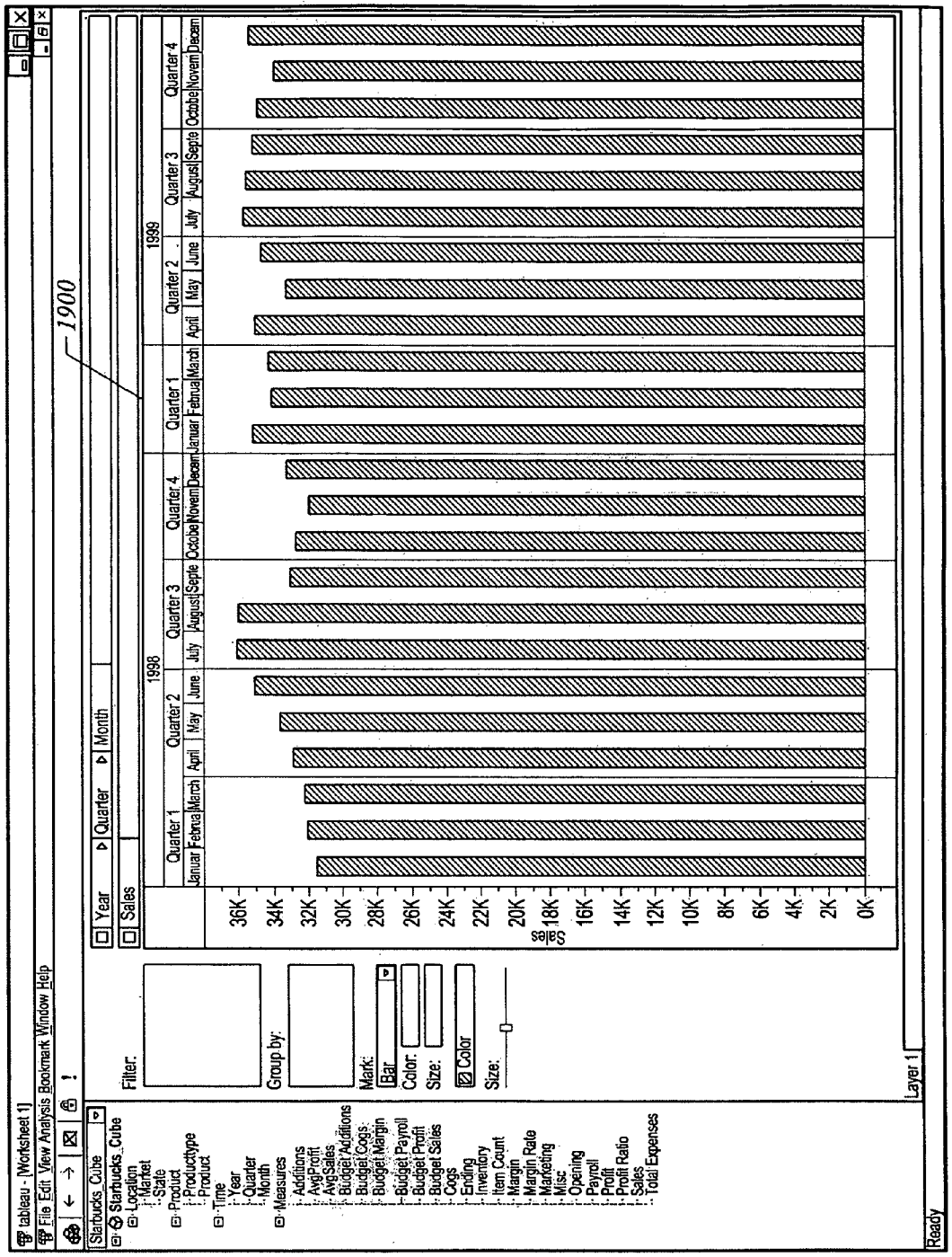
FIG. 17 illustrates a visual plot that shows the natural hierarchical display of levels of the time dimension (years, quarters, months) for sales data.

Therefore, the y-axis of visual table 720 is a breakdown of the sales of each "producttype". Valid product types include "coffee", "espresso", "herbal tea", and "tea." Thus, the y-axis of visual table 720 represents the sale of each of these products. In FIG. 17, the value "profit", which belongs to the operand "Quarter" (which is part of the dimension "time") has been placed on shelf 708-5. Thus, the x-axis of visual table 720 represents profit. Level of detail shelf 708-2 has been set to state. Accordingly, each mark in each pane 722 in visual table 720 represents data for a particular state.

The configuration of operands on shelves 708 (FIG. 10) forms the visual specification 550 (FIG. 13). At a minimum, a visual specification 550 includes an x-axis expression and a y-axis expression. More typically, a visual specification 550 further includes a z-axis expression, which is placed on shelf 708-1, and a level of detail expression 708-2. An exemplary visual specification includes the following expressions:

$$x:C*(A+B)$$

$$y:D+E$$

$$z:F$$

and the level of detail within each pane 722 is set to:

level of detail: G

In some embodiments, a user can specify any of the algebra (e.g., ordinal concatenation, etc.), as further described herein. In some embodiments, a user types in the algebra directly using a user interface such as the one illustrated in FIG. 10, or includes it in a file that is then interpreted, or uses some other form of data entry known in the art.

In some embodiments, each shelf 708 that represents an axis of visual table 720 is translated into corresponding expressions in an automated manner. For example, the contents of the shelf 708 that represents the x-axis is translated into an expression that represents the x-axis of visual table 720, the shelf 708 that represents the y-axis is translated into an expression that represents the y-axis of visual table 720, and the shelf 708 that represents layers is translated into an expression that represents the z-axis of visual table 720. The contents of each axis shelf 708 is an order list of database field names. In some embodiments, the order of the database field names is constrained such that all nominal and ordinal fields precede all quantitative fields in the shelf. Exemplary nominal fields include, but are not limited to, products, regions, account numbers or people. Exemplary ordinal fields include, but are not limited to dates or priority rankings. Exemplary quantitative fields include, but are not limited to profit, sales, account balances, speed or frequency. In embodiments where the order of the database field names is constrained such that all nominal and ordinal fields precede all quantitative fields in the shelf 708, the nominal fields are assigned an ordering and treated as ordinal. This ordering is either a natural ordering (e.g., alphabetic, numeric) or an ordering specified by the user. Then, the list of fields in a respective shelf are transformed into an expression of the form:

$$(O_1 \times O_2 \ldots \times O_n) \times (Q_1 \times Q_2 \ldots \times Q_m)$$

In addition, if any two adjacent categorical fields represent levels of the same dimension then the cross "×" operator between them is replaced with a dot "." operator. The specification is used to map data values from a database 558 to visual properties by visual interpreter module 556. Shelves labeled "Group in panes by" (not shown) and "Sort in panes by" (708-3, FIG. 10) define the "Group" and "Sort Order" components of the visual specification.

In some embodiments, the specification is written in a language that is based on the metadata (e.g., hierarchical structure) of the one or more databases 558 that were characterized in step 602. At a minimum, this language comprises all or a portion of the dimension levels that make up the hierarchies of the one or more databases 558. Examples of dimension levels (e.g., year, quarter, month, etc.) have been described. Typically, these dimensional levels are displayed on user interface 524 as illustrated in FIG. 10. In some embodiments, the language further includes a table algebra, such as the algebra described herein, that allows the user to form complex visual tables comprised of one or more panes 722 (FIG. 10). In embodiments where the specification 550 makes use of the table algebra in the form of an algebraic expression, the specification includes at least one operand. In addition to the at least one operand, the algebraic expression includes one or more operators that represent operations on the metadata of the one or more databases 558 that were characterized in step 602. Examples of such operators include, but are not limited to, relational operators such as cross product, union, selection or sorting. Other examples of operators include, but are not limited to, the nest operator and the dot operator. The nest operator analyzes a fact table within a database whereas the dot operator analyses a dimension table (or equivalent data structure) associated with a database 558 that defines the database 558 hierarchy. Analysis of the fact table by the nest operator or the dimensional table (or equivalent data structure) by the dot operator represents an operation on the hierarchical structure of the associated database 558. The operations and operators within the algebraic expressions can be nested. For example, in one embodiment, parentheses are used to alter the order in which operators are considered.

In a preferred aspect of the present invention, visual specification 550 organizes panes 722 into a plurality of rows and a plurality of columns. In embodiments in accordance with this aspect of the invention, visual specification 550 includes a first algebraic expression for the plurality of rows and a second algebraic expression for the plurality of columns. Both the first algebraic expression and the second algebraic expression each represent an operation on the metadata of a database 558 (e.g., hierarchical structure) that was characterized in step 602. In some instances in accordance with this aspect of the invention, the specification further organizes one or more panes 722 into a plurality of layers. To accomplish this, the specification 550 further comprises a third algebraic expression for the plurality of layers. The third algebraic expression represents an operation on the metadata of one or more of the databases 558 that were characterized in step 602. For example, the first two algebraic expressions could cover revenue for all products whereas the third algebraic expression could add the dimension "State" such that each layer represents the revenue by product for each state.

Using the methods of the present invention, each visual specification 550 can be interpreted to determine the exact analysis, query, and drawing operations to be performed by system 500. In a preferred embodiment, drawing operations are performed independently in each pane 722 of visual table 720.

Visual table 720 includes three axes. The x- and y-axes are respectively determined by shelves 708-5 and 708-4, as discussed above. The z-axis is determined by shelf 708-1 (FIG. 10B). Each intersection of the x-, y-, and z-axis results in a table pane 722. Each pane 722 contains a set of records, obtained by querying a database 558, that are visually encoded as a set of marks to create a visual table. While shelves 708-1, 708-4, and 708-5 determine the outer layout of visual table 720, other shelves 708 in display 700 determine the layout within a pane 722. In some embodiments, this inner layout includes the sorting and filtering of operands, the mapping of specific databases 558 to specific layers in the z-axis of visual table 720, the grouping of data within a pane 722 and the computation of statistical properties and derived fields, the type of graphic displayed in each pane 722 (e.g., circles, bars, glyphs, etc.), and the mapping of data fields to retinal properties of the marks in the visual tables (e.g., mapping "profit" to the size of the mark and mapping "quarter" to color).

Step 606. In step 606, a set of queries is optionally formed by data interpreter module 552 based on specification 550. Before generating database specific queries, data interpreter module 552 generates a set of one or more abstract query descriptions 554 that describe the queries using the values specified in visual specification 550 (e.g., values placed on shelves 708-1, 708-4, and 708-5). Query descriptions 554 precisely describe the desired filtering, sorting, and grouping of tuples or objects from database 558. As used here, the term "objects" is a semantic derivation that uses one or more fields from the database.

The number of distinct query descriptions 554 that are generated for a single visual specification 550 is determined by the level of detail specified in visual specification 550, see for example United States patent application publication No. 2004/0243593, published Dec. 2, 2004. In some embodiments, the level of detail within a pane 722 in a visual table 720 is determined by both the level of detail shelf 708-2 and the table algebra expressions formed in shelves 708-1, 708-4, and 708-5 (FIG. 10).

Although it is possible for each pane 722 to correspond to a different level of detail, and thus a different query, the common situation is for a number of panes 722 (FIG. 10) to correspond to the same level of detail and differ only by how the tuples are filtered. For efficiency, it is preferred to considered panes 722 that require the same level of detail as a group and send a single query to a database 558 to request the appropriate tuples. The tuples can then be partitioned into panes 722 locally in subsequent processing steps. Accordingly, in one aspect of the invention, database queries are grouped. In some embodiments, this is accomplished by algebraically manipulating visual specification 550 in order to determine the queries that are required for a given visual table 720. Of all the algebraic operators used in the algebra of the present invention, the operator that can produce adjacent panes 722 with differing projections or level of detail is the concatenate operator. Nest, cross, and dot, as described herein, include all input dimension levels in each output p-tuple. Concatenate does not. Thus, if each axis expression in the visual specification 550 is reduced to a sum-of-terms form, the resulting terms will correspond to the set of queries that need to be retrieved from one or more databases 558.

To illustrate the sum-of-terms reduction of each axis, consider exemplary visual specification:

x:C*(A+B)

y:D+E z:F and the level of detail within each pane 722 is set to G. Crossing these expressions, in accordance with the table algebra specified herein, and then reducing to a sum-of-terms form yields:

(A*C*D*F*G)+(A*C*E*F*G)+(B*C*D*F*G)+
(B*C*E*G)

Thus, in this example, the following four database queries are made:

(A*C*D*F*G) Query 1
(A*C*E*F*G) Query 2
(B*C*D*F*G) Query 3
(B*C*E*G) Query 4

Most typical multidimensional query languages provide a mechanism for generating queries of the form found in queries 1-4. For example, each of queries 1-4 can be a single multidimensional expression query such as expressed in MDX (Microsoft, Redmond Wash.). MDX, is a syntax that supports the definition and manipulation of multidimensional objects and data. MDX is similar to the structured query language (SQL) syntax, but is not an extension of the SQL language. As with an SQL query, each MDX query requires a data request (SELECT clause), a starting point (FROM clause), and a filter (WHERE clause). These and other keywords provide the tools used to extract specific portions of data from a hierarchical database (e.g., a cube) for analysis. Thus, in general, each query can map to a relational algebra operator such as an SQL query or to a datacube query (e.g., an MDX query).

The foregoing provides an overview of how visual specification 550 is reduced to a set of queries; an algorithm used in one embodiment of the present invention is set forth in the following pseudo code:

101: x-terms=List of terms from the sum-of-terms form of the x-axis expression
102: y-terms=List of terms from the sum-of-terms form of the y-axis expression
103: z-terms=List of terms from the sum-of-terms form of the z-axis expression
104: for each layer {
105: for each x-term in x-terms {
106: for each y-term in y-terms {
107: for each z-term in z-terms {
108: p-lookup=PaneLookupDescriptor (x-term, y-term, z-term)
109: p-spec=The PaneSpecification that applies to p-lookup
110: qd=new QueryDescription
111: Add to qd all fields in x-term
112: Add to qd all fields in y-term
113: Add to qd all fields in z-term
114: Add to qd all level of detail fields in p-spec
115: Add to qd all drawing order fields in p-spec
116: Add to qd all encoding fields in p-spec
117: Add to qd all selection (brushing/tooltips) fields in p-spec
118: Add to qd all filters in the visual specification involving the fields in qd
119: if (qd matches data in data-cache)
120: results=retrieve data from data-cache
121: else
122: results=retrieve data from database server
123: add results to data-cache indexed by qd
124: group-tsf=create GroupingTransform
125: run group-tsf
126: Add each output data structure from group-tsf to pane-data-cache}}}}

Lines 101 through 103 of the pseudo code represent the case in which each axis of visual specification 550 is reduced to the sum-of-terms. Then, lines 104 through 107 are used to individually consider each of the terms i. Individually, each term i describes either a set of rows, a set of columns, or a set of layers in visual table 720. Together, the terms define a set of panes 722 that are all at the same level of detail 708-6 (FIG.

11). Thus, lines 104 through 107 can be read as "for each x-term, y-term, z-term combination".

Lines 108 and 109 are used to find the pane specification, which defines the marks, encodings, etc., for the panes 722 defined by a particular x-term, y-term, z-term combination. This is preferably done by testing p-lookup against the selection criteria predicate in each pane specification in the visual specification.

Lines 110 through 118 build a query for the particular x-term, y-term, z-term combination. Line 110 creates the variable "qd" to hold the query and lines 111 through 113 adds all the fields in the x-term, the y-term, and the z-term in the particular x-term, y-term, z-term combination. Lines 114 through 118 add additional terms from visual specification 550, such as level of detail, to the query.

Next, in lines 119 through 122, a determination is made as to whether a query of the form built by lines 110 through 118 already exists in the data-cache (query cache 555, FIG. 13). If so, the result is retrieved from the data cache (line 120, from query cache 555, FIG. 13). If not, the server that hosts the target database 558 is queried (line 122) using the query built by lines 110 through 118. If such a database query is made, data interpreter module 552 will formulate the query in a database-specific manner. For example, in certain instances, data interpreter module 552 will formulate an SQL query whereas in other instances, data interpreter module 552 will formulate an MDX query. In line 123, the results of the query are added to the data-cache (to query cache 555, FIG. 13).

The data retrieved in the processing steps above can contain data for a set of panes 722. When this is the case, the data is partitioned into a separate data structure for each pane 722 using a grouping transform (lines 124-125) that is conceptually the same as a "GROUP BY" in SQL except that separate data structures are created for each group rather than performing aggregation. In line 126, each output data structure from group-tsf is added to pane-data-cache 557 (FIG. 13) for later use by visual interpreter module 556.

Step 608. In step 608, the queries developed in step 606 (if performed) are used to query one or more databases 558. Such databases 558 can be stored in memory 538. However, in a more preferred embodiment, these databases 558 are stored in a remote server.

Figure 15:
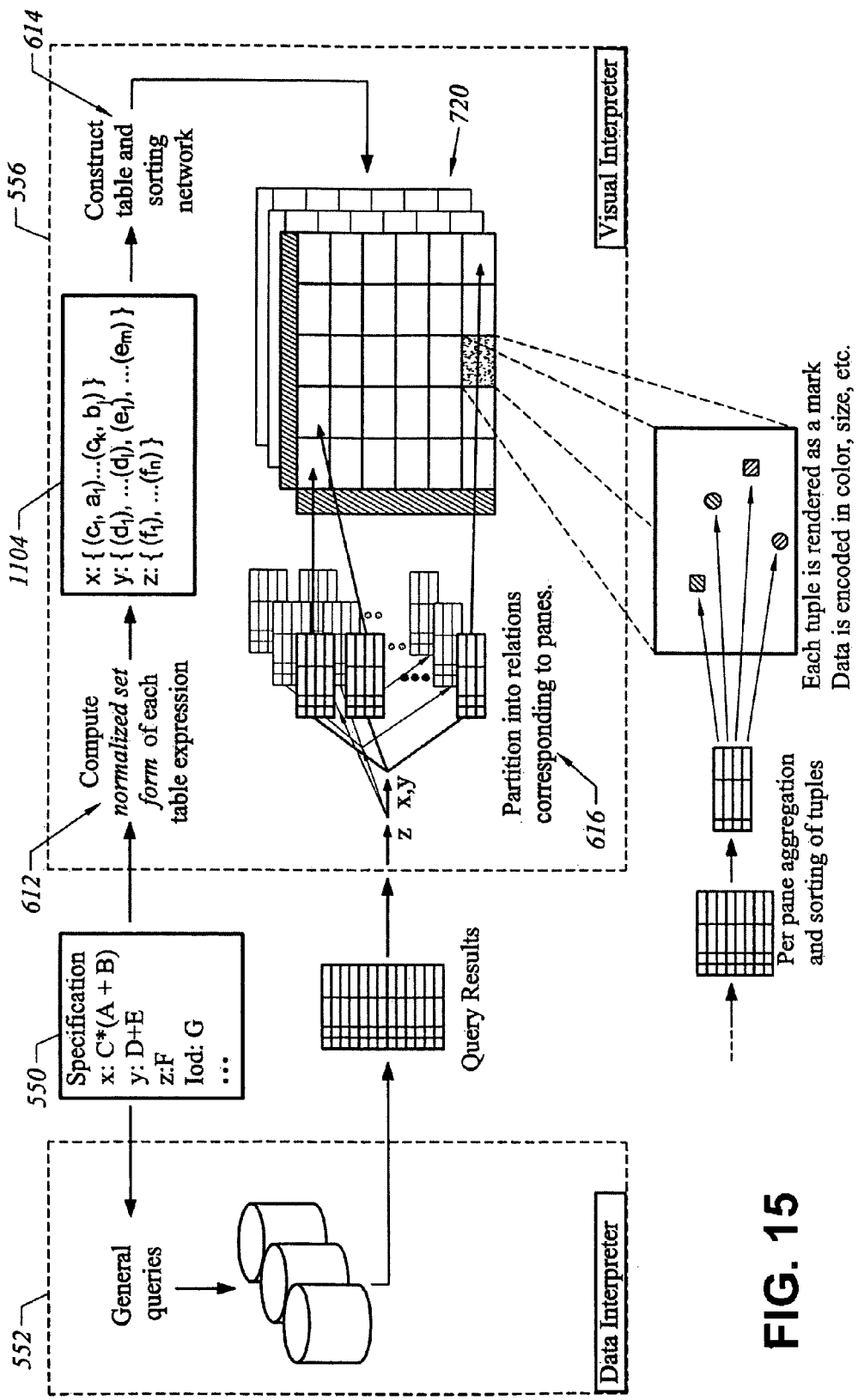
FIG. 15 provides an exemplary overview of processing steps in accordance with one embodiment of the present invention.

Step 610. In step 610, visual interpreter module 556 processes queries that have been generated by data interpreter module 552. A number of steps are performed in order to process these queries. If a query has not been performed, then the steps of 610 may be applied to the data in the database 558, or a subset thereof that has been selected by other means. An overview of these steps is illustrated in FIG. 15. In step 612, visual specification 550 is reduced to a normalized set form 1104. In step 614, visual table 720 is constructed using the normalized set form. In step 616, the query results are partitioned into tuples corresponding to the panes 722 in visual table 720.

Step 612—reduction of the visual specification to the normalized set form. In step 604, visual specification 550 was obtained by user interface module 546. The visual specification 550 comprises the values of shelves 708 that have been populated by the user. In step 612, visual specification 550 is used to construct algebraic expressions that define how visual table 720 is partitioned into rows, columns, and layers, and additionally defines the spatial encodings within each pane 722 of visual table 720. In this way, visual specification 550 organizes one or more panes 722 into a plurality of rows and a plurality of columns. In some embodiments, the plurality of rows and plurality of columns is hierarchically organized. Further, in some embodiments specification 550 also organizes the one or more panes 722 into a plurality of layers that are optionally hierarchically organized. Further still, in some embodiments, the specification organizes the one or more panes 722 into separate pages that are optionally hierarchically organized.

A complete algebraic expression of visual table 720 is termed a "table configuration." Thus, in step 612, the three separate expressions of visual specification 550 that respectively define the x, y, and z axes of visual table 720 are normalized to set form (set interpreted) in order to partition the row, columns and layers of visual table 720. To produce the normalized set form, each operand in the three separate expressions is evaluated to set form. The operators in each expression define how to evaluate each set within an expression. Thus, normalization to set form results in a single set (the normalized set form), where each element in the normalized set form corresponds to a single row, column, or layer of visual table 720. In some embodiments, this normalization process is extended to yet another dimension, termed "pages".

Recall that each expression in the three separate expressions of visual specification 550 that define the x, y, and z axis are drawn from operands (e.g., fields) in the database schema. The algebra used to produce the normalized set form characterizes each of the operands in a database schema (or some other representation of database structure) into two types: dimensional level and measure. Whether an operand is a dimensional level or a measure depends on the type of the operand. The set interpretation of an operand consists of the members of the order domain of the operand. The set interpretation of the measure operand is a single-element set containing the operand name. For example, the set interpretation of the "Profit" operand is {Profit}.

The assignment of sets to the different types of operands reflects the difference in how the two types of operands are encoded into the structure of visual table 720. Dimensional level operands partition the table into rows and columns, whereas measure operands are spatially encoded as axes within table panes. A valid expression in the algebra used in the present invention is an ordered sequence of one or more operands with operators between each pair of adjacent operands. The operators in this algebra, in order of precedence are cross (×), nest (/), and concatenation (+). Parentheses can be used to alter the precedence. Because each operand is interpreted as an ordered set, the precise semantics of each operator is defined in terms of how they combine two sets (one each from the left and right operands) into a single set.

Thus, every expression in visual specification 550 can be reduced to a single set, with each entry in the set being an ordered concatenation of zero or more dimension level values followed by zero or more measure operand names. For example, the normalized set form of the expression "month× profit" is {(Jan, Profit), (Feb, Profit), ..., (Dec, Profit)}. The normalized set form of an expression determines one axis of visual table 720. The table axis is partitioned into columns (or rows or layers) so that there is a one-to-one correspondence between columns and entries in the normalized set.

Figure 18:
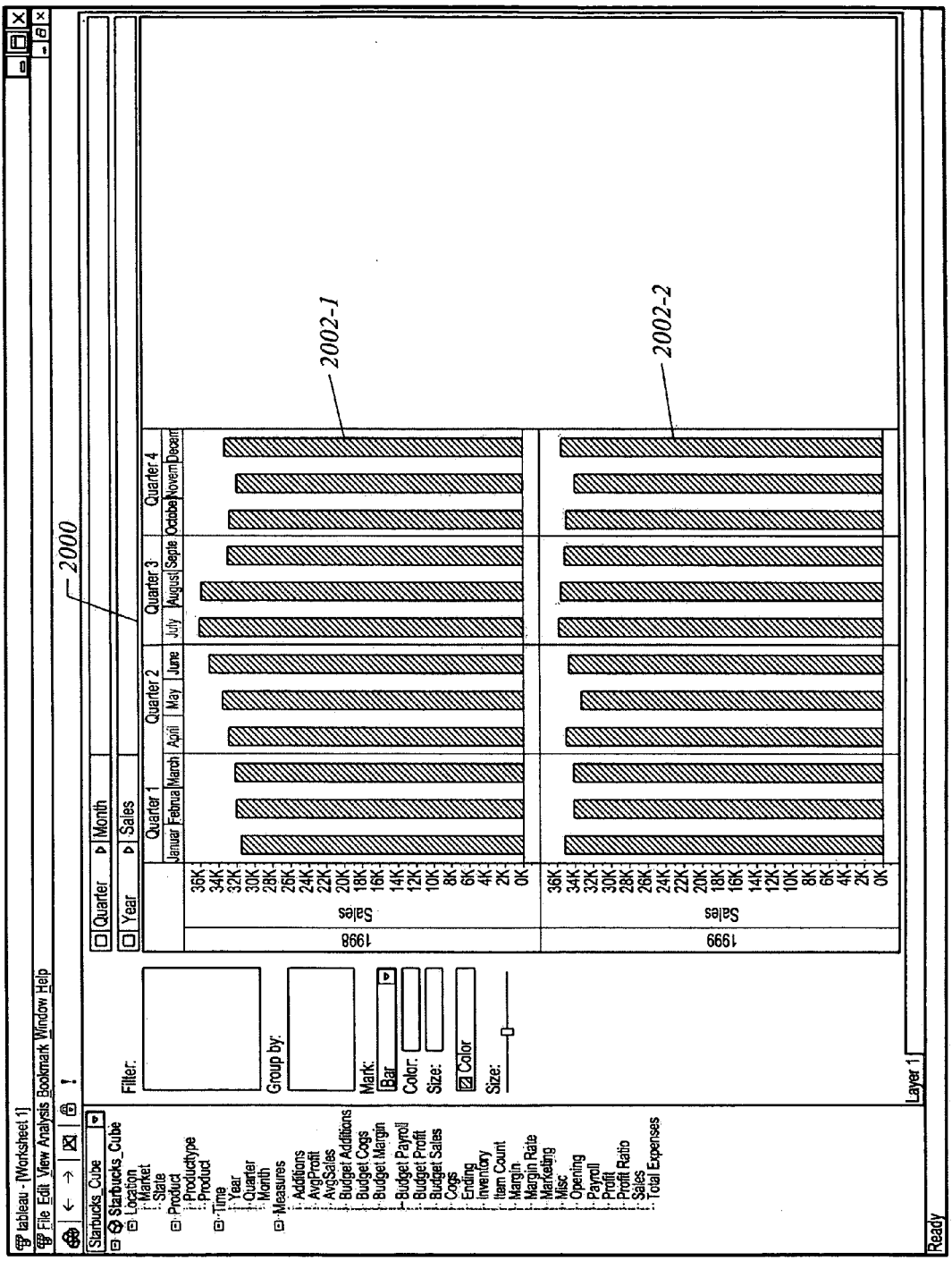
FIG. 18 illustrates a visual plot having the format [Time]. [Year]*[Sales] (rows, y-axis) versus [Time].[Quarter]. [Month] (columns, x-axis) in accordance with one embodiment of the present invention.

Consider the following example of step 612. Consider the exemplary visual specification 550 of FIG. 18:

x:C*(A+B)

y:D+E z:F

Computation of the normalized set form of this visual specification, in accordance with step 612 provides:

$$x: \{(c_i, a_l) \ldots (c_k, b_j)\}$$

$$y: \{(d_l), \ldots, (d_l), (e), \ldots, (e_m)\}$$

$$z: \{(f_l), \ldots (f_n)\}$$

Advantageously, the algebraic formalisms of the present invention can make use of an operator, termed the dot operator, that is specifically designed to work with dimension levels. Thus, the algebraic formalisms provide direct support for the use and exploration of database hierarchy in the present invention. One of the advantages of the dot operator is that it can deduce hierarchical information without analyzing database fact tables.

Step 614—construction of visual table 720 using the normalized set form. In step 614 (FIGS. 11, FIG. 15), visual interpreter 556 constructs visual table 720 using the normalized set form of the expressions for the x, y, and z-axis obtained from visual specification 550. Each element in the normalized set form of the expressions for the x, y, and z-axis corresponds to a single row, column or layer.

Figure 16:
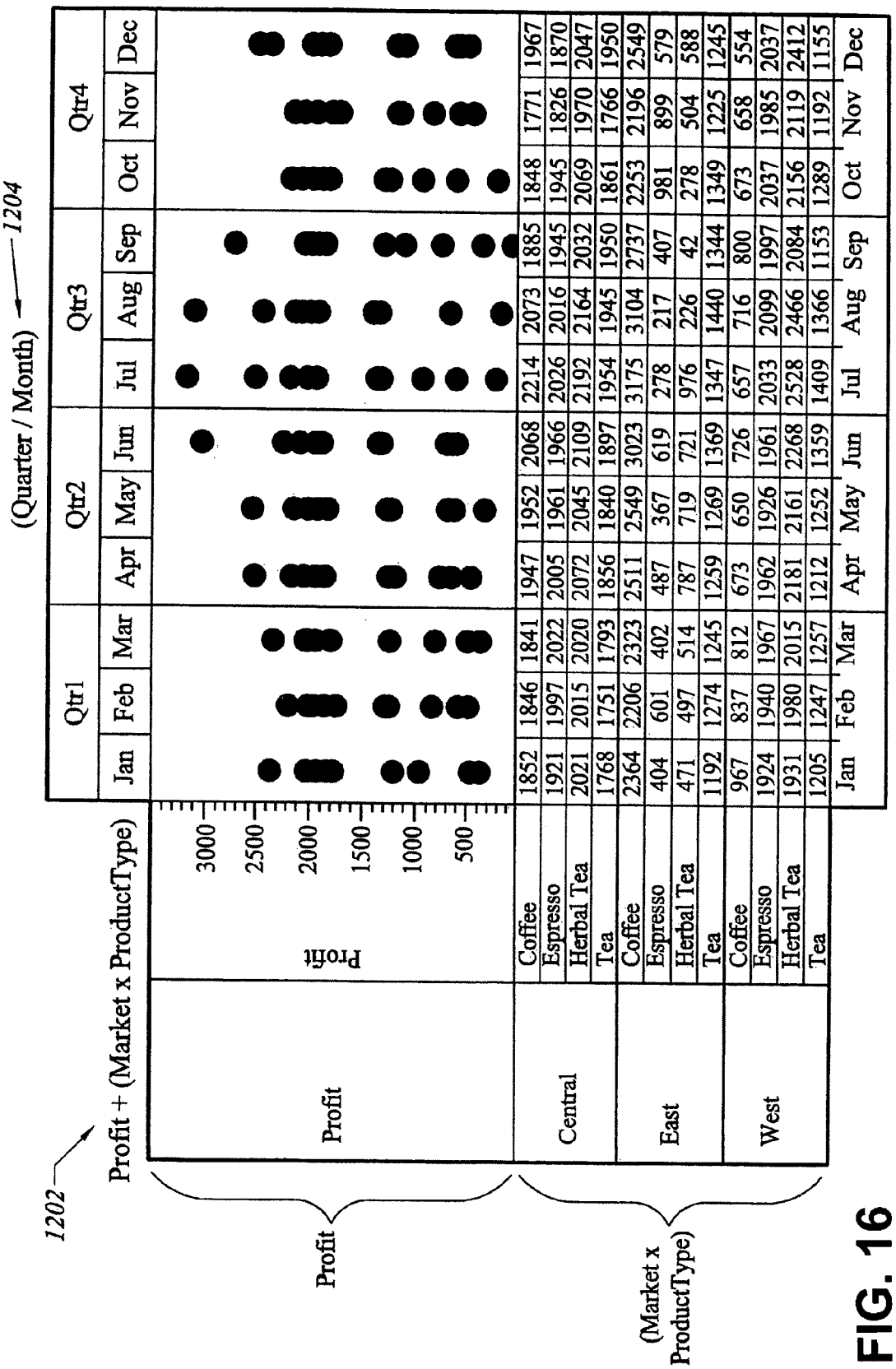
FIG. 16 illustrates the configuration for a table that has been generated from the normalized set form of a visual specification in accordance with one embodiment of the present invention.

FIG. 16 illustrates the configuration for a visual table 720 that has been generated from the normalized set form of a visual specification. FIG. 16 displays Profit information for the coffee chain data set (COFFEE). The y-axis is defined by the expression Profit+(Market×ProductType) and the x-axis is defined by the expression (Quarter/Month). The z-axis is not illustrated in FIG. 19.

As illustrated in FIG. 16, expressions 1202 and 1204 are composed of operands connected by operators. Each operand is evaluated to a mathematical sequence of p-tuples (the set interpretation). A mathematical sequence is an ordered list of elements that allows duplicate members. The operators between each operand define how to combine two sequences. Thus, each expression can be interpreted as a single sequence (the normalized set form), where each element in the sequence corresponds to a single row, column, or layer.

In some embodiments, the normalized set form generated in step 612 is more formally defined as p-entries and p-tuples. The set interpretation of an operand is a finite (possibly empty) sequence of heterogeneous p-tuples. Each p-tuple in a set interpretation defines a row (or column or layer) of visual table 720. In other words, each p-tuple maps to a row, a column, or a layer in visual table 720. A p-tuple is a finite sequence of p-entries. A single p-tuple defines a single row (or column or layer). The entries of a p-tuple define the spatial encoding (axis) within the row and the selection criteria on the fact table of a database 558. A p-entry is an ordered "tag-value" pair where the tag defines the meaning and possible values of the value member of the pair. A p-entry will be written as tag:value; e.g., field:Profit. A tag can be a field, constant, or field name, as discussed further in United States patent application publication number 20040243593, published Dec. 2, 2004. In some embodiments, the panes 722 of the row, column, or layer to which an ordered set of tuples (p-tuple) is mapped are ordered within the row, column, or layer in visual table 720 in the same order that is presented in the p-tuple.

In summary, each axis of visual table 720 is defined by an expression from visual specification 550 that has been rewritten in normalized set form. The cardinality of this normalized set determines the number of rows (or columns or layers) along the axis, with the exception of when the normalized set is the empty sequence. In a preferred embodiment, when the normalized set is an empty sequence, a single row or column is created rather than zero rows or columns. Each p-tuple within the normalized set defines a row (or column or layer). The p-entries within each p-tuple define both a selection criterion on the database 558 fact table, selecting tuples to be displayed in the row, and the spatial encoding in the row, defining the positions of the graphical marks used to visualize the database tuples.

In some embodiments, visual table 720 is presented as a web interface. In some embodiments, all or portions of user interface module 546 are run and displayed on a remote user computer in order to facilitate the presentation of visual table 720 as a web interface.

Step 616—partition query results into tuples corresponding to panes 722 in visual table 720 and determine marks. In step 616 (FIG. 11 and FIG. 15) visual interpreter module 556 processes query results that are returned by data interpreter module 552. These query results are referred to as tuples. In some embodiments of the present invention visual interpreter module 556 performs the following algorithm:

201: x-set=compute normalized set form of x-axis expression
    202: y-set=compute normalized set form of y-axis expression
    203: z-set=compute normalized set form of z-axis expression
    204: for each x-entry in x-set {
    205: for each y-entry in y-set {
    206: for each z-entry in z-set {
    207: p-lookup=new PaneLookupDescriptor (x-entry, y-entry, z-entry)
    208: p-spec=The PaneSpecification that applies to p-lookup
    209: create the pane graphic
    210: create the primitive object for rendering tuples
    211: create the encoding objects for the visual properties and add to primitive
    212: create the per-pane transform that sorts tuples into drawing order
    213: retrieve the data from the pane-data-cache using p-lookup
    214: bind the data from the pane-data-cache using p-lookup
    215: bind the pane to the data}}}

Lines 201 through 203 are performed in step 612 (FIG. 11). Lines 204 through 206 are a triple "for" loop to consider each individual pane 722 in visual table 720. For each pane i, lines 207-214 are performed.

In lines 207 and 208, the pane specification for pane i is located, including a pane type. The pane specification is ultimately derived from visual specification 550. The pane specification for pane i includes preferred encodings, etc., and also a pane type that defines the preferred mark for the pane. The pane type is preferably based on the types of the fields that are used to define the pane.

In lines 209-212, the pane graphic of pane i is created using the pane specification and pane type that applies to pane i. It is not necessary that every pane i has the same pane type. In line 210, primitive objects for rendering tuples within pane i is created. An example of a pane primitive object is a bar in a bar chart. In line 211, the encoding objects for the visual properties of each respective primitive object created in line 210 are created and added to the corresponding primitive objects. Exemplary encoding objects in the case of a bar are color and size of the bar. In line 212, the per-pane transform that sorts tuples into drawing order is applied. In other words, the per-pane transform is used to describe how tuples will be displayed in pane i.

In line 213, the data for pane i is retrieved from pane-data-cache 557 using p-lookup. In lines 214-215, the data (e.g., a subset of the set of tuples that were retrieved from a query of database 558) for pane i is bound to pane i. In this way, data from a query of database 558 is bound to visual table 720 by visual interpreter module 556.

Thus, in lines 209-212 a tuple in a subset of tuples associated with pane i is encoded as a graphical mark. It is preferred that the tuple in the subset of tuples comprises one or more fields that can be mapped to a graphical attribute (e.g., a color, a value, a size, a shape, a phrase, or a symbol). The fields are preferably classified by type as, e.g., quantitative, geolocational, or ordinal, and the pane is then mapped to a particular graphical attribute according to the type of the fields. In some embodiments a field is also classified as independent or dependent and mapping to a graphical attribute varied accordingly. The first and second field types, together, define a pane type. The pane type is mapped to a mark through a set of rules.

The exemplary interface in FIG. 10A shows that Marks can be selected by a user according to type, and then, for each type, various additional attributes such as shape, color, and size may be chosen. In preferred embodiments, a user may over-ride the choices determined by the program. In other embodiments, a user may select preferred types of marks for the program to use.

In some embodiments, the subset of tuples associated with pane i is determined by a selection function. In some embodiments, the selection function uses an identity of a schema field that is present in the metadata of the database 558 characterized in step 602 to form the subset of tuples. For example, the specification may assign all tuples that belong to a specific schema field type to pane i. In some embodiments, the selection function uses a relational operator (e.g., a selection operator or a grouping operator) to form the subset of tuples associated with pane i. Further, the ordering of rows and columns in visual table 720 can also be controlled and filtered.

The algorithm described in lines 201 through 215 assumes that each query of 558 is available in a pane-data-cache 557. An important advantage of the present invention is that queries are typically grouped across several panes. Thus, queries are preferably partitioned into a separate table for each pane and then placed in the pane-data-cache 557. While the present invention imposes no limitation on which software module performs this grouping transformation, in one embodiment of the present invention, the grouping transformation is performed by data interpreter module 552 as part of a generalized algorithm for querying databases 558. See, for example, the algorithm described in step 606, above.

In some embodiments of the present invention, step 608 returns a set of tuples. Next, in step 610 a new tuple is derived from the set of tuples. This new tuple is then incorporated into the set of tuples for possible association with one or more panes 722 in the graphic that is specified by visual specification 550. In some instances a relational operator (e.g., a sorting operator, an aggregation operator, or a transforming operator) is used to create the new tuple.

In some embodiments of the present invention, step 608 returns a set of tuples. A group is formed using all or a portion of the tuples in the set of tuples. Then a graphic based on the group is formed. Such embodiments are useful in instances where a multi-pane graphic is constructed. Examples of such graphics include a line that connects each tuple in a group or an area that encloses each tuple in the group.

In some embodiments, specification 550 organizes one or more panes 722 into a plurality of layers and each layer in the plurality of layers is assigned a tuple from a different database 558 that was characterized in step 602. In some embodiments, the specification 550 organizes one or more panes 722 into a plurality of columns and a plurality of rows and each column in the plurality of columns is assigned a tuple from a different database 558 that was characterized in step 602. In still other embodiments, the specification organizes the one or more panes into a plurality of columns and a plurality of rows and each row in the plurality of rows is assigned to a tuple from a different database 558 that was characterized in step 602. In still further embodiments, the specification organizes the one or more panes into a plurality of pages and each page in the plurality of pages is assigned to a tuple from a different database 558 that was characterized in step 602.

The methods of the present invention also benefit from tools that exploit underlying hierarchy that may be present in one or more databases 558 in order to allow a user to more efficiently explore them. A user can rapidly drill down hierarchical layers within each target database 558. Additionally, in one embodiment of the invention, the interface includes a "twistee" (▼) icon 708-6 (FIG. 14). When the user presses the "▼" icon 708-6, the user is presented with a listing of all the levels of the dimension (including diverging levels in complex dimensional hierarchies in the target databases). When a new level is selected, this is interpreted as a drill down (or roll up) operation along that dimension and the current level is automatically replaced with the selected level (with the same qualification). Thus, the user can rapidly move between different levels of detail along a dimension, refining the visual specification 550 as the user navigates. At each level, the program forms efficient database queries using, for example, the table algebra described herein.

Another advantage of the preferred method of display for use with the present invention is that a subset of tuples associated with a pane in step 616 can be used as a visual specification 550 in a new iteration of steps 605 through 616. For example, the user can select one or more tuples in the subset of the tuples associated with the pane as a basis for a new specification. Then, steps 606 through 616 can be repeated using the new specification. Still another advantage of this preferred method of display is that each specification 550 can be expressed in a form that can be stored for later usage. Storage of specifications 550 allow for services such as the bookmarking of favored specifications as well as support for specification "undo" and "redo". In a specification "undo" operation, for example, the specification 550 that was used in a previous instance of step 604 is obtained and used to perform steps 606 through 616.

Spreading a Dimension Across Multiple Axes

Although the methods of the present invention are not limited to hierarchical databases, it is preferable that methods for analyzing databases in conjunction with the methods of visualization of the present invention include other features, such as: the ability to represent dimensions across multiple axes; the ability to represent measures in data forms that are not limited to text tables; the ability to display levels of a dimension in orders that are not limited to their natural hierarchical order; and the ability to skip the display of levels in a defined hierarchy.

In general, the preferred methods of analyzing databases for use with the present invention provide a method of forming a visual plot. In some embodiments, the visual plot is a visual graph 720. In other methods it is a visual text plot (not shown). In both such embodiments, the hierarchical structure (where present) of a dataset is determined. The dataset includes a measure (e.g., sales, profits, quantities) and a dimension (e.g., time) consisting of a plurality of levels (e.g., year, quarter, month) that form a dimension hierarchy.

In an exemplary method, the visual plot is constructed based on a specification. Such specifications can range anywhere from simple indications of what the axes of the visual plot will represent to complex algebraic expressions that have been further described herein.

Regardless of the complexity of the specification, a first level from the plurality of levels of the dimension is represented by a first component of the visual plot and a second level from the plurality of levels is represented by a second component of the visual plot. For example, consider the case in which the dimension is time, the first level is months, the second level is years, the first component is the x-axis of the visual plot, and the second component is the y-axis of the visual plot. In this example, the x-axis of the visual plot will represent months and the y-axis of the visual plot will represent years.

The method continues with a query of the dataset to retrieve data in accordance with the specification. The data retrieved from the dataset will include all or a portion of the dimension and all or a portion of the measure. For example, consider the case in which the dimension is time and the plurality of the levels of the time dimension in the dataset includes the levels years, quarters, and months. Further, the measure is sales. In such an example, sales data for all or a portion of the levels years, quarters, and months will be retrieved. In some embodiments, the dataset is a database 558 and the querying step comprises retrieving a set of tuples in accordance with the specification. Such techniques are described in further detail in connection with steps 606 and 608 of FIG. 11, herein.

In some embodiments, the dataset is a database, such as one of the databases 558 illustrated in FIG. 13. However, this aspect of the present invention is not limited to such databases. More generally, any dataset that includes a measure (e.g., sales, profits) and a dimension (e.g., time) that has a dimension hierarchy (e.g., year.quarter.month) can be used. Other examples of measures include, but are not limited to, business measurements like cash balances, cash flows, financial variance, units sold or customer response times, as well as scientific measurements like temperature or pressure. Examples of dimensions include, but are not limited to dates, product, markets segments, geographic regions, item identifiers like stock keeping units (SKU's), or the names of budgetary planning scenarios.

In the exemplary method, the visual plot is populated with the retrieved data in accordance with the specification. Exemplary methods by which the visual plot is populated with the retrieved data in accordance with the specification are discussed in steps 610 through 616 herein, in conjunction with FIG. 11. However, this aspect of the invention is not limited to the population schemes illustrated in connection with FIG. 11. In some embodiments, the visual plot comprises a plurality of panes and the populating step comprises associating all or a subset of the data (e.g., tuples) with a pane in the plurality of panes as described in connection with step 616 of FIG. 11. In some embodiments, tuples are encoded in a pane as a graphic as described in further detail in connection with step 616 of FIG. 11, herein.

In some embodiments, the specification that is used in this aspect of the invention is a language based on the hierarchical structure of the dataset. For example, consider the case in which the dataset includes a time dimension with the level years, quarters, and months. In such an example, the language used to construct the specification will include the expressions years, quarters and months as well as algebraic operators for combining such levels (e.g., cross operator, dot operator, etc.). Using the language, highly selective specifications can be used to construct the visual plot. More information on the use of language based on the hierarchical structure of a database 558 is disclosed herein. The techniques disclosed in connection with FIGS. 11 and 14, herein, can be used in this aspect of the invention.

FIG. 17 illustrates a visual plot 1900 that illustrates the natural hierarchical display of levels of the time dimension (years, quarters, months) for sales data. In some embodiments, visual plot 1900 is generated as a visual table 720 using the systems and techniques herein. In such embodiments, a visual specification is used to generate visual plot 1900. However, in other embodiments, visual plot 1900 is generated from data that was not obtained. For example, in some embodiments, visual plot 1900 is generated from spreadsheet data or a flat file.

Each of the graphics disclosed in this aspect of the invention can be constructed using the exemplary techniques discussed herein with a query of databases 558, or they can be generated from alternative sources of data.

As disclosed herein, the visual specifications in accordance with this aspect of the invention include a first component and a second component that respectively represent a first level and a second level in the dimension hierarchy of the underlying dataset (e.g., database 558). In some embodiments, the first component and the second component are not the same and are each independently selected from the group consisting of a plurality of rows in the visual plot, a plurality of columns in the visual plot, a plurality of layers in the visual plot, an axis in the visual plot, a graphic in the visual plot, or a level of detail of a graphic in the visual plot.

In visual plot 2000, a first component (FIG. 18, y-axis) represents a first level (FIG. 18, years) of the dimension hierarchy and a measure (FIG. 18, sales) such that the measure is partitioned into a plurality of segments (FIG. 18, rows 2002) with each segment (FIG. 18, row 2002) in the plurality of segments representing a data point (FIG. 18, a respective year, e.g., 1998, 1999) in the first level. The second component (FIG. 18, x-axis) represents at least a second level (e.g., quarter and month) of the dimension hierarchy from the underlying dataset.

Visual plot 2000 allows for the analysis of the sales data illustrated in FIG. 17 in a very different manner. Visual plot 2000 (FIG. 18) has the format [Time].[Year]*[Sales](rows, y-axis) versus [Time].[Quarter].[Month] (columns, x-axis). Therefore, each year generates a new row 2002 in the visual plot and each row represents sales for the corresponding year. Further, each row is delineated firstly by quarters and secondly by months. Thus, each bar in the visual plot represents sales in a given month for a given year. Advantageously, in visual plot 2000, sales for a respective month of the year (e.g., January) from multiple years (e.g., 1998 and 1999) are overlayed directly on top of each other in the same graphic. This allows, for example, the unique comparison of same month sales across multiple years. In some embodiments each row 2002 is assigned a different color or hash pattern.

As discussed previously, the visual plots in this aspect of the invention are based on the specification. A first level from the plurality of levels is represented by a first component of the visual table and a second level from the plurality of levels is represented by a second component of the visual table. In some embodiments, the first component is a plurality of rows and the second component is a plurality of columns. In some embodiments, the first component is a plurality of rows and the second component is a plurality of layers. In other embodiments, the first component is a plurality of columns and the second component is a plurality of layers. Graphs that include multiple layers are illustrated in FIGS. 14 and 15. Generally, layers are plotted in the z-dimension, with each layer spanning the x- and y-axis of the plot.

In some embodiments of the present invention, the graphics (e.g., bars) in each row in the table are assigned a different color or hash pattern. Thus, in one embodiment, the bars in row 2002-1 are colored one color and the bars in row 2002-2 are colored another color. More generally, in some embodiments of the invention the elements of the first and/or second components (e.g., bars, text) are assigned different colors and/or hash pattern.

Figure 19:
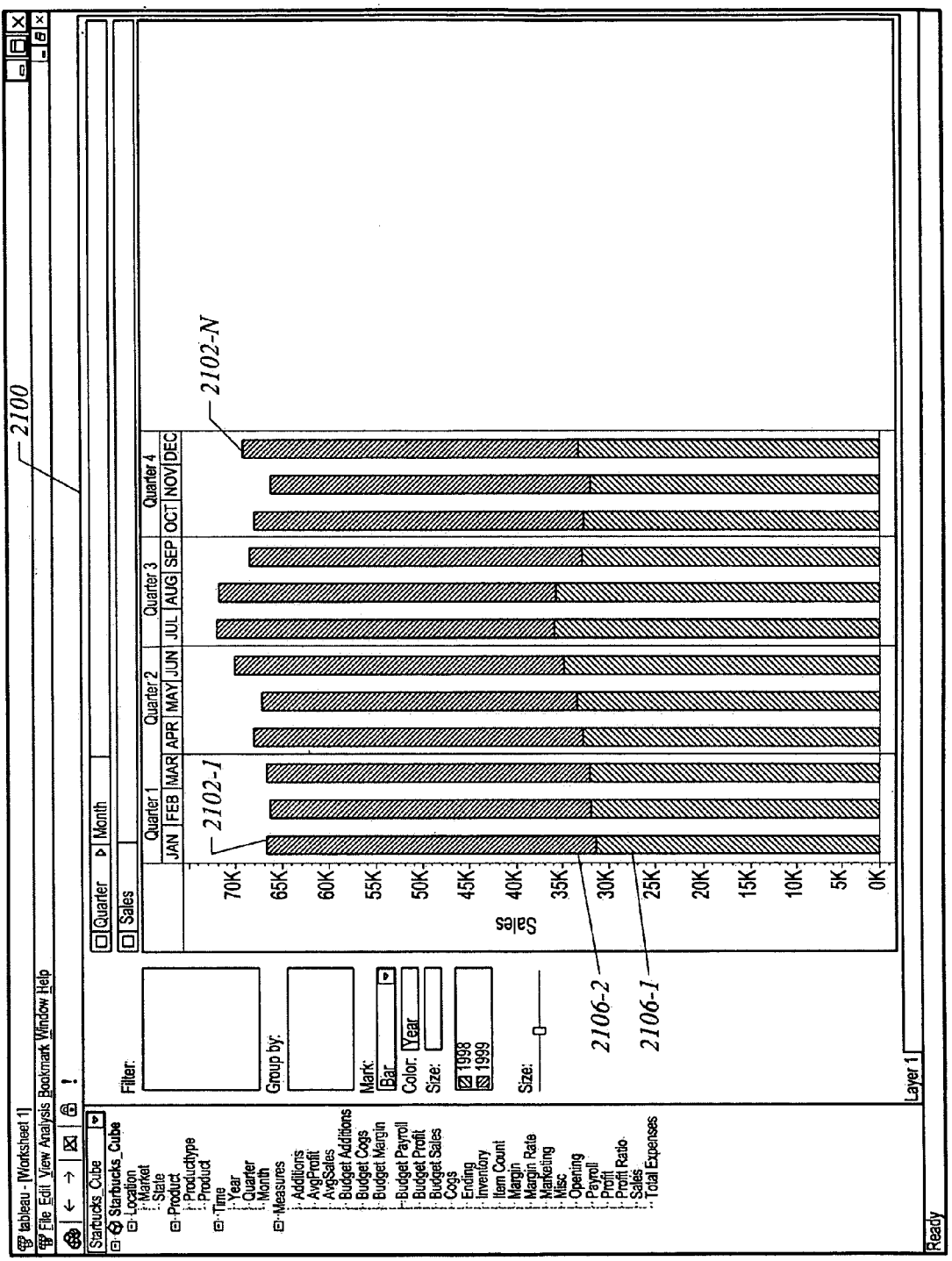
FIG. 19 illustrates a visual plot in accordance with an embodiment of the invention in which a level of a dimension hierarchy is used as a level of detail for a graphic.

FIG. 19 illustrates a visual plot 2100 in which a first component (segments 2106) represents a level of detail of a graphic (FIG. 19, bars 2102) and the second component (FIG. 19, months) is represented on a first axis (FIG. 19, the x-axis) of the visual plot while the second axis (y-axis) of the graph plot represents a measure (sales). The graphic (FIG. 19, bars 2102) is partitioned into a plurality of segments 2106 in accordance with the level of detail (FIG. 19, years) such that each segment 2106 of the plurality of segments is assigned a different color or a different hash pattern and each segment of the plurality of segments 2106 represents a different data point (FIG. 19, a different year) in the first level (FIG. 19 years) of the dimension hierarchy. As such, visual plot 2100 has the format [Sales] versus [Time].[Quarter].[Month] broken down by [Time].[Year]. That is, each bar 2102 in visual plot 2100 represents sales for a given month across multiple years. For example, bar 2102-1 represents sales made in January of the years 1998 and 1999. Furthermore, each bar 2102 is segmented by year. For example, a lower portion 2106 of bar 2102 represents the relative sales in January 1998 and is colored a first color or given a first hash pattern and an upper portion 2108 of bar 2102-1 represents relative sales in January 1999 and is colored a second color or given a second hash pattern. As such, level of time defines both an axis of the graphic and the level of detail of the graphic.

Figure 20:
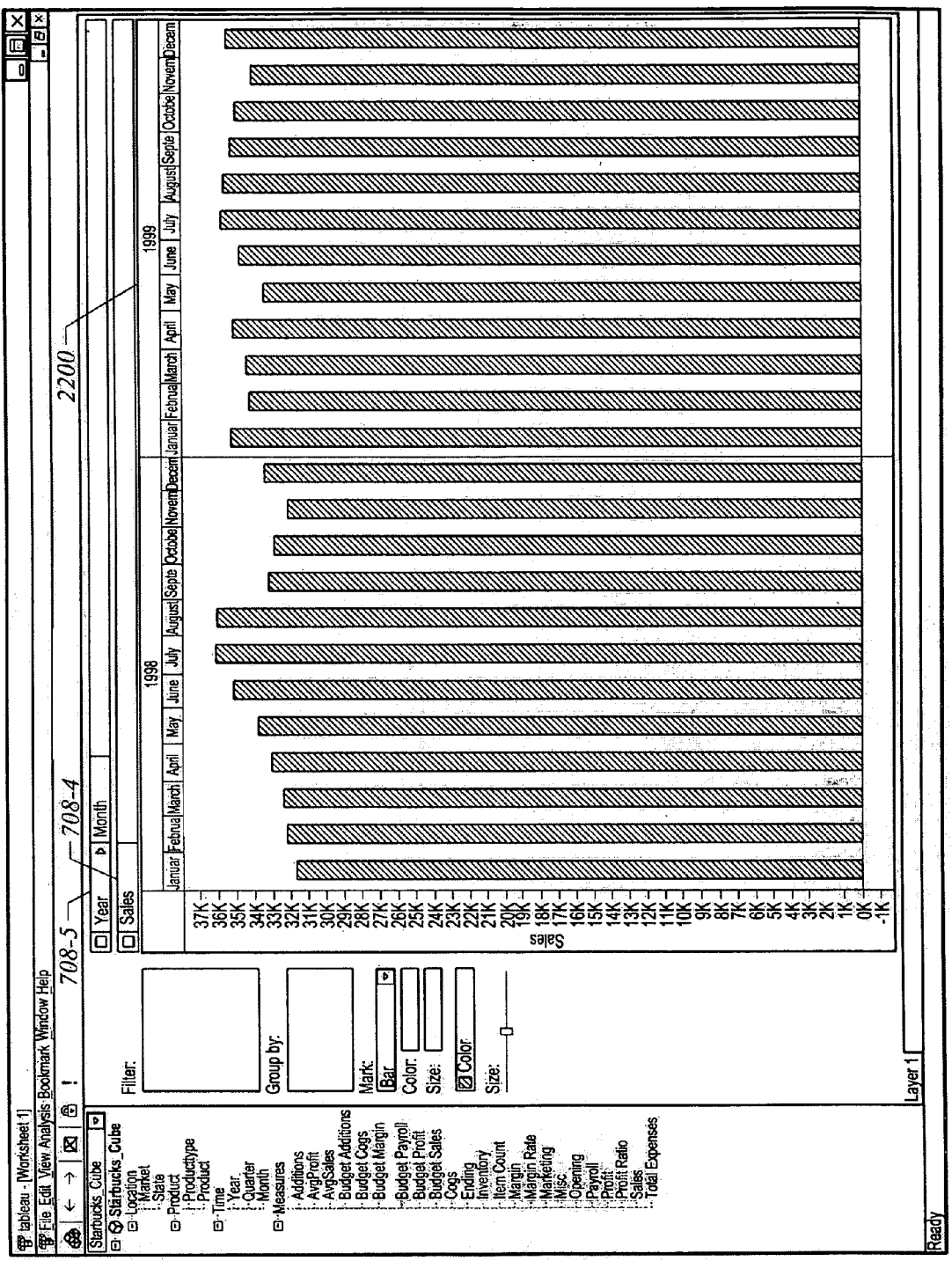
FIG. 20 illustrates a visual plot in which a dimension is skipped, in accordance with one embodiment of the present invention.

FIG. 20 illustrates an embodiment in which a set of levels from the dimension (FIG. 20, time) in the underlying dataset are represented by a first component (FIG. 20, columns) where the set of levels represent a portion of the dimension hierarchy of the dimension. In visual plot 2200 the set of levels represent the year.quarter.month levels of the time hierarchy. Further, as illustrated in FIG. 20, the set of levels do not include each level in the portion of the dimension hierarchy represented by the set of levels. In the case of FIG. 20, the set of levels are represented on the y-axis as columns. The set of levels on the y-axis include year and months, but not quarters. In other words, visual plot 2200 charts the measure "sales" (row, y-axis) versus the dimension "time" (columns, x-axis). However, in this embodiment, a level of the dimension time (year, quarter, month, day, minute) is skipped. Thus, although the underlying data has time delineated into the hierarchy year, quarter, and month, visual plot 2200 only displays the level "months" for the respective years 1998 and 1999. This is accomplished by selecting the year and month levels of the time dimension on shelf 708-5, which controls displacement of data on the x-axis (columns in FIG. 20), and the measure "sales" on shelf 708-4, which controls displacement of data on the y-axis of visual plot 2200.

Figure 21:
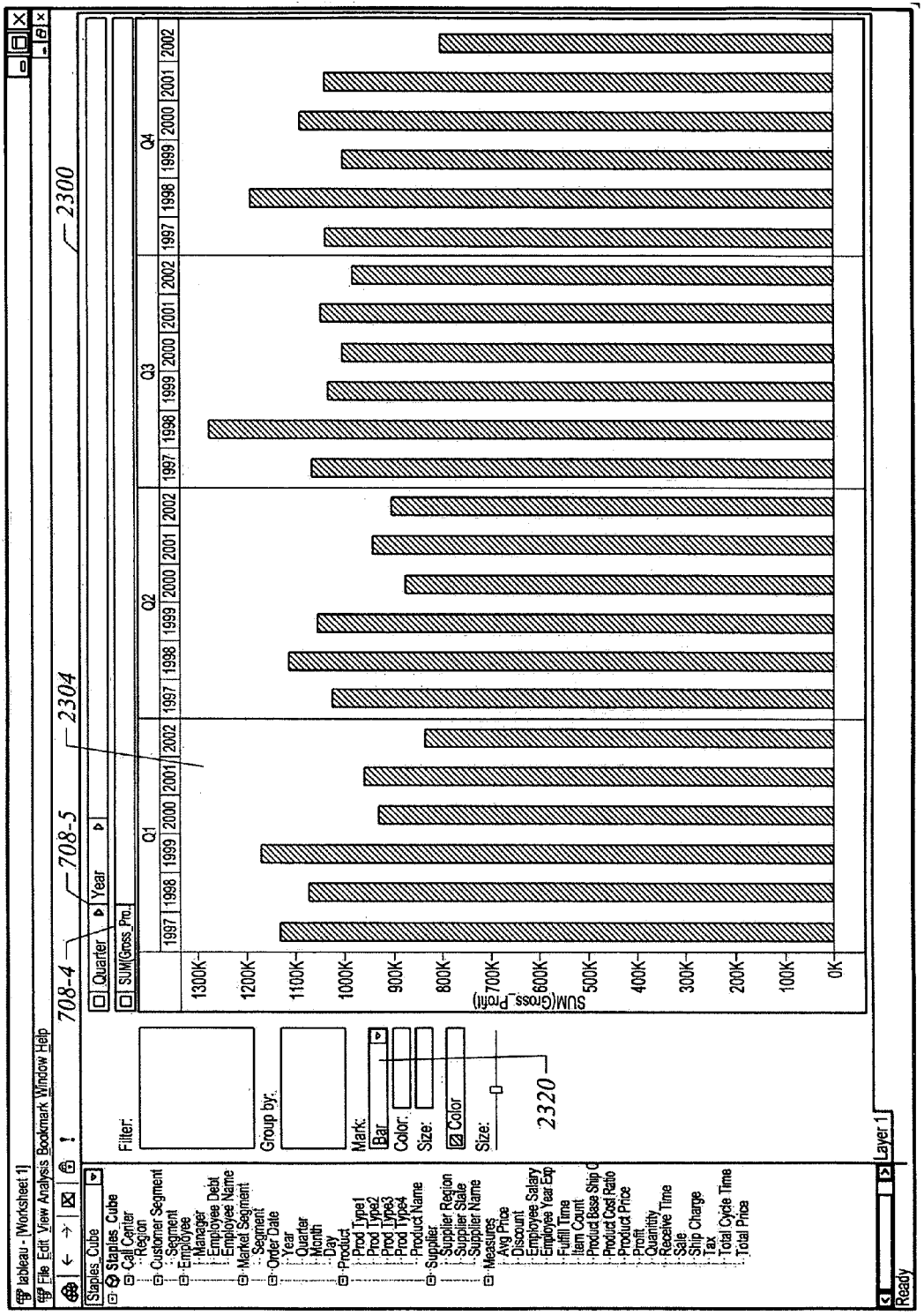
FIG. 21 illustrates a visual plot in which the set of levels from a dimension hierarchy found in an underlying dataset is represented by a first component but in an order that deviates from an order found in the dimension hierarchy, in accordance with an embodiment of the invention.

FIG. 21 illustrates an embodiment in which the set of levels from the dimension hierarchy (e.g., FIG. 21, time) found in the underlying dataset is represented by the first component (FIG. 21, y-axis, columns) but in an order that deviates from an order in the dimension hierarchy. In particular, visual plot 2300 charts the measure SUM (gross_profit) (row) versus the dimension time (columns). However, in this embodiment, the levels of the dimension time are not displayed in their natural order. That is, year is nested within quarter. Thus, although the underlying data has time delineated into the hierarchy year, quarter, and month, visual plot 2300 displays the level "year" nested within "quarter". This is accomplished by selecting the quarter and year levels of the time dimension in reverse order on shelf 708-5, which controls displacement of data on the x-axis (columns in FIG. 21), and the measure "SUM (gross_profit)" on shelf 708-4, which controls displacement of data on the y-axis of visual plot 2300. Advantageously, visual plot 2300 provides a direct comparison of corresponding quarters from respective years. For example, in panel 2304, gross profits in the first quarter can be directly compared across the years 1997, 1998, 1999, 2000, 2001, and 2002.

Figure 22:
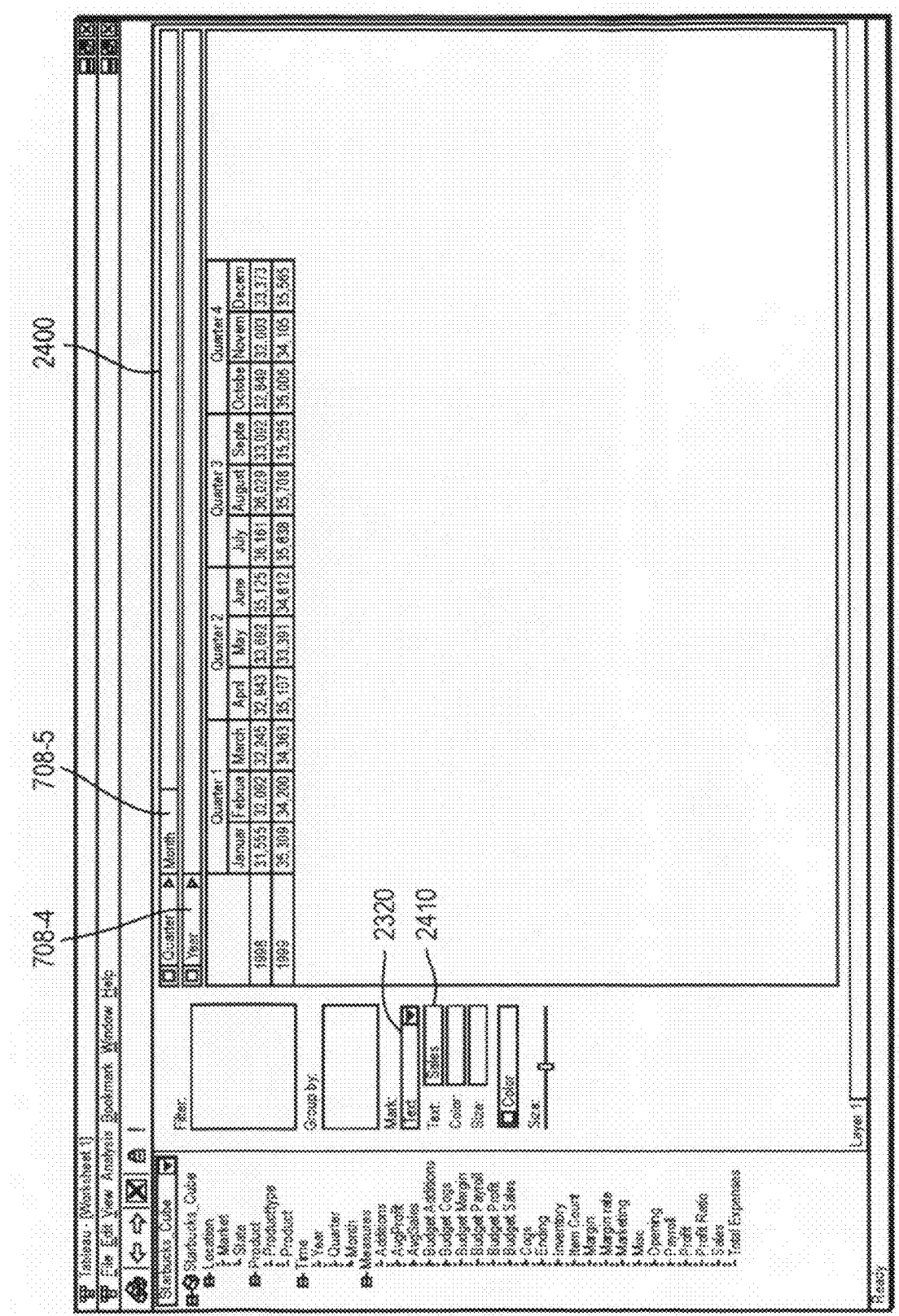
FIG. 22 illustrate a visual plot in which the time dimension is found on two axes in accordance with an embodiment of the present invention.

The techniques of the present invention are not limited to bar charts. A wide variety of different marks can be used in the present invention. In some embodiments, a user selects which mark to use with toggle 2320 (FIG. 21). In visual plot 2300, the toggle is set to "bar" and, hence, a bar chart is depicted. However, in visual plot 2400 (FIG. 22), toggle 2320 is set to "text" resulting in the display of a text table. When toggle 2320 is set to "text", panel 2410 is used to specify what text is to be used in the graphic. Alternatively, in embodiments not shown, the user drags the text to be used directly onto the graphic. In FIG. 22, the text to be used is set to "sales." Thus, sales data for each month is displayed in text format along the x-axis of visual plot 2400. Further, because the level "year" of the dimension "time" is specified in shelf 708-4, the sales data along the x-axis is broken into rows along the y-axis, with each row representing a respective year of sales data.

Figure 23:
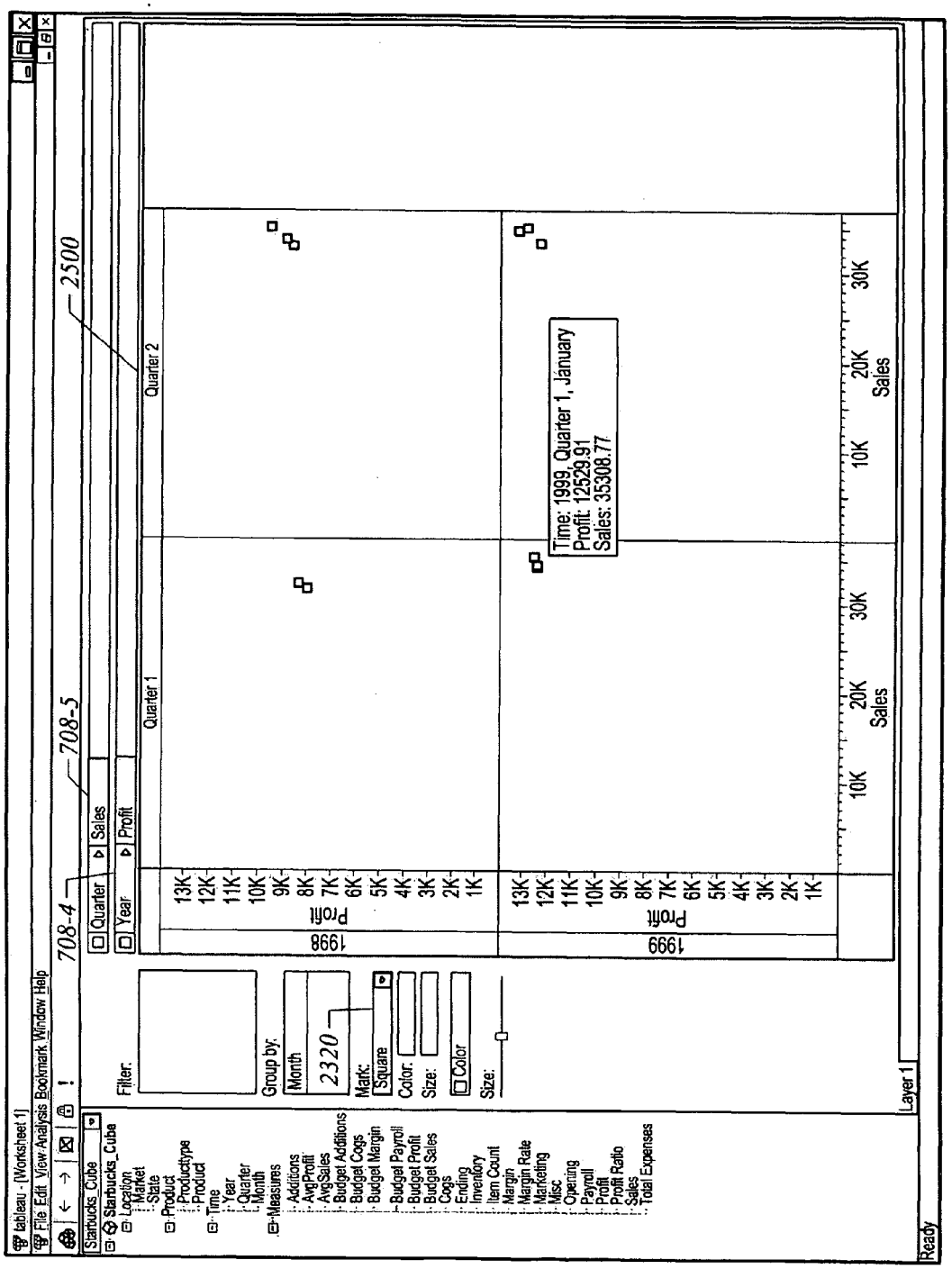
FIG. 23 illustrates a visual plot that encodes sales data in a segmented scatterplot in accordance with an embodiment of the present invention.

Toggle 2320 can be set to a wide range of graphic types, including scatterplot matrices, as illustrated in visual plot 2500 (FIG. 23), where toggle 2320 is set to "square". In visual plot 2500, shelf 708-5 is set to the level "quarter" of the dimension time as well as the measure "sales". Therefore, the y-axis of visual plot 2500 depicts sales by quarter. Shelf 708-4 is set to the level "year" of the dimension time as well as the measure "profit". Accordingly, visual plot 2500 depicts a scatterplot of profit versus sales in respective quarters of respective years. Each datapoint in the scatterplot represents a given month and the coordinates of the datapoint are determined by the profits versus sales for the given month.

Alternative Embodiments

The present invention can be implemented as a computer program product that comprises a computer program mechanism embedded in a computer readable storage medium. For instance, the computer program product could contain the program modules shown in FIG. 13. These program modules may be stored on a CD-ROM, magnetic disk storage product, or any other computer readable data or program storage product. The software modules in the computer program product can also be distributed electronically, via the Internet or otherwise, by transmission of a computer data signal (in which the software modules are embedded) on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

All references cited herein are incorporated herein by reference in their entirety and for all purposes to the same extent as if each individual publication or patent or patent application was specifically and individually indicated to be incorporated by reference in its entirety for all purposes.

What is claimed:

1. A method of forming a visual plot using a dataset having a plurality of fields, wherein the dataset contains data that comprises a plurality of tuples, the method comprising:
   at a computer having one or more processors and memory storing programs executed by the one or more processors:
   displaying a graphical user interface window including a schema display region and a data visualization region, wherein:
      the schema display region includes metadata corresponding to the plurality of fields of the dataset, and
      the data visualization region includes a first axis shelf and a second axis shelf;
   detecting user requests to associate a first field in the schema display region with the first axis shelf and associate a second field in the schema display region with the second axis shelf, respectively;
   in response to the user requests,
      generating a visual specification based on the first field and the second field;
      converting said visual specification into one or more queries, each query expressed in an algebraic expression of applying a predefined set of rules and operations to at least one of the first field and the second field;
      receiving field type information for the user-selected fields of the dataset; and
   generating a visual plot of at least a portion of the dataset in the data visualization region in accordance with the field type information and the visual specification, said generating including:
      retrieving one or more tuples from the dataset in accordance with the visual specification;
      organizing the visual plot into one or more panes, wherein each of said panes has at least a first axis and a second axis, wherein said first axis corresponds to the first field associated with the first axis shelf and said second axis corresponds to the second field associated with the second axis shelf;
      assigning a pane type to said one or more panes according to a first field type of said first field and a second field type of said second field;
      based on no additional user input, determining a mark type from among a plurality of mark types for said one or more panes based on the pane type; and
      populating the one or more panes with the one or more tuples using the determined mark type.

2. The method of claim 1 wherein said dataset is a database.

3. The method of claim 2 wherein the database is a relational database.

4. The method of claim 2 wherein the database is a hierarchical database.

5. The method of claim 2 wherein the database is an unstructured database.

6. The method of claim 1, wherein said populating the one or more panes comprises associating each tuple of said one or more tuples with a pane in the one or more panes.

7. The method of claim 1 wherein
   said visual specification comprises a first algebraic expression for said first field and a second algebraic expression for said second field.

8. The method of claim 7 wherein
   said visual specification further organizes said one or more panes into a plurality of layers; and said visual specification further comprises a third algebraic expression for said plurality of layers.

9. The method of claim 1 wherein said one or more panes comprises a plurality of rows and a plurality of columns of panes arranged in a 2-D matrix with identical horizontal and vertical axes.

10. The method of claim 9 wherein at least one field in said plurality of fields has a plurality of levels, and wherein a first level from said plurality of levels is represented by a first component of said visual plot and wherein a second level from said plurality of levels is represented by a second component of said visual plot, wherein said first component and said second component are not the same.

11. The method of claim 10 wherein said first component and said second component are each independently selected from the group consisting of: one or more rows in said visual plot, one or more columns in said visual plot, one or more layers in said visual plot, an axis of said visual plot, a graphic in said visual plot, and a level of detail of a graphic in said visual plot.

12. The method of claim 11 wherein said first component is said plurality of rows and said second component is said plurality of columns.

13. The method of claim 11 wherein said first component is said plurality of rows and said second component is said plurality of layers.

14. The method of claim 11 wherein said first component is said plurality of columns and said second component is said plurality of layers.

15. The method of claim 10 wherein said first component of said visual plot is a first axis of said visual plot and said second component of said visual plot is a second axis of said visual plot.

16. The method of claim 15 wherein said first axis and said second axis are orthogonal to one another.

17. The method of claim 16 wherein said first axis and said second axis are subjected to a transformation selected from the group consisting of: rotation, reflection, inversion, and shear.

18. The method of claim 15 wherein said first axis and said second axis are disposed at an angle to one another wherein said angle is less than 180° and is other than 90°.

19. The method of claim 10 wherein one of said first level and said second level represents a time period.

20. The method of claim 19 wherein said time period is any one of: a year, a quarter, a month, a week, a day, an hour, a minute, or a second.

21. The method of claim 1 wherein said first field type is selected from the group consisting of: time, numerical, categorical, and geolocational.

22. The method of claim 21 wherein said first field type is time.

23. The method of claim 21 wherein said first field type is numerical, and said mark is shape.

24. The method of claim 21 wherein said first field type is categorical, and said mark is text.

25. The method of claim 21 wherein said first field type is geolocational.

26. The method of claim 21 wherein said first axis is an angular polar coordinate, and said mark is a segment of a pie chart.

27. The method of claim 1 wherein said mark is selected from the group consisting of: text form, bar chart, pie chart, 3-dimensional bar-chart, 3-dimensional projection, hologram, Gantt plot, and scatterplot.

28. The method of claim 1 wherein said first field type and said second field type, together, form a pane type, and wherein a rule is associated with said pane type for determining the mark type.

29. The method of claim 1 wherein said first field type and said second field type are independently selected from the group consisting of: time, numerical, categorical, and geolocational.

30. The method of claim 29, wherein both of said first field type and said second field type are ordinal, and said mark is text.

31. The method of claim 29 wherein both of said first field type and said second field type are numerical, and said mark is a shape.

32. The method of claim 29 wherein one of said first field type and said second field type is ordinal, one of said first field type and said second field type is numerical, and said mark is a bar.

33. The method of claim 29 wherein one of said first field type and said second field type is ordinal, one of said first field type and said second field type is time, and said mark is Gantt.

34. The method of claim 29 wherein one of said first field type and said second field type is time, one of said first field type and said second field type is numerical, and said mark is a line.

35. The method of claim 29 wherein one of said first field type and said second field type is geolocational, and said mark is a map symbol.

36. The method of claim 1 wherein one mark is assigned to each tuple in said plurality of tuples.

37. The method of claim 1 wherein a mark is formed from more than one tuple in said plurality of tuples.

38. The method of claim 37 wherein the mark is a polygon.

39. The method of claim 1 wherein each of said panes additionally has a third axis that corresponds to a third field from said plurality of fields, and said mark is a 3-dimensional mark.

40. The method of claim 1, further including:
  detecting a user request to change the determined mark type with a user-specified mark type; and
  updating the visual plot by populating the one or more panes with the plurality of tuples using the user-specified mark type.

41. A computer program product for use in conjunction with a computer system, the computer program product comprising a computer readable storage medium and a computer program mechanism embedded therein, the computer program mechanism for forming a visual plot using a dataset having a plurality of fields, wherein the dataset contains data that comprises a plurality of tuples, the computer program mechanism comprising instructions that, if executed by the computer system, cause the computer system to:
  display a graphical user interface window including a schema display region and a data visualization region, wherein:
    the schema display region includes metadata corresponding to the plurality of fields of the dataset, and
    the data visualization region includes a first axis shelf and a second axis shelf;
  detect user requests to associate a first field in the schema display region with the first axis shelf and associate a second field in the schema display region with the second axis shelf, respectively;
  in response to the user requests,
    generate a visual specification based on the first field and the second field;
    convert said visual specification into one or more queries, each query expressed in an algebraic expression of applying a predefined set of rules and operations to at least one of the first field and the second field;
    receive field type information for the user-selected fields of the dataset; and
  generate a visual plot of at least a portion of the dataset in the data visualization region in accordance with the field type information and the visual specification, said generating including:
    retrieve one or more tuples from the dataset in accordance with the visual specification;
    organize the visual plot into one or more panes, wherein each of said panes has at least a first axis and a second axis, wherein said first axis corresponds to the first field associated with the first axis shelf and said second axis corresponds to the second field associated with the second axis shelf;
    assign a pane type to said one or more panes according to a first field type of said first field and a second field type of said second field;
    based on no additional user input, determine a mark type from among a plurality of mark types for said one or more panes based on the pane type; and
    populate the one or more panes with the plurality of tuples using the determined mark type.

42. The computer program product of claim 41 wherein said dataset is a database.

43. The computer program product of claim 42 wherein the database is a relational database.

44. The computer program product of claim 42 wherein the database is a hierarchical database.

45. The computer program product of claim 42 wherein the database is an unstructured database.

46. The computer program product of claim 41 wherein said populating the one or more panes comprises associating each tuple of said one or more tuples with a pane in said one or more panes.

47. The computer program product of claim 41 wherein said visual specification comprises a first algebraic expression for said first field and a second algebraic expression for said second field.

48. The computer program product of claim 47 wherein said visual specification further organizes said one or more panes into a plurality of layers; and
  said visual specification further comprises a third algebraic expression for said plurality of layers.

49. The computer program product of claim 41 wherein said one or more panes comprises a plurality of rows and a plurality of columns of panes arranged in a 2-D matrix with identical horizontal and vertical axes.

50. The computer program product of claim 49 wherein at least one field in said plurality of fields has a plurality of levels, and wherein a first level from said plurality of levels is represented by a first component of said visual plot and wherein a second level from said plurality of levels is represented by a second component of said visual plot, wherein said first component and said second component are not the same.

51. The computer program product of claim 50 wherein said first component and said second component are each independently selected from the group consisting of: one or more rows in said visual plot, one or more columns in said visual plot, one or more layers in said visual plot, an axis of said visual plot, a graphic in said visual plot, and a level of detail of a graphic in said visual plot.

52. The computer program product of claim 51 wherein said first component is said plurality of rows and said second component is said plurality of columns.

53. The computer program product of claim 51 wherein said first component is said plurality of rows and said second component is said plurality of layers.

54. The computer program product of claim 51 wherein said first component is said plurality of columns and said second component is said plurality of layers.

55. The computer program product of claim 50 wherein said first component of said visual plot is a first axis of said visual plot and said second component of said visual plot is a second axis of said visual plot.

56. The computer program product of claim 55 wherein said first axis is an angular polar coordinate, and said mark is a segment of a pie chart.

57. The computer program product of claim 55 wherein said first axis and said second axis are orthogonal to one another.

58. The computer program product of claim 57 wherein said first axis and said second axis are subjected to a transformation selected from the group consisting of: rotation, reflection, inversion, and shear.

59. The computer program product of claim 55 wherein said first axis and said second axis are disposed at an angle to one another wherein said angle is less than 180° and is other than 90°.

60. The computer program product of claim 50 wherein one of said first level and said second level represents a time period.

61. The computer program product of claim 60 wherein said time period is any one of: a year, a quarter, a month, a week, a day, an hour, a minute, or a second.

62. The computer program product of claim 41 wherein said first field type is selected from the group consisting of: time, numerical, categorical, and geolocational.

63. The computer program product of claim 62 wherein said first field type is time.

64. The computer program product of claim 62 wherein said first field type is numerical, and said mark is shape.

65. The computer program product of claim 62 wherein said first field type is categorical, and said mark is text.

66. The computer program product of claim 62 wherein said first field type is geolocational.

67. The computer program product of claim 41 wherein said mark is selected from the group consisting of: text form, bar chart, pie chart, 3-dimensional bar-chart, 3-dimensional projection, hologram, Gantt plot, and scatterplot.

68. The computer program product of claim 41 wherein said first field type and said second field type, together, form a pane type, and wherein a rule is associated with said pane type.

69. The computer program product of claim 41 wherein said first field type and said second field type are independently selected from the group consisting of: time, numerical, categorical, and geolocational.

70. The computer program product of claim 40, wherein both of said first field type and said second field type are ordinal, and said mark is text.

71. The computer program product of claim 70 wherein both of said first field type and said second field type are numerical, and said mark is a shape.

72. The computer program product of claim 70 wherein one of said first field type and said second field type is ordinal, one of said first field type and said second field type is numerical, and said mark is a bar.

73. The computer program product of claim 70 wherein one of said first field type and said second field type is ordinal, one of said first field type and said second field type is time, and said mark is Gantt.

74. The computer program product of claim 70 wherein one of said first field type and said second field type is time, one of said first field type and said second field type is numerical, and said mark is a line.

75. The computer program product of claim 70 wherein one of said first field type and said second field type is geolocational, and said mark is a map symbol.

76. The computer program product of claim 41 wherein each of said panes additionally has a third axis that corresponds to a third field from said plurality of fields, and said mark is a 3-dimensional mark.

77. The computer program product of claim 41 wherein one mark is assigned to each tuple in said plurality of tuples.

78. The computer program product of claim 41 wherein a mark is formed from more than one tuple in said plurality of tuples.

79. The computer program product of claim 78 wherein the mark is a polygon.

80. The computer program product of claim 41, further including instructions for:
   detecting a user request to change the determined mark type with a user-specified mark type; and
   updating the visual plot by populating the one or more panes with the plurality of tuples using the user-specified mark type.

81. A computer system for forming a visual plot using a dataset having a plurality of fields, wherein the dataset contains data that comprises a plurality of tuples, the computer system comprising:
   a central processing unit;
   a memory, coupled to the central processing unit, the memory storing:
   said dataset;
   a programming module comprising:
   instructions for displaying a graphical user interface window including a schema display region and a data visualization region, wherein:
      the schema display region includes metadata corresponding to the plurality of fields of the dataset, and
      the data visualization region includes a first axis shelf and a second axis shelf;
   instructions for detecting user requests to associate a first field in the schema display region with the first axis shelf and associate a second field in the schema display region with the second axis shelf, respectively;
   instructions for, in response to the user requests, generating a visual specification based on the first field and the second field and converting said visual specification into one or more queries, each query expressed in an algebraic expression of applying a predefined set of rules and operations to at least one of the first field and the second field;
   instructions for, in response to the user requests, receiving field type information for the user-selected fields of the dataset; and
   instructions for generating a visual plot of at least a portion of the dataset in the data visualization region in accordance with the field type information and the visual specification, said instructions further including:
      instructions for retrieving one or more tuples from the dataset in accordance with the visual specification;
      instructions for organizing the visual plot into one or more panes, wherein each of said panes has at least a first axis and a second axis, wherein said first axis corresponds to the first field associated with the first axis shelf and said second axis corresponds to the second field associated with the second axis shelf;

instructions for assigning a pane type to said one or more panes according to a first field type of said first field and a second field type of said second field;

instructions for, based on no additional user input, determining a mark type from among a plurality of mark types for said one or more panes based on the pane type; and instructions for populating the one or more panes with the plurality of tuples using the determined mark type.

82. The computer system of claim 81 wherein said dataset is a database.

83. The computer system of claim 82 wherein the database is a relational database.

84. The computer system of claim 82 wherein the database is a hierarchical database.

85. The computer system of claim 82 wherein the database is an unstructured database.

86. The computer system of claim 81, wherein said populating the one or more panes comprises associating each tuple of said one or more tuples with a pane in said one or more panes.

87. The computer system of claim 81, wherein said visual specification comprises a first algebraic expression for said first field and a second algebraic expression for said second field.

88. The computer system of claim 87 wherein said visual specification further organizes said one or more panes into a plurality of layers; and said visual specification further comprises a third algebraic expression for said plurality of layers.

89. The computer system of claim 81 wherein said one or more panes comprises a plurality of rows and a plurality of columns of panes arranged in a 2-D matrix with identical horizontal and vertical axes.

90. The computer system of claim 89 wherein at least one field in said plurality of fields has a plurality of levels, and wherein a first level from said plurality of levels is represented by a first component of said visual plot and wherein a second level from said plurality of levels is represented by a second component of said visual plot, wherein said first component and said second component are not the same.

91. The computer system of claim 90 wherein said first component and said second component are each independently selected from the group consisting of: one or more rows in said visual plot, one or more columns in said visual plot, one or more layers in said visual plot, an axis of said visual plot, a graphic in said visual plot, and a level of detail of a graphic in said visual plot.

92. The computer system of claim 91 wherein said first component is said plurality of rows and said second component is said plurality of columns.

93. The computer system of claim 91 wherein said first component is said plurality of rows and said second component is said plurality of layers.

94. The computer system of claim 91 wherein said first component is said plurality of columns and said second component is said plurality of layers.

95. The computer system of claim 90 wherein said first component of said visual plot is a first axis of said visual plot and said second component of said visual plot is a second axis of said visual plot.

96. The computer system of claim 95 wherein said first axis is an angular polar coordinate, and said mark is a segment of a pie chart.

97. The computer system of claim 95, wherein said first axis and said second axis are orthogonal to one another.

98. The computer system of claim 97, wherein said first axis and said second axis are subjected to a transformation selected from the group consisting of: rotation, reflection, inversion, and shear.

99. The computer system of claim 95, wherein said first axis and said second axis are disposed at an angle to one another wherein said angle is less than 180° and is other than 90°.

100. The computer system of claim 90 wherein one of said first level and said second level represents a time period.

101. The computer system of claim 100 wherein said time period is any one of: a year, a quarter, a month, a week, a day, an hour, a minute, or a second.

102. The computer system of claim 81 wherein said first field type is selected from the group consisting of: time, numerical, categorical, and geolocational.

103. The computer system of claim 102 wherein said first field type is time.

104. The computer system of claim 102 wherein said first field type is numerical, and said mark is shape.

105. The computer system of claim 102 wherein said first field type is categorical, and said mark is text.

106. The computer system of claim 102 wherein said first field type is geolocational.

107. The computer system of claim 81 wherein said mark is selected from the group consisting of: text form, bar chart, pie chart, 3-dimensional bar-chart, 3-dimensional projection, hologram, Gantt plot, and scatterplot.

108. The computer system of claim 81, wherein said first field type and said second field type, together, form a pane type, and wherein a rule is associated with said pane type.

109. The computer system of claim 81, wherein said first field type and said second field type are independently selected from the group consisting of: time, numerical, categorical, and geolocational.

110. The computer system of claim 109, wherein both of said first field type and said second field type are ordinal, and said mark is text.

111. The computer system of claim 109 wherein both of said first field type and said second field type are numerical, and said mark is a shape.

112. The computer system of claim 109 wherein one of said first field type and said second field type is ordinal, one of said first field type and said second field type is numerical, and said mark is a bar.

113. The computer system of claim 109 wherein one of said first field type and said second field type is ordinal, one of said first field type and said second field type is time, and said mark is Gantt.

114. The computer system of claim 109 wherein one of said first field type and said second field type is time, one of said first field type and said second field type is numerical, and said mark is a line.

115. The computer system of claim 109 wherein one of said first field type and said second field type is geolocational, and said mark is a map symbol.

116. The computer system of claim 81 wherein each of said panes additionally has a third axis that corresponds to a third field from said plurality of fields, and said mark is a 3-dimensional mark.

117. The computer system of claim 81 wherein one mark is assigned to each tuple in said plurality of tuples.

118. The computer system of claim 81 wherein a mark is formed from more than one tuple in said plurality of tuples.

119. The computer system of claim 118 wherein the mark is a polygon.

120. The computer system of claim 81, further including instructions for:
- detecting a user request to change the determined mark type with a user-specified mark type; and
- updating the visual plot by populating the one or more panes with the plurality of tuples using the user-specified mark type.

121. A method of visualizing a dataset having a plurality of fields, comprising:
- at a computer having one or more processors and memory storing programs executed by the one or more processors:
  - displaying a graphical user interface window including a schema display region and a data visualization region, wherein:
    - the schema display region includes metadata corresponding to the plurality of fields of the dataset, and
    - the data visualization region includes a first axis shelf and a second axis shelf;
  - receiving, through the graphical user interface window, a first user request to generate a first visual plot of the dataset, the first user request including user instructions to drag first and second fields from the schema display region to the first and second axis shelves in the data visualization region, respectively;
  - in response to the first user request, generating a visual specification based on the first field and the second field and converting said visual specification into one or more queries, each query expressed in an algebraic expression of applying a predefined set of rules and operations to at least one of the first field and the second field;
  - determining a mark type for the first visual plot based on the association between the first and second fields and the first and second axis shelves of the first visual plot and a predefined set of visualization rules;
  - generating the first visual plot of at least a portion of the dataset in accordance with the visual specification and the determined mark type;
  - receiving a second user request to modify the first visual plot, the second user request including user instructions for at least one of relocating a user-specified field from a first region of the first visual plot to a second region of the first visual plot and altering the mark type of the first visual plot;
  - in response to the second user request, revising the visual specification based on the relocation of the user-specified field; and
  - generating a second visual plot of the dataset in accordance with the revised visual specification and the second user request.

122. A computer program product for use in conjunction with a computer system, the computer program product comprising a computer readable storage medium and a computer program mechanism embedded therein, the computer program mechanism for forming a visual plot using a dataset having a plurality of fields, wherein the dataset contains data that comprises a plurality of tuples, the computer program mechanism comprising instructions that, if executed by the computer system, cause the computer system to:
- display a graphical user interface window including a schema display region and a data visualization region, wherein:
  - the schema display region includes metadata corresponding to the plurality of fields of the dataset, and
  - the data visualization region includes a first axis shelf and a second axis shelf;
- receive, through the graphical user interface window, a first user request to generate a first visual plot of the dataset, the first user request including user instructions to drag first and second fields from the schema display region to the first and second axis shelves in the data visualization region, respectively;
- in response to the first user request, generate a visual specification based on the first field and the second field and convert said visual specification into one or more queries, each query expressed in an algebraic expression of applying a predefined set of rules and operations to at least one of the first field and the second field;
- determine a mark type for the first visual plot based on the association between the first and second fields and the first and second axis shelves of the first visual plot and a predefined set of visualization rules;
- generate the first visual plot of at least a portion of the dataset in accordance with the visual specification and the determined mark type;
- receive a second user request to modify the first visual plot, the second user request including user instructions for at least one of relocating a user-specified field from a first region of the first visual plot to a second region of the first visual plot and altering the mark type of the first visual plot;
- in response to the second user request, revise the visual specification based on the relocation of the user-specified field; and
- generate a second visual plot of the dataset in accordance with the revised visual specification and the second user request.

123. A computer system for forming a visual plot using a dataset having a plurality of fields, wherein the dataset contains data that comprises a plurality of tuples, the computer system comprising:
- a central processing unit;
- a memory, coupled to the central processing unit, the memory storing:
- said dataset;
- a programming module comprising:
  - instructions for displaying a graphical user interface window including a schema display region and a data visualization region, wherein:
    - the schema display region includes metadata corresponding to the plurality of fields of the dataset, and
    - the data visualization region includes a first axis shelf and a second axis shelf;
  - instructions for receiving, through the graphical user interface window, a first user request to generate a first visual plot of the dataset, the first user request including user instructions to drag first and second fields from the schema display region to the first and second axis shelves in the data visualization region, respectively;
  - instructions for, in response to the first user request, generating a visual specification based on the first field and the second field and converting said visual specification into one or more queries, each query expressed in an algebraic expression of applying a predefined set of rules and operations to at least one of the first field and the second field;
  - instructions for determining a mark type for the first visual plot based on the association between the first and second fields and the first and second axis shelves of the first visual plot and a predefined set of visualization rules;

instructions for generating the first visual plot of at least a portion of the dataset in accordance with the visual specification and the determined mark type;

instructions for receiving a second user request to modify the first visual plot, the second user request including user instructions for at least one of relocating a user-specified field from a first region of the first visual plot to a second region of the first visual plot and altering the mark type of the first visual plot; and instructions for, in response to the second user request, revising the visual specification based on the relocation of the user-specified field; and instructions for generating a second visual plot of the dataset in accordance with the revised visual specification and the second user request.

* * * * *